(12) United States Patent
Ebisui et al.

(10) Patent No.: US 9,494,803 B2
(45) Date of Patent: Nov. 15, 2016

(54) DISPLAY APPARATUS AND ILLUMINATION UNIT

(71) Applicant: Sony Corporation, Tokyo (JP)

(72) Inventors: Akira Ebisui, Kanagawa (JP); Shogo Shinkai, Kanagawa (JP); Kentaro Okuyama, Kanagawa (JP); Harumi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/347,436

(22) PCT Filed: Sep. 27, 2012

(86) PCT No.: PCT/JP2012/074965
§ 371 (c)(1),
(2) Date: Mar. 26, 2014

(87) PCT Pub. No.: WO2013/051464
PCT Pub. Date: Apr. 11, 2013

(65) Prior Publication Data
US 2014/0300528 A1    Oct. 9, 2014

(30) Foreign Application Priority Data

Oct. 4, 2011 (JP) .................................. 2011-220228
Jul. 11, 2012 (JP) .................................. 2012-155774

(51) Int. Cl.
*G02B 27/22* (2006.01)
*G02F 1/1335* (2006.01)
(Continued)

(52) U.S. Cl.
CPC ......... *G02B 27/2214* (2013.01); *G02B 6/0053* (2013.01); *G02F 1/01* (2013.01); *G02F 1/133606* (2013.01); *G02F 1/133615* (2013.01); *G02B 6/0061* (2013.01);
(Continued)

(58) Field of Classification Search
USPC ............................ 345/32; 349/12, 62–64, 71
See application file for complete search history.

(56) References Cited

U.S. PATENT DOCUMENTS 6,879,354 B1 * 4/2005 Sawayama ........... G02B 6/0025
349/62
2002/0113911 A1 * 8/2002 Fukuda ................ G02B 3/0068
349/5

(Continued)

*Primary Examiner* — Jason Olson
*Assistant Examiner* — Deeprose Subedi
(74) *Attorney, Agent, or Firm* — Wolf, Greenfield & Sacks, P.C.

(57) ABSTRACT

An illumination unit capable of obtaining high luminance and a display apparatus including it are provided. The illumination unit includes an illumination optical system generating the illumination light, and a lens sheet narrowing a divergence angle of the illumination light. The illumination optical system includes a first transparent substrate and a second transparent substrate that are separated from each other and are arranged to face each other, and a light source applying light to an end face of the first transparent substrate or of the second transparent substrate. The illumination optical system is provided in a gap between the first transparent substrate and the second transparent substrate, and includes a light modulation layer exhibiting scattering characteristics or transparent characteristics with respect to the light from the light source in accordance with a magnitude of an electric field. The illumination optical system includes an electrode generating an electric field that generates a plurality of linear scattering regions in the light modulation layer in a three-dimensional display mode, and generating an electric filed that generates a planar scattering region in the light modulation layer in a two-dimensional display mode.

15 Claims, 52 Drawing Sheets

(51) Int. Cl.
*G02F 1/01* (2006.01)
*G02F 1/1334* (2006.01)
*F21V 8/00* (2006.01)

(52) U.S. Cl.
CPC .......... *G02B 6/0078* (2013.01); *G02F 1/1334* (2013.01); *G02F 2203/62* (2013.01)

(56) References Cited

U.S. PATENT DOCUMENTS

| | | | |
|---|---|---|---|
| 2008/0158476 A1* | 7/2008 | Miyashita | G02B 6/005 349/65 |
| 2008/0278640 A1* | 11/2008 | Ijzerman | G02B 5/0242 349/15 |
| 2010/0020265 A1* | 1/2010 | Senoue | G02F 1/13362 349/62 |
| 2010/0026610 A1* | 2/2010 | Obata et al. | 345/32 |
| 2010/0039797 A1* | 2/2010 | Shinkai et al. | 362/97.1 |
| 2010/0073604 A1* | 3/2010 | Okuyama et al. | 349/75 |
| 2010/0085510 A1* | 4/2010 | Okuyama | G02F 1/133615 349/65 |

* cited by examiner (A)

(B)

(A)

(B)

(A)

(B)

DISPLAY APPARATUS AND ILLUMINATION UNIT

CROSS REFERENCE TO RELATED APPLICATIONS

The present application is a national stage application under 35 U.S.C. §371 of International Patent Application No. PCT/JP2012/074965 filed Sep. 27, 2012, and titled "DISPLAY DEVICE AND LIGHTING DEVICE," which claims priority to Japanese Patent Application JP 2011-220228 filed Oct. 4, 2011 and Japanese Patent Application JP 2012-155774 filed Jul. 11, 2012, the entire contents of each of which are hereby incorporated by reference.

TECHNICAL FIELD

The present technology relates to a display apparatus capable of performing two-dimensional display (planar display) and three-dimensional display (stereoscopic display), and to an illumination unit favorably applicable as a backlight of such a display apparatus.

BACKGROUND ART

In some display apparatuses capable of performing three-dimensional display, it is necessary to wear dedicated glasses. In other display apparatuses capable of performing three-dimensional display, it is not necessary to wear dedicated glasses. In the latter display apparatuses, in order to visually recognize a stereoscopic image with naked eyes, a lenticular lens, a parallax barrier, or the like is used. They allow image information to be separately supplied to respective right and left eyes. Therefore, the right and left eyes see different images from each other. As a result, three-dimensional display is achieved.

By the way, in the display apparatus that achieves visual recognition of a stereoscopic image with naked eyes, when a physical barrier is provided, a switchable diffuser is necessary between the barrier and the display panel. Patent Literature 1 proposes a method of providing a simple configuration with using such a diffuser.

CITATION LIST

Patent Literature

Patent Literature 1: Japanese Unexamined Patent Application Publication No. 2007-519033

SUMMARY OF THE INVENTION

However, in Patent Literature 1, a polarization-dependent scatterer is used as the diffuser, and further, a polarizer is used in order to allow polarized light to enter the polarization-dependent scatterer. Therefore, there has been an issue that the polarizer absorbs light, and accordingly, display luminance is decreased.

Therefore, it is desirable to provide an illumination unit capable of obtaining high luminance, and a display apparatus including it.

An illumination unit of an embodiment of the present technology is used in a display apparatus including the illumination unit and a display panel, the illumination unit being capable of outputting, as illumination light, planar illumination light, a plurality of linear illumination lights, or linear illumination light formed of a plurality of point illumination lights that are arranged in a line, and the display panel generating image light by modulating the illumination light in accordance with an image signal. The illumination unit of the embodiment of the present technology includes an illumination optical system generating the illumination light, and a lens sheet narrowing a divergence angle of the illumination light. The illumination optical system includes a first transparent substrate and a second transparent substrate that are separated from each other and are arranged to face each other, and a light source applying light to an end face of the first transparent substrate or of the second transparent substrate. The illumination optical system also includes a light modulation layer provided in a gap between the first transparent substrate and the second transparent substrate, the light modulation layer exhibiting scattering characteristics or transparent characteristics with respect to the light from the light source in accordance with a magnitude of an electric field. The illumination optical system further includes an electrode generating an electric field that generates a plurality of linear scattering regions in the light modulation layer in a three-dimensional display mode, and generating an electric filed that generates a planar scattering region in the light modulation layer in a two-dimensional display mode.

A display apparatus of an embodiment of the present technology includes an illumination unit capable of outputting, as illumination light, planar illumination light, a plurality of linear illumination lights, or linear illumination light formed of a plurality of point illumination lights that are arranged in a line, and a display panel generating image light by modulating the illumination light in accordance with an image signal. The illumination unit mounted on this display apparatus has a configuration similar to that in the above-described illumination unit.

In the illumination unit and the display apparatus according to the embodiments of the present technology, the light modulation layer that exhibits scattering characteristics or transparent characteristics with respect to the light from the light source depending on the magnitude of the electric field is provided in the illumination unit. Therefore, the light that is emitted from the light source and propagates through the first transparent substrate etc. passes through a region, in the light modulation layer, that exhibits the transparent characteristics due to control of electric field, and is totally reflected or is reflected at high reflectance by a top face of the illumination unit. As a result, luminance in a region (hereinafter, simply referred to as "transparent region in light emitting region") corresponding to a region, out of a light emitting region of the illumination unit, that exhibits the transparent characteristics becomes lower than that in a case where light is emitted uniformly in the entire face. On the other hand, light that propagates through the first transparent substrate etc. is scattered in a region, in the light modulation layer, that exhibits the scattering characteristics due to control of electric field, and passes through the top face of the illumination unit. As a result, luminance in a region (hereinafter, simply referred to as "scattering region in light emitting region") corresponding to a region, out of the light emitting region of the illumination unit, that exhibits the scattering characteristics becomes higher than that in the case where light is emitted uniformly in the entire face. In addition thereto, luminance in partial white display (an increase in luminance) is increased, as luminance in the transparent region in the light emitting region is decreased. Moreover, in the present technology, the plurality of linear scattering regions are generated in the light modulation layer in the three-dimensional display mode, and the planar scattering region is generated in the light modulation layer in the two-dimensional display mode. At the time of three-dimensional display, a plurality of linear lights are emitted from the light modulation layer utilizing the light from the light source. On the other hand, at the time of two-dimensional display, planar light is emitted from the modulation layer utilizing the light from the light source. In such a manner, the present technology allows switching between three-dimensional display and two-dimensional display without using the physical barrier, the polarizer, or the like. Further, in the present technology, the lens sheet that narrows the divergence angle of the illumination light is provided in the illumination unit. Accordingly, it is possible to increase a light amount of light that enters the display panel at an appropriate viewing angle compared to a case in which the lens sheet is not provided.

According to the illumination unit and the display apparatus of embodiments of the present technology, switching between three-dimensional display and two-dimensional display is achievable without using the physical barrier, the polarizer, or the like, and also, it is possible to increase the light amount of the light that enters the display panel at the appropriate viewing angle. Therefore, it is possible to obtain high luminance in a displayed image.

MODES FOR CARRYING OUT THE INVENTION

Some modes for carrying out the invention will be described below in detail with reference to the drawings. It is to be noted that the description will be given in the following order.
1. First Embodiment (Illumination Unit)
An example in which a lens sheet having a triangular cross-section is provided on a light guide plate
2. Second Embodiment (Illumination Unit)
An example in which a lens sheet having a cylindrical cross-section is provided on the light guide plate
3. Modifications of Above-described Respective Embodiments (Illumination Unit)

Figure 1:
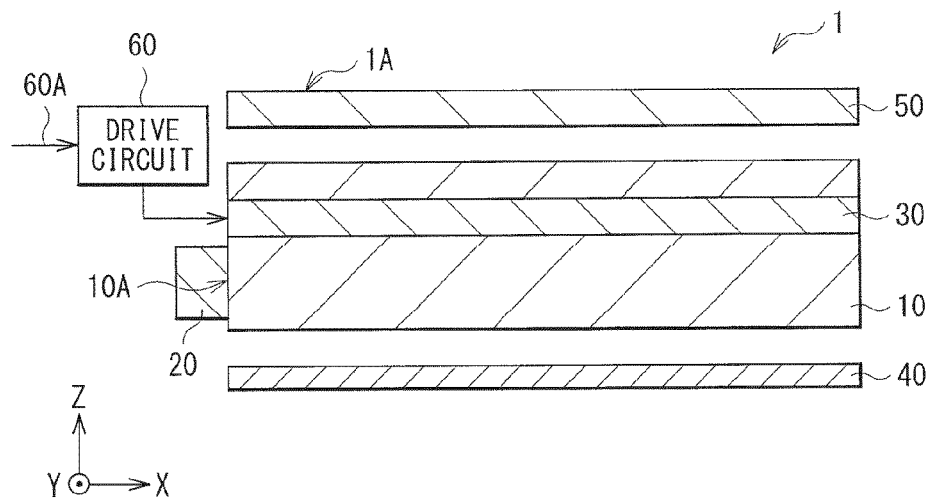
FIG. 1 is a diagram illustrating a cross-sectional configuration example of an illumination unit according to a first embodiment of the present technology.

4. Third Embodiment (Receiver-side Unit)
  An example in which the above-described illumination unit is used as a backlight of a receiver-side unit
5. Modifications of Third Embodiment (Receiver-side Unit)
6. Examples 1. First Embodiment FIG. 1 illustrates a cross-sectional configuration of an illumination unit 1 according to a first embodiment of the present technology. This illumination unit 1 is applicable as a backlight of a display apparatus, and is capable of outputting planar illumination light or a plurality of linear illumination lights as illumination light as will be described later in detail. The illumination unit 1 may include, for example, a light guide plate 10, a light source 20, a light modulation device 30, a reflective plate 40, a lens sheet 50, and a drive circuit 60. The light source 20 is arranged on a side face of the light guide plate 10. The light modulation device 30 is arranged inside the light guide plate 10. The reflective plate 40 is arranged in the back of the light guide plate 10. The lens sheet 50 is arranged above the light guide plate 10. The drive circuit 60 drives the light modulation device 30.

It is to be noted that the light guide plate 10 corresponds to a specific example of "first transparent substrate" or "second transparent substrate" in the present technology. The light source 20 corresponds to a specific example of "light source" in the present technology. An optical system configured of the light source 20, the light modulation device 30, and the reflective plate 40 corresponds to a specific example of "illumination optical system" in the present technology. The lens sheet 50 corresponds to a specific example of "lens sheet" in the present technology.

(Light Guide Plate 10)
The light guide plate 10 guides light from the light source 20 arranged on the side face of the light guide plate 10 to a top face side of the light guide plate 10 (specifically, a light emitting face 1A of the illumination unit 1). The light guide plate 10 may have, for example, a shape corresponding to an object to be illuminated (for example, a display panel 210 which will be described later) that is to be arranged on a top face of the light guide plate 10. For example, the light guide plate 10 may be a cuboidal shape that is surrounded by the top face, a bottom face, and the side faces. It is to be noted that, hereinafter, a side face, out of the side faces of the light guide plate 10, on which the light from the light source 20 is incident is called a light incident face 10A.

The light guide plate 10 may have a shape formed into a predetermined pattern, for example, on at least one face of the top face and the bottom face. The light guide plate 10 has a function of scattering and uniformizing light incident from the light incident face 10A. It is to be noted that, when luminance is uniformized by modulating a voltage applied to the light modulation device 30, it is possible to use a flat light guide plate that is not formed into a pattern as the light guide plate 10. The light guide plate 10 may be configured mainly including, for example, transparent thermoplastic resin such as polycarbonate resin (PC) and acrylic resin (polymethylmethacrylate (PMMA).

(Light Source 20)
The light source 20 is a linear light source, and may be configured, for example, of a hot cathode fluorescent lamp (HCFL), a cold cathode fluorescent lamp (CCFL), a plurality of LEDs (Light Emitting Diodes) arranged in a line, or the like. When the light source 20 is configured of the plurality of LEDs, all of the LEDs may be preferably white LEDs in terms of efficiency, flatness, and uniformity. It is to be noted that the light source 20 may be configured, for example, including a red LED, a green LED, and a blue LED. The light source 20 may be provided only on one side face of the light guide plate 10 (see FIG. 1), or may be provided on two, three, or all side faces of the light guide plate 10.

Figure 2:
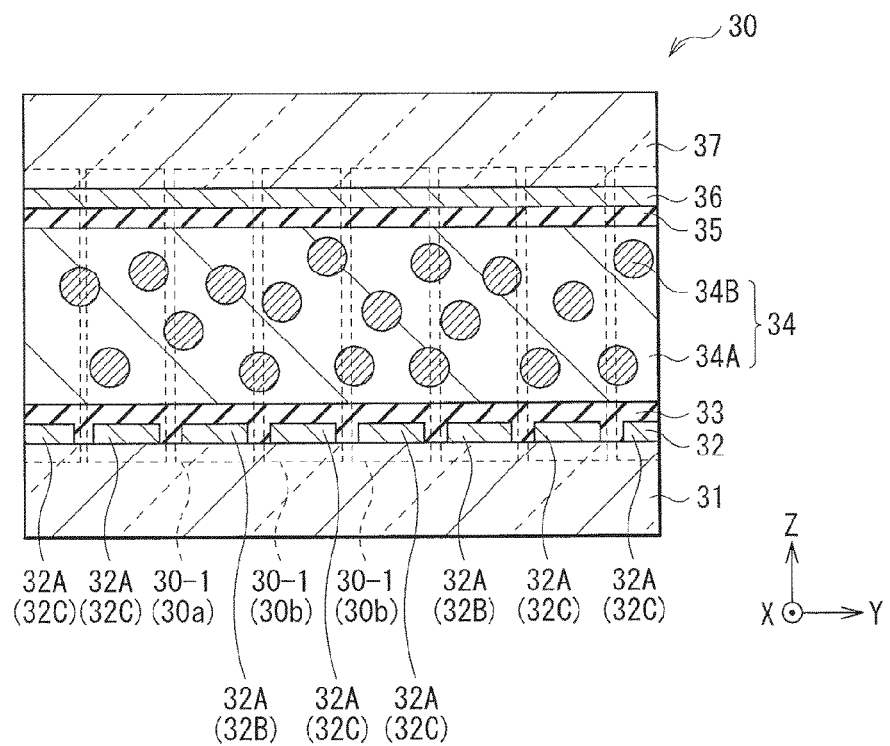
FIG. 2 is a diagram illustrating a cross-sectional configuration example of a light modulation device in FIG. 1.

(Light Modulation Device 30)
The light modulation device 30 is closely attached inside the light guide plate 10 without an air layer in between in the present embodiment. The light modulation device 30 may be adhered to the light guide plate 10, for example, with an adhesive (not illustrated) in between. As shown in FIG. 2, the light modulation device 30 may include, for example, a transparent substrate 31, a lower electrode 32, an alignment film 33, a light modulation layer 34, an alignment film 35, an upper electrode 36, and a transparent substrate 37 that are arranged in order from the reflective plate 40. It is to be noted that FIG. 2 illustrates a cross-sectional configuration example of the light modulation device 30. The lower electrode 32 and the upper electrode 36 correspond to specific examples of "electrode" in the present technology. The light modulation layer 34 corresponds to a specific example of "light modulation layer" in the present technology.

The transparent substrates 31 and 37 are away from each other, and are arranged to face each other. The transparent substrates 31 and 37 support the light modulation layer 34. The transparent substrates 31 and 37 are each typically configured of a substrate that is transparent with respect to visible light such as a glass plate and a plastic film. The upper electrode 36 and the lower electrode 32 generate an electric field that generates a plurality of linear scattering regions in the light modulation layer 34 in a three-dimensional display mode. Also, the upper electrode 36 and the lower electrode 32 generate an electric field that generates a planar scattering region in the light modulation layer 34 in a two-dimensional display mode. It is to be noted that detailed description will be given on the linear scattering regions and the planar scattering region when description will be given on the light modulation layer 34.

Figure 3:
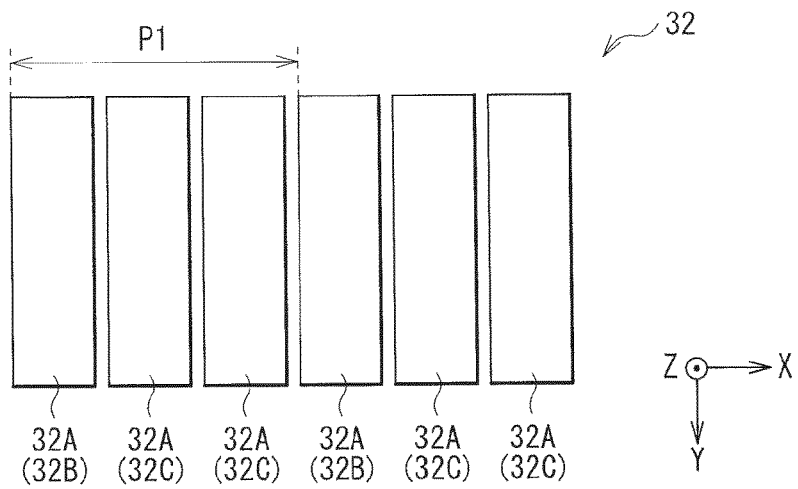
FIG. 3 is a diagram illustrating a planar configuration example of an electrode in FIG. 2.

The upper electrode 36 is provided on a face, of the transparent substrate 37, that faces the transparent substrate 31. The upper electrode 36 may be configured, for example, of one-sheet-like electrode (a solid film) that is formed over the entire face. On the other hand, the lower electrode 32 is provided on a face, of the transparent substrate 31, that faces the transparent substrate 37. The lower electrode 32 may be configured, for example, of a plurality of sub-electrodes 32A as shown in FIG. 2 and FIG. 3. It is to be noted that FIG. 3 illustrates a planar configuration example of the lower electrode 32.

The plurality of sub-electrodes 32A each may have, for example, a belt-like shape that extends in one direction in a plane (for example, a direction parallel to the light incident face 10A), as shown in FIG. 3. Further, the plurality of sub-electrodes 32A are arranged side by side in a direction intersecting with an extending direction of the sub-electrodes 32A. An arrangement direction (an X-axis direction, in FIG. 3) of the plurality of sub-electrodes 32A corresponds to a parallax direction at the time of three-dimensional display. A plurality of specific sub-electrodes 32A (hereinafter, each referred to as "sub-electrode 32B") out of the plurality of sub-electrodes 32A are used to generate linear illumination light when the display apparatus performs three-dimensional display. The plurality of sub-electrodes 32B are arranged with a pitch P1 (a pitch same as a pitch P2 of pixels, or a pitch close thereto) that corresponds to the pitch P2 (see FIG. 72) of the pixels when the display apparatus performs three-dimensional display.

A plurality of sub-electrodes 32A (hereinafter, each referred to as "sub-electrode 32C") other than the sub-electrodes 32B out of the plurality of sub-electrodes 32A are used to generate planar illumination light together with the sub-electrodes 32A when the display apparatus performs two-dimensional display. In other words, when the display apparatus performs two-dimensional display, all of the sub-electrodes 32A are used to generate the planar illumination light. The plurality of sub-electrodes 32B and the plurality of sub-electrodes 32C are arranged regularly in a direction orthogonal to the light incident face 10A. For example, as shown in FIG. 2 and FIG. 3, one sub-electrode 32B and two sub-electrodes 32C are formed into one set, and a plurality of sets of sub-electrode group are arranged in the direction orthogonal to the light incident face 10A. The sub-electrode 32B has a width that may be, for example, narrower than a width of the pixel in the display apparatus. It is to be noted that the sub-electrode group is not necessarily configured of one sub-electrode 32B and two sub-electrodes 32C. The sub-electrode group may be configured, for example, of one sub-electrode 32B and three sub-electrodes 32C, which is not illustrated.

Figure 4:
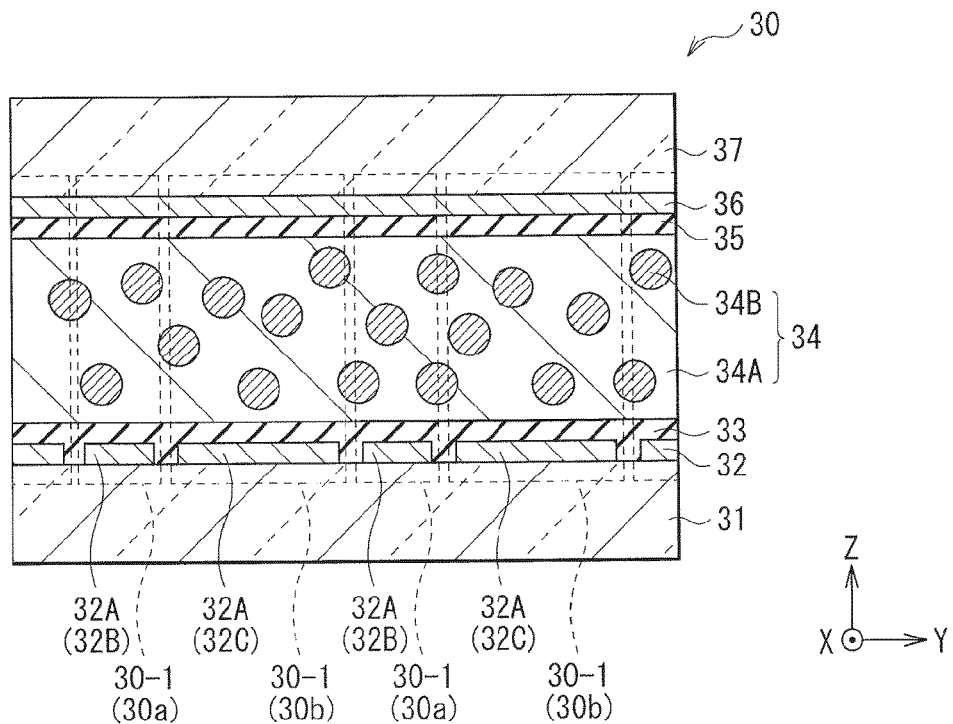
FIG. 4 is a diagram illustrating another example of the cross-sectional configuration of the light modulation device in FIG. 1.
Figure 5:
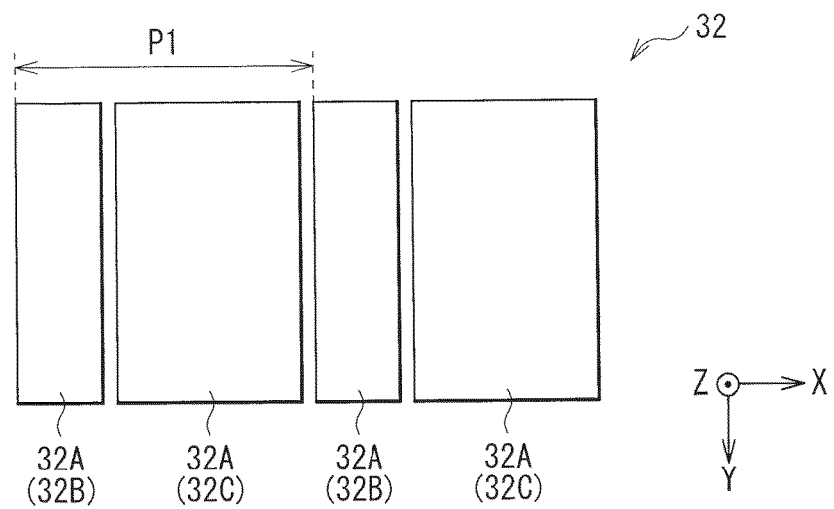
FIG. 5 is a diagram illustrating a planar configuration example of an electrode in FIG. 4.

Each sub-electrode 32A may have, for example, a block-like shape, which is not illustrated. Also, the plurality of sub-electrodes 32A may be arranged two-dimensionally. In this case, for example, the plurality of sub-electrodes 32A lined in a Y-axis direction may be considered one linear electrode, and the drive circuit 60 may drive each of the sub-electrodes 32A so that the respective linear electrodes serve as the above-described sub-electrodes 32B and 32C. Alternatively, for example, as shown in FIG. 4 and FIG. 5, the sub-electrode 32C that has a width larger than the width of the sub-electrode 32B may be provided between the sub-electrodes 32B adjacent to each other. It is to be noted that FIG. 4 illustrates an example of a cross-sectional configuration of the light modulation device 30. FIG. 5 illustrates an example of a planar configuration of the lower electrode 32 in FIG. 4.

Both of the lower electrode 32 and the upper electrode 36 are configured of transparent conductive films. This transparent conductive film may be configured, for example, of ITO. It is to be noted that the lower electrode 32 and the upper electrode 36 may be configured of indium zinc oxide (IZO), metal nanowire, carbon nanotube, graphene, etc.

A light modulation cell 30-1 is configured of a portion corresponding to a portion, of the light modulation device 30, in which the lower electrode 32 and the upper electrode 36 face each other when the lower electrode 32 and the upper electrode 36 are viewed from a direction of a normal to the light modulation device 30 (see FIG. 2). It is to be noted that each light modulation cell 30-1 corresponds to a specific example of "linear scattering region" in the present technology. A cell configured of all of the light modulation cells 30-1 corresponds to a specific example of "planar scattering region" in the present technology.

The light modulation cell 30-1 corresponds to a portion corresponding to a portion, of the light modulation device 30, in which the sub-electrode 32A and the upper electrode 36 face each other. Out of the plurality of light modulation cells 30-1, light modulation cells 30a (see FIG. 2) that each include the sub-electrode 32B are used to generate the linear illumination light when the display apparatus performs three-dimensional display. Out of the plurality of light modulation cells 30-1, light modulation cells 30b (see FIG. 2) that each include the sub-electrode 32C are used to generate the planar illumination light together with the plurality of light modulation cells 30a when the display apparatus performs two-dimensional display. In other words, when the display apparatus performs two-dimensional display, all of the light modulation cells 30-1 are used to generate the planar illumination light.

The respective light modulation cells 30-1 are allowed to be driven separately and independently by applying a predetermined voltage to the sub-electrode 32A and the upper electrode 36. Each light modulation cell 30-1 exhibits transparent characteristics or exhibits scattering characteristics with respect to the light from the light source 20, depending on a magnitude of a value of the voltage applied to the sub-electrode 32A and the upper electrode 36. It is to be noted that detailed description will be given on the transparent characteristics and the scattering characteristics when description will be given on the light modulation layer 34.

The alignment films 33 and 35 may each align liquid crystals, monomers, etc. used for the light modulation layer 34, for example. Examples of a type of the alignment film may include a vertical alignment film and a horizontal alignment film. In the present embodiment, the horizontal alignment films are used for the alignment films 33 and 35. Examples of the horizontal alignment film may include an alignment film that is formed by performing rubbing process on polyimide, polyamide, polyvinyl alcohol, etc., and an alignment film to which a groove-like shape is given by transfer, etching, etc. Further, examples of the horizontal alignment film may include an alignment film that is formed by oblique evaporation of an inorganic material such as silicon oxide, a diamond-like carbon alignment film that is formed by ion beam application, and an alignment film on which an electrode pattern slit is formed. When plastic films are used as the transparent substrates 31 and 37, it may be preferable that a firing temperature after the alignment films 33 and 35 are applied onto the surfaces of the transparent substrates 31 and 37 is as low as possible in a manufacturing process. Therefore, it may be preferable to use polyamide imide that is capable of being formed at a temperature of 100° C. or lower, as the alignment films 33 and 35.

Further, in both of the vertical and horizontal alignment films, it is enough that the alignment film has a function to align the liquid crystal and the monomers, and reliability for repeated application of voltage or the like which is required for a usual liquid crystal display is not necessary. This is because the reliability for voltage application after forming the device is determined depending on an interface between the polymerized monomers and the liquid crystals. Further, if the alignment film is not used, for example, by applying an electric or magnetic field between the lower electrode 32 and the upper electrode 36, it is also possible to align the liquid crystals, the monomers, etc. that are used for the light modulation layer 34. In other words, while an electric or magnetic field is applied between the lower electrode 32 and the upper electrode 36, ultraviolet rays are applied thereto, and thereby, the alignment state of the liquid crystal, the monomers, etc. in a voltage applied state is allowed to be fixed. When a voltage is used to form the alignment film, separated electrodes may be formed for alignment and driving, or alternatively, it is possible to use, as the liquid crystal material, a dual-frequency liquid crystal in which a sign of dielectric constant anisotropy is reversed depending on frequency. Alternatively, when a magnetic field is used for formation of the alignment film, a material having large magnetic susceptibility anisotropy may be preferably used as the alignment film. For example, a material having a lot of benzene rings may be preferably used.

The light modulation layer 34 is provided in a gap between the transparent substrate 31 and the transparent substrate 37. The light modulation layer 34 exhibits scattering characteristics or transparent characteristics with respect to the light from the light source 20, depending on a magnitude of an electric field. The light modulation layer 34 exhibits the transparent characteristics with respect to the light from the light source 20 when the electric field is relatively small, and exhibits the scattering characteristics with respect to the light from the light source 20 when the electric field is relatively large. The light modulation layer 34 may be, for example, a composite layer that includes a bulk 34A and a plurality of microparticulate microparticles 34B that are dispersed in the bulk 34A. The bulk 34A and the microparticles 34B have optical anisotropy.

Figure 6:
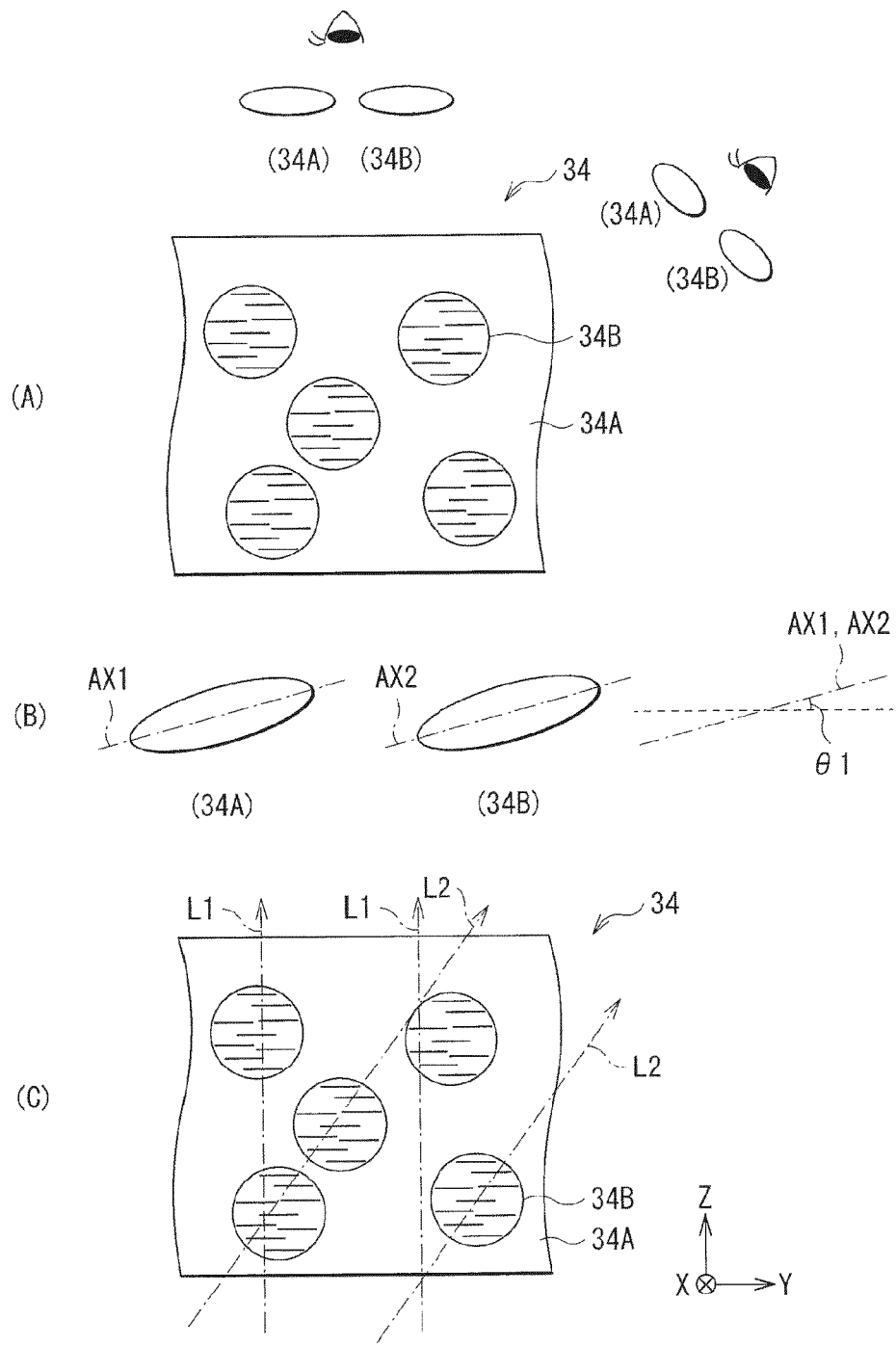
FIG. 6 is a diagram schematically illustrating an example of a function of a light modulation layer in FIG. 2.

FIG. 6A schematically illustrates an example of an alignment state in the microparticle 34B when no voltage is applied between the lower electrode 32 and the upper electrode 36. It is to be noted that description on an alignment state in the bulk 34A is omitted in FIG. 6A. FIG. 6B illustrates an example of refractive index ellipsoids that indicate refractive index anisotropy of the bulk 34A and the microparticles 34B when no voltage is applied between the lower electrode 32 and the upper electrode 36. This refractive index ellipsoid represents a refractive index of linearly-polarized light that is incident from various directions with the use of a tensor ellipsoid. By viewing a cross-section of the ellipsoid from the light incident direction, it is possible to know the refractive index geometrically. FIG. 6C schematically illustrates an example of a state in which light L1 that travels in a front direction and light L2 that travels in an oblique direction pass through the light modulation layer 34 when no voltage is applied between the lower electrode 32 and the upper electrode 36.

Figure 7:
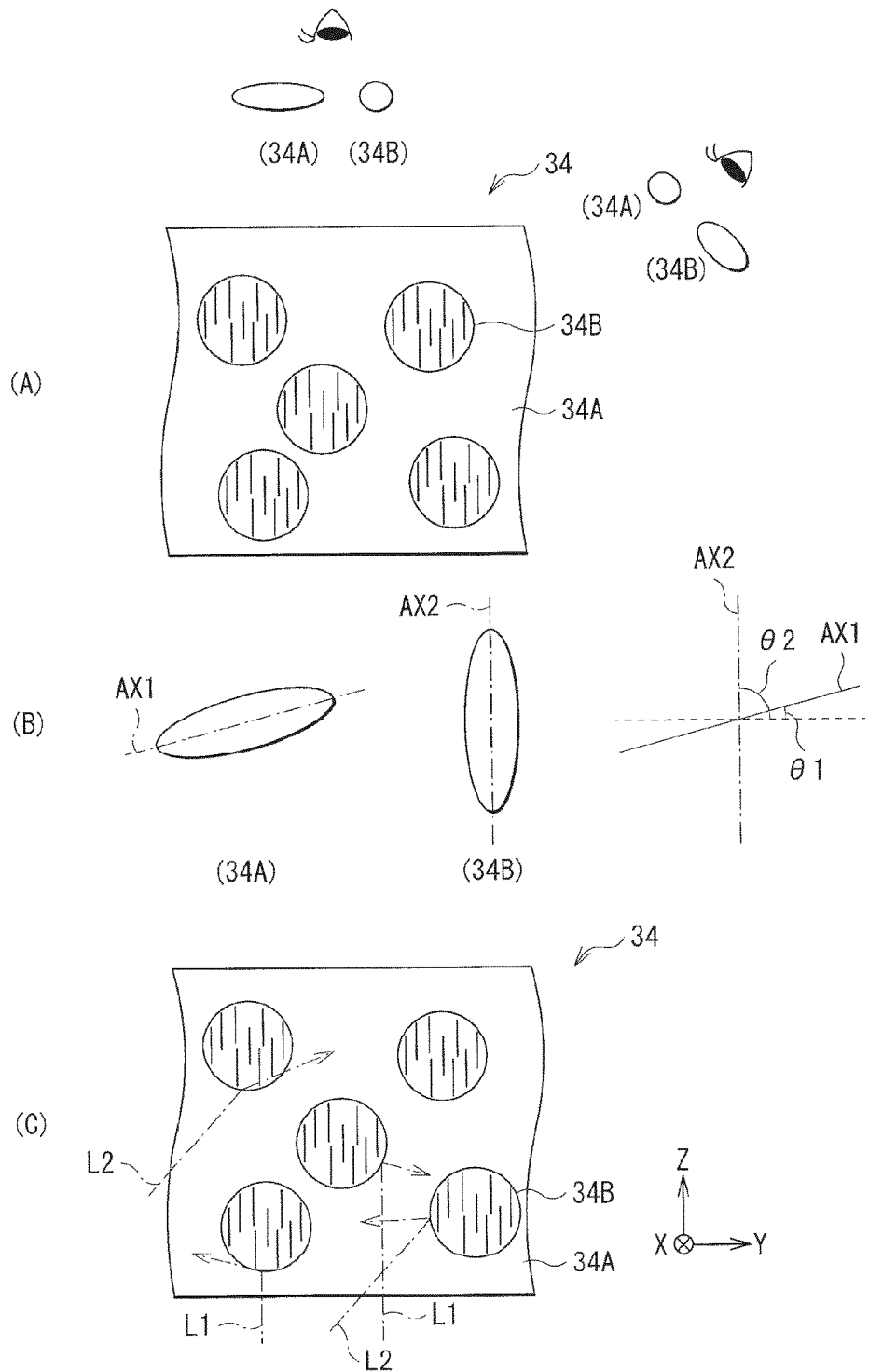
FIG. 7 is a diagram schematically illustrating another example of the function of the light modulation layer in FIG. 2.

FIG. 7A schematically illustrates an example of the alignment state in the microparticle 34B when a voltage is applied between the lower electrode 32 and the upper electrode 36. It is to be noted that description on the alignment state in the bulk 34A is omitted in FIG. 7A. FIG. 7B illustrates an example of the refractive index ellipsoids that indicate the refractive index anisotropy of the bulk 34A and the microparticles 34B when a voltage is applied between the lower electrode 32 and the upper electrode 36. FIG. 7C schematically illustrates an example of a state in which the light L1 that travels in the front direction and the light L2 that travels in the oblique direction are scattered at the light modulation layer 34 when a voltage is applied between the lower electrode 32 and the upper electrode 36.

The bulk 34A and the microparticle 34B may be configured, for example, to allow a direction of an optical axis AX1 of the bulk 34A and a direction of an optical axis AX2 of the microparticle 34B to coincide with (to be parallel to) each other when no voltage is applied between the lower electrode 32 and the upper electrode 36 as shown in FIG. 6A and FIG. 6B. It is to be noted that the optical axes AX1 and AX2 each indicate a line parallel to a traveling direction of a light ray that has one value of refractive index regardless of a polarization direction. Further, the directions of the optical axis AX1 and the optical axis AX2 may not necessarily coincide with each other, and the direction of the optical axis AX1 and the direction of the optical axis AX2 may be, for example, shifted in some degrees due to manufacturing error etc.

Further, the microparticle 34B may be configured, for example to allow the optical axis AX2 to be parallel to the light incident face 10A of the light guide plate 10 when no voltage is applied between the lower electrode 32 and the upper electrode 36. Further, the microparticle 34B may be configured, for example, to allow the optical axis AX2 to intersect with the surfaces of the transparent substrates 31 and 37 at a slight angle θ1 when no voltage is applied between the lower electrode 32 and the upper electrode 36 (see FIG. 6B). It is to be noted that detailed description will be provided on the angle θ1 when description will be provided on a material that configures the microparticle 34B.

On the other hand, the bulk 34A may be configured, for example, to allow the optical axis AX1 of the bulk 34A to be constant regardless of presence or absence of voltage application between the lower electrode 32 and the upper electrode 36. Specifically, as shown in FIG. 6A, FIG. 6B, FIG. 7A, and FIG. 7B, the bulk 34A may be configured, for example to allow the optical axis AX1 of the bulk 34A to be parallel to the light incident face 10A of the light guide plate 10 and to intersect with the surfaces of the transparent substrates 31 and 37 at the predetermined angle θ1. In other words, the optical axis AX1 of the bulk 34A is parallel to the optical axis AX2 of the microparticle 34B when no voltage is applied between the lower electrode 32 and the upper electrode 36.

It is to be noted that the optical axis AX2 may not necessarily be parallel to the light incident face 10A and intersect with the surfaces of the transparent substrates 31 and 37 at the angle θ1. For example, the optical axis AX2 may intersect with the surfaces of the transparent substrates 31 and 37 at an angle slightly different from the angle θ1 due to manufacturing error etc. Also, the optical axes AX1 and AX2 may not necessarily be parallel to the light incident face 10A. For example, the optical axes AX1 and AX2 may intersect with the light incident face 10A at a small angle due to manufacturing error, etc.

Here, ordinary refractive indices of the bulk 34A and the microparticle 34B may be preferably equal to each other, and extraordinary refractive indices of the bulk 34A and the microparticle 34B may be preferably equal to each other. In this case, for example, when no voltage is applied between the lower electrode 32 and the upper electrode 36, there is little refractive index difference in all directions including the front direction and the oblique direction as shown in FIG. 6A. Therefore, high transparent characteristics are obtainable. Accordingly, as shown in FIG. 6C, for example, the light L1 that travels in the front direction and the light L2 that travels in the oblique direction may not be scattered in the light modulation layer 34 and may pass through the light modulation layer 34. As a result, for example, as shown in FIG. 8A and FIG. 8B, the light L (light from the oblique direction) from the light source 20 may be totally reflected at an interface (the bottom face of the transparent substrate 31 and the top face of the light guide plate 10) of a transparent region (a transmission region 30A) in the light modulation layer 34, and luminance (luminance in black display) of the transmission region 30A may be decreased compared to that in a case where the entire face emits light uniformly (a dashed-dotted line in FIG. 8B). It is to be noted that a profile of front luminance in FIG. 8B is obtained by providing a diffusion sheet (not illustrated) on the light guide plate 10, and measuring the front luminance through the diffusion sheet.

It is to be noted that the top face (the light emitting face 10B in FIG. 8) of the light guide plate 10 that is one of interfaces in the transmission region 30A may be preferably in contact with a material that has a refractive index lower than a refractive index of the top face of the light guide plate 10. Such a material having a low refractive index may be typically air. Further, when the top face (the light emitting face 10B in FIG. 8) of the light guide plate 10 is adhered to the lens sheet 50, the material having the low refractive index that is in contact with the top face of the light guide plate 10 may be a sticking agent or an adhesive.

As shown in FIG. 7A and FIG. 7B, the bulk 34A and the microparticle 34B may be configured, for example, to allow the optical axis AX1 and the optical axis AX2 to have directions different from each other (to intersect with each other or to be almost orthogonal to each other) when a voltage is applied between the lower electrode 32 and the upper electrode 36. Further, the microparticle 34B may be configured, for example, to allow the optical axis AX2 of the microparticle 34B to be parallel to the light incident face 10A of the light guide plate 10 and to intersect with the surfaces of the transparent substrates 31 and 37 at an angle θ2 (for example, 90°) that is larger than the angle θ1 when a voltage is applied between the lower electrode 32 and the upper electrode 36. It is to be noted that detailed description will be given on the angle θ2 when description will be given on the material that configures the microparticle 34B.

Accordingly, when a voltage is applied between the lower electrode 32 and the upper electrode 36, the refractive index difference in all directions including the front direction and the oblique direction is large and high scattering characteristics are obtainable in the light modulation layer 34. Therefore, as shown in FIG. 7C, for example, the light L1 that travels in the front direction and the light L2 that travels in the oblique direction may be scattered in the light modulation layer 34. As a result, as shown in FIG. 8A, for example, the light L (the light from the oblique direction) from the light source 20 may pass through an interface (an interface between the air and the transparent substrate 31 or the light guide plate 10) in the scattering region 30B. Also, the light passed through to the reflective plate 40 side may be reflected by the reflective plate 40, and may pass through the light modulation device 30. Accordingly, luminance in the scattering region 30B is extremely increased compared to that in a case where the entire face emits light uniformly (the dashed-dotted line in FIG. 8B). In addition thereto, luminance in partial white display (an increase in luminance) is increased as luminance in the transmission region 30A is decreased.

It is to be noted that the ordinary refractive indices of the bulk 34A and the microparticle 34B may be, for example, shifted in some degrees due to manufacturing error etc. The ordinary refractive indices of the bulk 34A and the microparticle 34B may be preferably equal to or smaller than 0.1, and may be more preferably equal to or smaller than 0.05, for example. Further, also the extraordinary refractive indices of the bulk 34A and the microparticle 34B may be, for example, shifted in some degrees due to manufacturing error etc. The extraordinary refractive indices of the bulk 34A and the microparticle 34B may be preferably equal to or smaller than 0.1, and may be more preferably equal to or smaller than 0.05, for example.

Moreover, a refractive index difference of the bulk 34A ($\Delta n_P$=extraordinary refractive index $ne_P$–ordinary refractive index $no_P$), a refractive index difference of the microparticle 34B ($\Delta n_L$=extraordinary refractive index $ne_L$–ordinary refractive index $no_L$), etc. may be preferably as large as possible. The refractive index differences of the bulk 34A and the microparticle 34B may be preferably equal to or larger than 0.05, may be more preferably equal to or larger than 0.1, and may be further more preferably equal to or larger than 0.15. This is because, when the refractive index differences of the bulk 34A and the microparticle 34B are large, scattering performance of the light modulation layer 34 becomes high, light guide conditions are allowed to be easily broken, and light from the light guide plate 10 is easily extracted.

Moreover, the bulk 34A and the microparticle 34B have response speeds to electric filed that are different from each other. The bulk 34A may have, for example, a streaky structure, a porous structure, or a rod-like structure that has a response speed that is slower than the response speed of the microparticle 34B. The bulk 34A may be formed, for example, of a polymer material obtained by polymerizing low-molecular monomers. The bulk 34A may be, for example, formed by polymerizing, with the use of at least one of heat and light, a material (for example, a monomer) that has alignment characteristics and polymerization characteristics and is aligned in the alignment direction of the microparticle 34B or in the alignment directions of the alignment films 33 and 35.

The streaky structure, the porous structure, or the rod-like structure of the bulk 34A may have, for example, a major axis in a direction that is parallel to the light incident face 10A of the light guide plate 10 and intersects with the surfaces of the transparent substrates 31 and 37 at the slight angle θ1. When the bulk 34A has the streaky structure, an average streaky organization size in a minor-axis direction may be preferably from 0.1 μm to 10 μm both inclusive, and may be more preferably in a range from 0.2 μm to 2.0 μm both inclusive in terms of increase in scattering characteristics of the guided light. When the average streaky organization size in the minor-axis direction is from 0.1 μm to 10 μm both inclusive, the scattering performance in the light modulation device 30 becomes substantially equal in a visible range from 380 nm to 780 nm. Therefore, in a plane, it does not occur that only light having a specific wavelength component is increased or decreased. Therefore, balance in the visible range is allowed to be kept in the plane. When the average streaky organization size in the minor-axis direction is smaller than 0.1 μm, or is larger than 10 μm, the scattering performance of the light modulation device 30 is low regardless of wavelength, and the light modulation device 30 may be difficult to serve as the light modulation device.

Moreover, in terms of decreasing wavelength dependency of scattering, the average streaky organization size in the minor-axis direction may be preferably in a range from 0.5 μm to 5 μm both inclusive, and may be more preferably in a range from 1 μm to 3 μm. In such a case, when the light emitted from the light source 20 passes through the bulk 34 in the light modulation layer 30 repeatedly in a process during which the light emitted from the light source 20 propagates through the inside of the light guide plate 10, wavelength dependency of scattering of the bulk 34A is suppressed. The size of the streaky organization is observable with the use of a polarization microscope, a confocal microscope, an electron microscope, etc.

On the other hand, the microparticle 34B may be configured, for example, mainly including a liquid crystal material. The microparticle 34B may have a response speed that is sufficiently faster than the response speed of the bulk 34A. The liquid crystal material (a liquid crystal molecule) included in the microparticle 34B may be, for example, a rod-like molecule. As the liquid crystal molecule included in the microparticle 34B, a liquid crystal molecule that has positive dielectric constant anisotropy (a so-called positive liquid crystal) may be preferably used.

Here, when no voltage is applied between the lower electrode 32 and the upper electrode 36, in the microparticle 34B, a major-axis direction of the liquid crystal molecule is parallel to the optical axis AX1. At this time, the major axis of the liquid crystal molecule in the microparticle 34B is parallel to the light incident face 10A of the light guide plate 10 and intersects with the surfaces of the transparent substrates 31 and 37 at the slight angle θ1. In other words, when no voltage is applied between the lower electrode 32 and the upper electrode 36, the liquid crystal molecule in the microparticle 34B is aligned in a state tilted by the angle θ1 in a plane parallel to the light incident face 10A of the light guide plate 10. This angle θ1 is called a pre-tilt angle, and may be preferably in a range, for example, from 0.1° to 30° both inclusive. This angle θ1 may be more preferably in a range from 0.5° to 10° both inclusive, and may be further more preferably in a range from 0.7° to 2° both inclusive. When the angle θ1 is increased, efficiency of scattering is likely to be decreased because of a reason such as that described below. Further, when the angle θ1 is excessively decreased, an orientation angle at which the liquid crystal rises varies when a voltage is applied. For example, the liquid crystal may rise in a 180-degree opposite orientation direction in some cases (reverse tilt). Accordingly, the refractive index difference between the microparticle 34B and the bulk 34A is not allowed to be utilized efficiently. Therefore, scattering efficiency is likely to be decreased, and luminance is likely to be decreased.

Moreover, when a voltage is applied between the lower electrode 32 and the upper electrode 36, the major-axis direction of the liquid crystal molecule intersects with (or, is orthogonal to) the optical axis AX1 in the microparticle 34B. At this time, the major axis of the liquid crystal molecule in the microparticle 34B is parallel to the light incident face 10A of the light guide plate 10 and intersects with the surfaces of the transparent substrates 31 and 37 at the angle θ2 (for example, 90°) that is larger than the angle θ1. In other words, when a voltage is applied between the lower electrode 32 and the upper electrode 36, the liquid crystal molecule in the microparticle 34B is aligned in a state tilted by the angle θ2 in a plane parallel to the light incident face 10A of the light guide plate 10, or in a state standing straight at the angle θ2 (=90°).

As the above-described monomer that has alignment characteristics and polymerization characteristics, any material may be used as long as the material has optical anisotropy and is allowed to be composited with liquid crystal. However, in the present embodiment, a low-molecular monomer that is curable by ultraviolet rays may be preferable. It may be preferable that the direction of optical anisotropy of the liquid crystal coincide with that of a material (a polymer material) formed by polymerizing low-molecular monomers in a no voltage application state. Therefore, before curing by ultraviolet rays, the liquid crystal and the low-molecular monomer may be preferably aligned in the same direction. In a case where the liquid crystal is used as the microparticle 34B, when the liquid crystal is a rod-like molecule, the monomer material to be used may preferably have a rod-like shape. Accordingly, as the monomer material, a material that has both the polymerization characteristics and the liquid crystal characteristics may be preferably used. For example, it may be preferable to have, as a polymerizable functional group, at least one functional group selected from a group including an acrylate group, a methacrylate group, an acryloyloxy group, a methacryloyloxy group, a vinyl ether group, and an epoxy group. These functional groups are polymerizable by applying ultraviolet rays, infrared rays, or electron rays, or by heating. In order to suppress decrease in alignment degree at the time of application of ultraviolet rays, a liquid crystalline material that has a multi-functional group may be added. When the bulk 34A is configured to have the above-described streaky structure, it may be preferable to use a bi-functional liquid crystalline monomer as a raw material of the bulk 34A. Further, to the raw material of the bulk 34A, a mono-functional monomer may be added in order to adjust temperature at which liquid crystalline characteristics are exhibited, or three-or-more functional monomer may be added in order to improve crosslink density.

(Reflective Plate 40)

The reflective plate 40 returns light, leaked from the back of the light guide plate 10 through the light modulation device 30, toward the light guide plate 10. The reflective plate 40 may have, for example, functions such as reflection, diffusion, and scattering. This allows light emitted from the light source 20 to be utilized efficiently, and this also be a help for improvement in front luminance. The reflective plate 40 may be configured, for example, of foamed PET (polyethylene terephthalate), a silver-deposited film, a multi-layered reflective film, white PET, or the like. When the reflective plate 40 is configured to have a function of regular reflection (mirror reflection), the reflective plate 40 may be preferably configured, for example, of the silver-deposited film, the multi-layered reflective film, an aluminum-deposited film, etc. Further, the reflective plate 40 may be given a shape for reflecting light in a specific direction.

(Lens Sheet 50)

The lens sheet 50 narrows a divergence angle of light (illumination light) emitted from the top face of the light guide plate 10. For example, the lens sheet 50 may be so arranged above the light guide plate 10 that a gap is formed between a light incident face (the bottom face) of the lens sheet 50 and the light emitting face (the top face) of the light guide plate 10, as shown in FIG. 1. The gap is a layer filled with a material that has a refractive index that is lower than the refractive index of the light emitting face (the top face) of the light guide plate 10, and may be, for example, an air layer. It is to be noted that the gap may not necessarily be the air layer. The gap may be, for example, a layer filled with a sticking agent or an adhesive made of a material that has a refractive index that is lower than the refractive index of the light emitting face (the top face) of the light guide plate 10. Moreover, when a ridge direction (a Y-direction in FIG. 9) of the lens sheet 50 is parallel to a light-guiding direction (an X-direction in FIG. 8) of light, the gap may be a layer filled with a material that has a refractive index close to that of the light guide plate 10. In this case, the lens sheet 50 is stuck or adhered to the light emitting face (the top face) of the light guide plate 10 with the use of a sticking agent or an adhesive.

Figure 9:
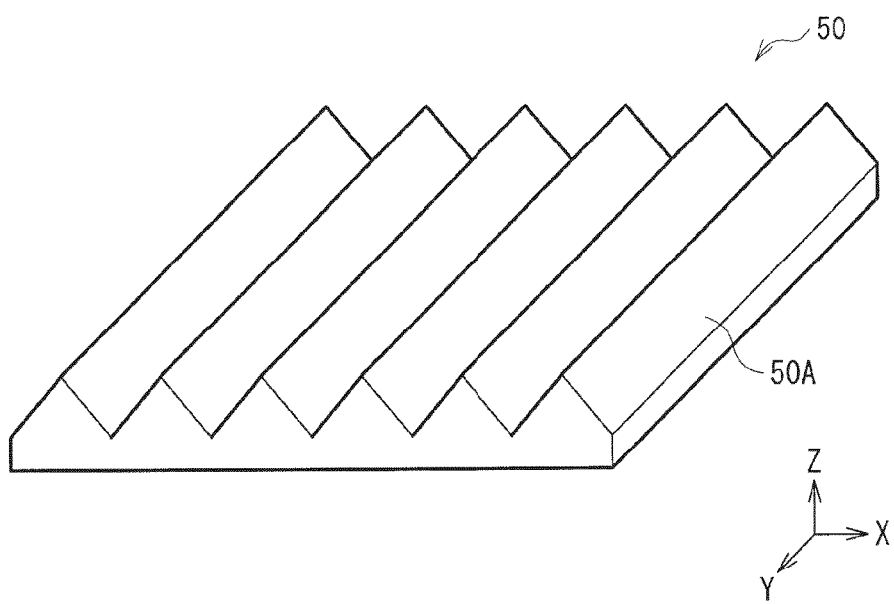
FIG. 9 is a diagram illustrating a perspective configuration example of a lens sheet in FIG. 1.
Figure 10:
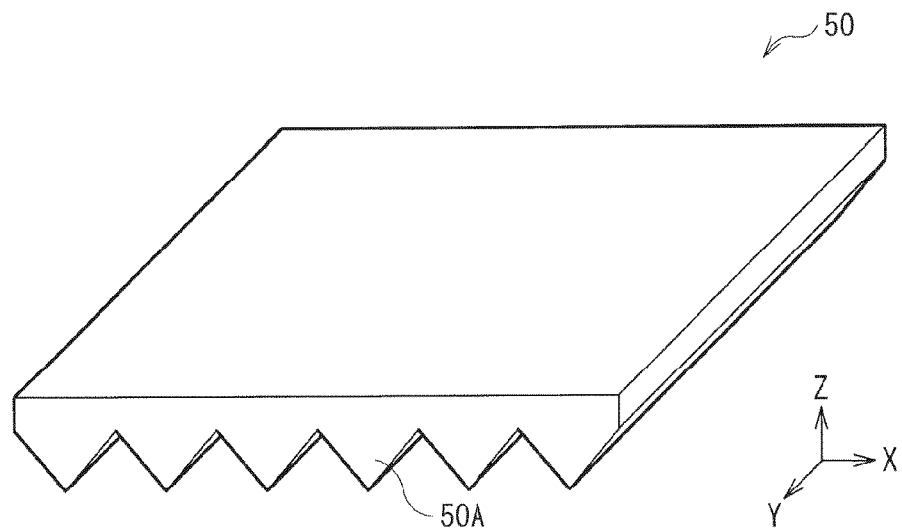
FIG. 10 is a diagram illustrating another example of the perspective configuration of the lens sheet in FIG. 1.

As shown in FIG. 9, the lens sheet 50 may have, for example, a concave-convex face in which a plurality of belt-like convex sections 50A are arranged side by side in a direction intersecting with an extending direction of the belt-like convex sections 50A. As shown in FIG. 9, the concave-convex face may be arranged on a light emission side of the lens sheet 50, for example. However, as shown in FIG. 10, the concave-convex face may be arranged on a light incident side (on the light modulation layer 34 side) of the lens sheet 50. When the concave-convex face is arranged on the light incident side of the lens sheet 50, light having a shallow angle out of the light emitted from the light guide plate 10 is allowed to be raised vertically. In this case, a cross-section of the belt-like convex section 50A may preferably have, for example, a triangular shape that has a base angle from 60° to 70°, and may more preferably have a triangular shape that has a base angle from 60° to 65°.

Further, in this case, the ridge direction of the belt-like convex section 50A may be preferably parallel to the arrangement of the lower electrode 32 (or the light modulation cell 30*a*). As shown in FIG. 9 and FIG. 10, a face, of the lens sheet 50, opposite from the concave-convex face may be, for example, a flat face. In this case, it is possible to directly adhere the flat face of the lens sheet 50 to the display panel with the use of a sticking agent or an adhesive. Further, when the belt-like convex section 50A is formed by UV curable resin, etc., the belt-like convex section 50A is allowed to be directly formed on the display panel. The lens sheet 50 may be so arranged that the above-described flat face is parallel or almost parallel to the top face of the light guide plate 10, for example.

The belt-like convex section 50A extends in a direction parallel to the extending direction of the lower electrode 32 (or the light modulation cell 30*a*). It is to be noted that, when the light modulation cell 30*a* is in a scattering state, the light modulation cell 30*a* is a linear scattering region. Therefore, it can be said that, in this case, the belt-like convex section 50A extends in a direction parallel to an extending direction of the linear scattering region. As shown in FIG. 9 and FIG. 10, the cross-section of the belt-like convex section 50A (the cross-section in a width direction of the belt-like convex section 50A) may have, for example, a triangular shape. It is to be noted that the cross-sectional shape of the belt-like convex section 50A may not necessarily be triangular, and may be polygonal. The belt-like convex section 50A has a convex shape that protrudes toward a side opposite from the side of the flat face of the lens sheet 50.

A pitch in the concave-convex face of the lens sheet 50 may be preferably as small as possible in terms of suppressing decrease in contrast to the minimum. It is to be noted that when the widths of the respective belt-like convex sections 50A are equal to one another, the pitch of the concave-convex face is equal to the pitch of the belt-like convex sections 50A. When the widths of the respective belt-like convex sections 50A are cyclically different, the pitch in the concave-convex face is equal to a cycle of the cyclic variation in width of the belt-like convex sections 50A.

The lens sheet 50 may be preferably configured of a material that has isotropic refractive index. The light emitted from the top face of the light guide plate 10 is polarized light. Therefore, for example, when it is preferable that the light emitted from the illumination unit 1 is polarized light in terms of improving luminance of the display panel, the light emitted from the top face of the light guide plate 10 may be utilized as emission light of the illumination unit 1 as it is. However, when the lens sheet 50 has a large phase difference, a polarization component of the light emitted from the illumination unit 1 may be varied by the lens sheet 50. Therefore, in terms of not varying the polarization component of the light emitted from the top face of the light guide plate 10, the lens sheet 50 may be preferably configured of the material that has isotropic refractive index.

(Drive Circuit 60)

For example, the drive circuit 60 may control a magnitude of a voltage to be applied to the pair of electrodes (the sub-electrode 32A and the upper electrode 36) in each light modulation cell 30-1 so as to allow the optical axis AX2 of the microparticle 34B to be parallel or almost parallel to the optical axis AX1 of the bulk 34A in one light modulation cell 30-1 and to allow the optical axis AX2 of the microparticle 34B to intersect or to be orthogonal to the optical axis AX1 of the bulk 34A in another light modulation cell 30-1. In other words, the drive circuit 60 is allowed to allow, through controlling an electric field, the directions of the optical axes AX1 and AX2 of the bulk 34A and the microparticle 34B to coincide with each other (or to almost coincide with each other) or to be different from each other (or to be orthogonal to each other).

When a signal that specifies three-dimensional display is inputted to the drive circuit 60 as a control signal 60A (in other words, in the three-dimensional display mode), the drive circuit 60 allows a plurality of linear illumination lights to be outputted from the light modulation device 30. Specifically, the drive circuit 60 applies a voltage, that allows the light modulation layer 34 to exhibit scattering characteristics, to a plurality of specific sub-electrodes 32B out of the plurality of sub-electrodes 32A, and the drive circuit 60 applies a voltage, that allows the light modulation layer 34 to exhibit transparent characteristics, to a plurality of sub-electrodes 32C other than the plurality of sub-electrodes 32B out of the plurality of sub-electrodes 32A. In other words, the drive circuit 60 controls the magnitude of the voltage to be applied to the pair of electrodes (the sub-electrode 32A and the upper electrode 36) in each light modulation cell 30-1 so as to allow the optical axis AX2 of the microparticle 34B to intersect with the optical axis AX1 of the bulk 34A in each light modulation cell 30*a* in the light modulation device 30, and to allow the optical axis AX2 of the microparticle 34B to be parallel to the optical axis AX1 of the bulk 34A in the light modulation cell 30*b* in the light modulation device 30. Thus, the drive circuit 60 generates the linear scattering region 30B in the light modulation cell 30*a* that includes the sub-electrode 32B, and generates the linear transmission region 30A in the light modulation cell 30*b* that includes the sub-electrode 32C. As a result, the drive circuit 60 allows linear illumination light to be outputted from the scattering region 30B.

Alternatively, when a signal that specifies two-dimensional display is inputted to the drive circuit 60 as the control signal 60A (in other words, in the two-dimensional display mode), the drive circuit 60 allows planar illumination light to be outputted from the light modulation device 30. Specifically, the drive circuit 60 applies a voltage, that allows the light modulation layer 34 to exhibit the scattering characteristics, to each sub-electrode 32A. In other words, the drive circuit 60 controls the magnitude of the voltage to be applied to the pair of electrodes (the sub-electrode 32A and the upper electrode 36) in each light modulation cell 30-1 so as to allow the optical axis AX2 of the microparticle 34B to intersect with or to be orthogonal to (or to be almost orthogonal to) the optical axis AX1 of the bulk 34A in all of the light modulation cells 30-1 included in the light modulation device 30. Thus, the drive circuit 60 generates the scattering region 30B in each light modulation cell 30-1. As a result, the drive circuit 60 allows planar illumination light to be outputted from the planar scattering region 30B.

Next, description will be given on functions and effects of the illumination unit 1 of the present embodiment.

Figure 8:
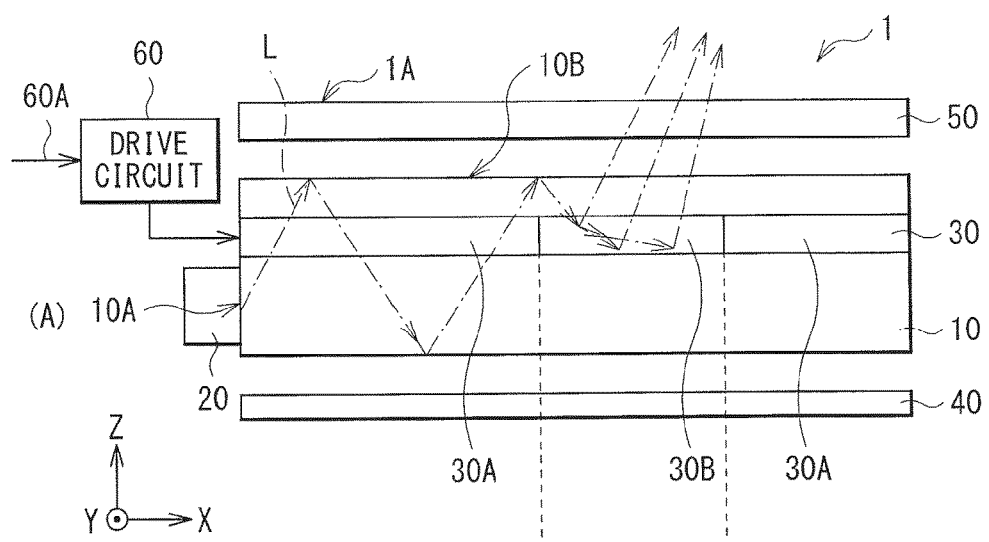
FIG. 8 is a diagram schematically illustrating an example of a function of the illumination unit in FIG. 1.
Figure 8:
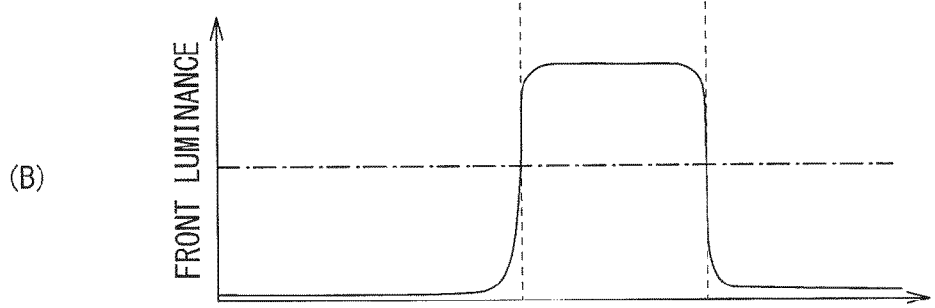

In the illumination unit 1 of the present embodiment, at the time of three-dimensional display, a voltage is applied to the pair of electrodes (the sub-electrode 32A and the upper electrode 36) in each light modulation cell 30-1 so as to allow the optical axis AX2 of the microparticle 34B to intersect with or to be orthogonal to the optical axis AX1 of the bulk 34A in each light modulation cell 30*a*, and to allow the optical axis AX2 of the microparticle 34B to be parallel or almost parallel to the optical axis AX1 of the bulk 34A in each light modulation cell 30*b*. Therefore, in the light modulation device 30, each light modulation cell 30*a* becomes the scattering region 30B, and each light modulation cell 30*b* becomes the transmission region 30A. As a result, light that has been emitted from the light source 20 and has entered inside the light guide plate 10 passes through the transmission region 30A in the light modulation device 30 and is scattered in the scattering region 30B in the light modulation device 30 (FIG. 8). Out of this scattered light, light that has passed through the bottom face of the scattering region 30B is reflected by the reflective plate 40, is returned to the light guide plate 10 again, and is emitted from the top face of the illumination unit 1. Further, out of the scattered light, light that has traveled toward the top face of the scattering region 30B passes through the light guide plate 10, and then, is emitted from the top face of the illumination unit 1. In such a manner, at the time of three-dimensional display, little light is emitted from the top face of the transmission region 30A, and the light is emitted from the top face of the scattering region 30B. Thus, for example, linear illumination light may be outputted in the front direction as shown in FIG. 8.

Moreover, in the illumination unit 1 of the present embodiment, at the time of two-dimensional display, a voltage is applied to the pair of electrodes (the sub-electrode 32A and the upper electrode 36) in each light modulation cell 30-1 so as to allow the optical axis AX2 of the microparticle 34B to intersect with or to be orthogonal to the optical axis AX1 of the bulk 34A in each light modulation cell 30-1. As a result, light that has been emitted from the light source 20 and has entered inside the light guide plate 10 is scattered in the scattering region 30B formed in the entire light modulation device 30. Out of this scattered light, light that has passed through the bottom face of the scattering region 30B is reflected by the reflective plate 40, is returned to the light guide plate 10 again, and is emitted from the top face of the illumination unit 1. Further, out of the scattered light, light that has traveled toward the top face of the scattering region 30B passes through the light guide plate 10, and then, is emitted from the top face of the illumination unit 1. In such a manner, at the time of two-dimensional display, for example, light may be emitted from the entire top face of the light modulation device 30, and planar illumination light may be outputted in the front direction.

Moreover, in the illumination unit 1 of the present embodiment, the lens sheet 50 that narrows the divergence angle of the illumination light is provided. Accordingly, luminance in the front direction is allowed to be increased compared to a case where the lens sheet 50 is not provided. As a result, for example, when the illumination unit 1 is used as the backlight of the display apparatus, it is possible to increase light amount of light that enters the display panel in the display apparatus at an angle from 0° to an appropriate viewing angle (for example, 15°). Therefore, high luminance is obtainable in a displayed image.

Next, description will be given on other effects of the illumination unit 1 of the present embodiment.

Generally, PDLC is formed by mixing a liquid crystal material and an isotropic low-molecular material, and causing phase separation by ultraviolet-ray application, drying of a solvent, etc., and is a composite layer in which microparticles made of the liquid crystal material is dispersed in a polymer material. The liquid crystal material in this composite layer is aligned in a random direction upon no voltage application, and therefore, exhibits scattering characteristics. However, the liquid crystal material is aligned in an electric-field direction upon voltage application. Therefore, when an ordinary refractive index of the liquid crystal material and a refractive index of the polymer material are equal to each other, high transparent characteristics are exhibited in the front direction (a normal direction of the PDLC). However, in this liquid crystal material, a difference between an extraordinary refractive index of the liquid crystal material and the refractive index of the polymer material is remarkable in an oblique direction. Therefore, even if the transparent characteristics are exhibited in the front direction, scattering characteristics are exhibited in the oblique direction.

Usually, a light modulation device that uses the PDLC often has a structure in which the PDLC is sandwiched between two glass plates that each have a transparent conductive film formed on a surface thereof. When light enters, obliquely from the air, the light modulation device that has a structure as described above, the light that has entered from the oblique direction is refracted due to a refractive index difference between the air and the glass plate, and enters the PDLC at a smaller angle. Therefore, large scattering is not caused in such a light modulation device. For example, when light enters from the air at an angle of 80°, an incident angle of the light with respect to the PDLC is decreased to about 40° due to the refraction at the glass interface.

However, in an edge-light scheme that uses a light guide plate, light enters through the light guide plate. Therefore, the light passes across the inside of the PDLC at a large angle of about 80°. Therefore, a difference between an extraordinary refractive index of the liquid crystal material and a refractive index of the polymer material is large, and further, the light passes across the inside of the PDLC at a larger angle. Therefore, a light path being scattered becomes longer. For example, when microparticles of a liquid crystal material that has an ordinary refractive index of 1.5 and an extraordinary refractive index of 1.65 are dispersed in a polymer material that has a refractive index of 1.5, there is no refractive index difference in the front direction (the normal direction of the PDLC), but the refractive index difference is increased in the oblique direction. Therefore, scattering characteristics in the oblique direction are not allowed to be decreased. Therefore, viewing-angle characteristics are bad. Moreover, when an optical film such as a diffusion film is provided on the light guide plate, the obliquely-leaked light is diffused also in the front direction by the diffusion film or the like. Therefore, leakage of light in the front direction is increased, and a modulation ratio in the front direction is decreased.

On the other hand, in the present embodiment, the bulk 34A and the microparticle 34B are formed mainly including optically-anisotropic material. Therefore, scattering characteristics are decreased and transparent characteristics are increased in the oblique direction. Directions of these optical axes coincide or almost coincide with each other, for example, in a region where the bulk 34A and the microparticle 34B are configured mainly including optically-anisotropic materials that have ordinary refractive indices equal to each other and also have extraordinary refractive indices equal to each other, and where no voltage is applied between the lower electrode 32 and the upper electrode 36. Accordingly, a refractive index difference is reduced or is eliminated in all directions including the front direction (the normal direction of the light modulation device 30) and the oblique direction. Thus, high transparent characteristics are obtained. As a result, it is possible to reduce or almost eliminate leakage of light in a range that has a large viewing angle. Therefore, it is possible to improve viewing-angle characteristics.

For example, when liquid crystal that has an ordinary refractive index of 1.5 and an extraordinary refractive index of 1.65 and liquid crystalline monomers that have an ordinary refractive index of 1.5 and an extraordinary refractive index of 1.65 are mixed and the liquid crystalline monomers are polymerized in a state where the liquid crystal and the liquid crystalline monomers are aligned by an alignment film or an electric field, the optical axis of the liquid crystal and the optical axis of polymer formed by polymerizing the liquid crystalline monomers coincide with each other. Thus, it is possible to allow refractive indices to coincide each other in any direction. Therefore, in such a case, a state with high transparent characteristics is achieved, and viewing-angle characteristics are allowed to be further improved.

Moreover, in the present embodiment, for example, as shown in FIG. 8A and FIG. 8B, luminance (luminance in black display) in the transmission region 30A is decreased compared to a case in which the entire face emits light uniformly (dashed-dotted line in FIG. 8B). On the other hand, luminance in the scattering region 30B is extremely high compared to the case in which the entire face emits light uniformly (dashed-dotted line in FIG. 8B). In addition thereto, luminance in partial white display (an increase in luminance) is increased as luminance in the transmission region 30A is decreased.

By the way, increase in luminance is a technology to increase luminance in a case where white display is partially performed compared to a case in which white display is performed in the entire face. This technology is, generally, often used in CRT, PDP, etc. However, in a liquid crystal display, the backlight as a whole emits light uniformly regardless of an image. Therefore, luminance is not allowed to be partially increased. When the backlight is configured of an LED backlight in which a plurality of LEDs are arranged two-dimensionally, it is possible to turn off the light of part of the LEDs. However, in such a case, diffusion light is eliminated from a dark region in which the light of the LEDs is turned off. Therefore, luminance is decreased compared to a case where light of all of the LEDs is turned on. Also, it is possible to increase luminance by increasing a current to be applied to the part of the LED the light of which is turned on. However, in such a case, a large current flows in an extremely-short time. Therefore, problems remain in terms of a load on a circuit, reliability, etc.

On the other hand, in the present embodiment, the bulk 34A and the microparticle 34B are formed mainly including optically-anisotropic materials. Therefore, scattering characteristics in the oblique direction are suppressed, and little light is leaked from the light guide plate in a dark state. Therefore, light is guided from a part in a partial dark state to a part in a partial bright state. Therefore, it is possible to achieve increase in luminance without increasing electric power to be supplied to the illumination unit 1.

Moreover, in the present embodiment, in a region where no voltage is applied between the lower electrode 32 and the upper electrode 36, the optical axis AX2 of the microparticle 34B is parallel to the light incident face 10A of the light guide plate 10, and intersects with the surfaces of the transparent substrates 31 and 37 at the slight angle $\theta 1$. In other words, the liquid crystal molecule included in the microparticle 34B is aligned in a state being tilted by the angle $\theta 1$ in a plane parallel to the light incident face 10A (in a state being provided with a pre-tilt angle). Therefore, when a voltage is applied between the lower electrode 32 and the upper electrode 36, the liquid crystal material included in the microparticle 34B does not rise in a random orientation direction, and rises in a plane parallel to the light incident face 10A. At this time, the optical axes AX1 and AX2 of the bulk 34A and the microparticle 34B intersect with or are orthogonal to each other in the plane parallel to the light incident face 10A. In this case, out of the light that has entered from the light incident face 10A of the light guide plate 10, light that oscillates perpendicularly to the transparent substrate 31 feels a difference between the extraordinary refractive index of the microparticle 34B and the ordinary refractive index of the bulk 34A. At this time, the difference between the extraordinary refractive index of the microparticle 34B and the ordinary refractive index of the bulk 34A is large. Therefore, scattering efficiency of the light that oscillates perpendicularly to the transparent substrate 31 is increased. On the other hand, light that oscillates parallel to the transparent substrate 31 feels a difference between the ordinary refractive index of the microparticle 34B and the extraordinary refractive index of the bulk 34A. At this time, the difference between the ordinary refractive index of the microparticle 34B and the extraordinary refractive index of the bulk 34A is also large. Therefore, scattering efficiency of the light that oscillates parallel to the transparent substrate 31 is increased. Therefore, light that propagates through the region in which a voltage is applied between the lower electrode 32 and the upper electrode 36 includes a lot of components in the oblique direction. For example, when an acrylic light guide plate is used as the light guide plate 10, light in a region where a voltage is applied between the lower electrode 32 and the upper electrode 36 propagates at an angle of 41.8° or larger. As a result, a refractive index difference is increased in all directions including the oblique direction, and high scattering characteristics are obtained. Therefore, display luminance is allowed to be improved. Moreover, display luminance is allowed to be further improved due to the above-described effect of increase in luminance.

By the way, for example, in a case where the liquid crystal material included in the microparticle 34B is configured to rise in a plane perpendicular to the light incident face 10A when the optical axes AX1 and AX2 of the bulk 34A and the microparticle 34B are arranged to be perpendicular to the light incident face 10A of the light guide plate 10 upon no voltage application and a voltage is applied between the lower electrode 32 and the upper electrode 36, the light that oscillates perpendicularly to the transparent substrate 31 feels the difference between the extraordinary refractive index of the microparticle 34B and the ordinary refractive index of the bulk 34A as in the above-described case. However, the light that oscillates in the direction parallel to the transparent substrate 31 feels the difference between the ordinary refractive index of the microparticle 34B and the ordinary refractive index of the bulk 34A. Here, there is almost no or no difference between the ordinary refractive index of the microparticle 34B and the ordinary refractive index of the bulk 34A. Therefore, out of the light that has entered from the light incident face 10A, the light that oscillates perpendicularly to the transparent substrate 31 feels a large refractive index difference as in the above-described case. However, the light that oscillates in the direction parallel to the transparent substrate 31 feels almost no or no refractive index difference. As a result, scattering efficiency of the light that oscillates perpendicularly to the transparent substrate 31 is increased. However, scattering efficiency of the light that oscillates parallel to the transparent substrate 31 is low or is zero. Therefore, when the optical axes AX1 and AX2 are arranged to be perpendicular to the light incident face 10A, scattering efficiency is lower than that in a case where the optical axes AX1 and AX2 are arranged to be parallel to the light incident face 10A. Therefore, luminance that is allowed to be extracted from the light guide plate 10 is lower than that in the light modulation device 30 in the present embodiment.

Accordingly, in the present embodiment, it is possible to improve display luminance while reducing or almost eliminating leakage of light in the range with large viewing angle. As a result, it is possible to increase a modulation ratio in the front direction.

2. Second Embodiment

Figure 11:
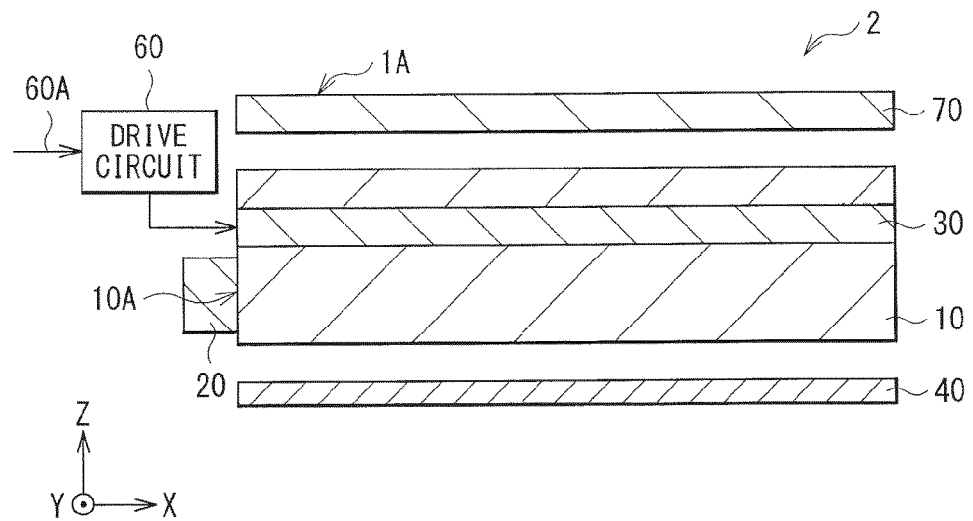
FIG. 11 is a diagram illustrating a cross-sectional configuration example of an illumination unit according to a second embodiment of the present technology.

FIG. 11 illustrates a cross-sectional configuration of an illumination unit 2 according to a second embodiment of the present technology. This illumination unit 2 is applicable as a backlight of a display apparatus, and is capable of outputting planar illumination light or a plurality of linear illumination lights as illumination light, as with the illumination unit 1 according to the above-described embodiment. The illumination unit 2 may include, for example, the light guide plate 10, the light source 20, the light modulation device 30, the reflective plate 40, the drive circuit 60, and a lens sheet 70. The lens sheet 70 is arranged above the light guide plate 10. In other words, the illumination unit 2 corresponds to that in which the lens sheet 70 is provided instead of the lens sheet 50 in the illumination unit 1 according to the above-described first embodiment. It is to be noted that the lens sheet 70 corresponds to a specific example of "lens sheet" in the present technology.

Figure 12:
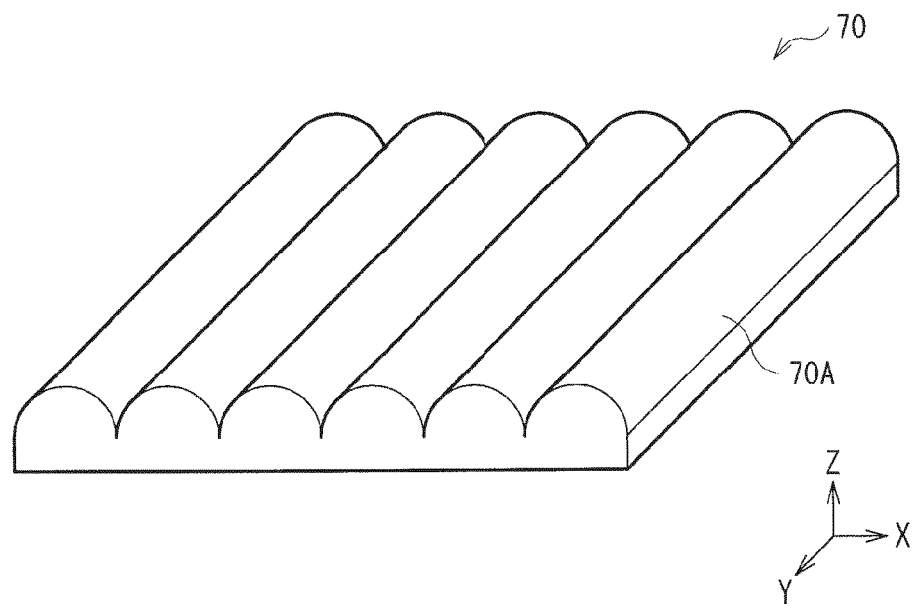
FIG. 12 is a diagram illustrating a perspective configuration example of a lens sheet in FIG. 11.

FIG. 12 illustrates a perspective configuration example of the lens sheet 70. The lens sheet 70 narrows the divergence angle of light (illumination light) emitted from the top face of the light guide plate 10. As shown in FIG. 11, for example, the lens sheet 70 may be arranged above the light guide plate 10 so that a gap is formed between a light incident face (a bottom face) of the lens sheet 70 and the light emitting face (the top face) of the light guide plate 10. As in the above-described embodiment, the gap is a layer filled with a material that has a refractive index that is lower than the refractive index of the light emitting face (the top face) of the light guide plate 10, and may be, for example, an air layer. It is to be noted that the gap may not necessarily be the air layer. The gap may be, for example, a layer filled with a sticking agent or an adhesive made of a material that has a refractive index that is lower than the refractive index of the light emitting face (the top face) of the light guide plate 10. Moreover, when a ridge direction (a Y-direction in FIG. 12) of the lens sheet 70 is parallel to a light-guiding direction (an X-direction in FIG. 11) of light, the gap may be a layer filled with a material that has a refractive index close to that of the light guide plate 10. In this case, the lens sheet 70 is stuck or adhered to the light emitting face (the top face) of the light guide plate 10 with the use of a sticking agent or an adhesive.

Figure 13:
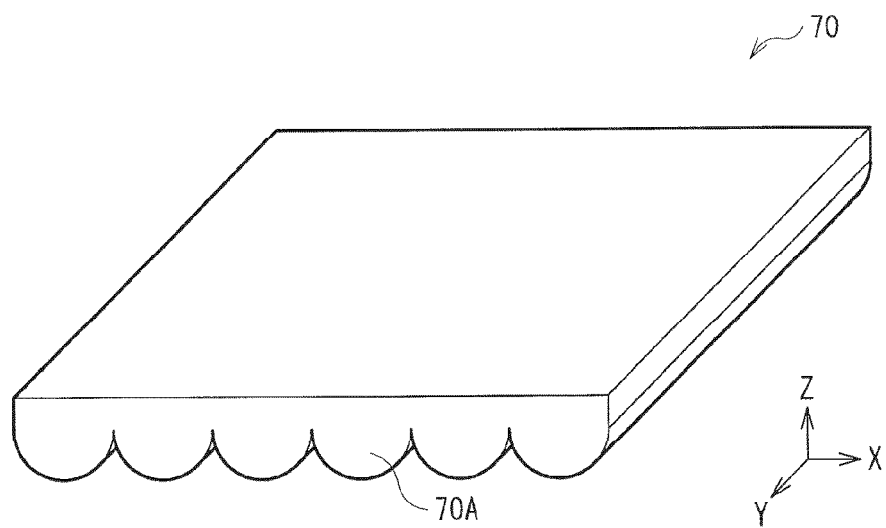
FIG. 13 is a diagram illustrating a first modification of the perspective configuration of the lens sheet in FIG. 11.

As shown in FIG. 12, the lens sheet 70 may have, for example, a concave-convex face in which a plurality of belt-like convex sections 70A are arranged side by side in a direction intersecting with an extending direction of those belt-like convex sections 70A. For example, the concave-convex face may be arranged on a light emission side of the lens sheet 70 as shown in FIG. 12, or the concave-convex face may be arranged on a light incident side of the lens sheet 70 as shown in FIG. 13. However, the concave-convex face is allowed to be closer to the top face of the light guide plate 10 in the case where the concave-convex face is arranged on the light incident side of the lens sheet 70. Accordingly, degree of freedom in design of the thicknesses of the light guide plate 10, the transparent substrate 37, etc. is allowed to be increased due to the thickness of the base that configures the lens sheet 70. As shown in FIG. 12 and FIG. 13, a face, of the lens sheet 70, opposite from the concave-convex face may be, for example, a flat face. In this case, it is possible to directly adhere the flat face of the lens sheet 70 to the display panel with the use of a sticking agent or an adhesive. Further, when the belt-like convex section 70A is formed of UV curable resin, etc., the belt-like convex section 70A is also allowed to be directly formed on the display panel. The lens sheet 70 may be so arranged that the above-described flat face is parallel or almost parallel to the top face of the light guide plate 10, for example.

Figure 14:
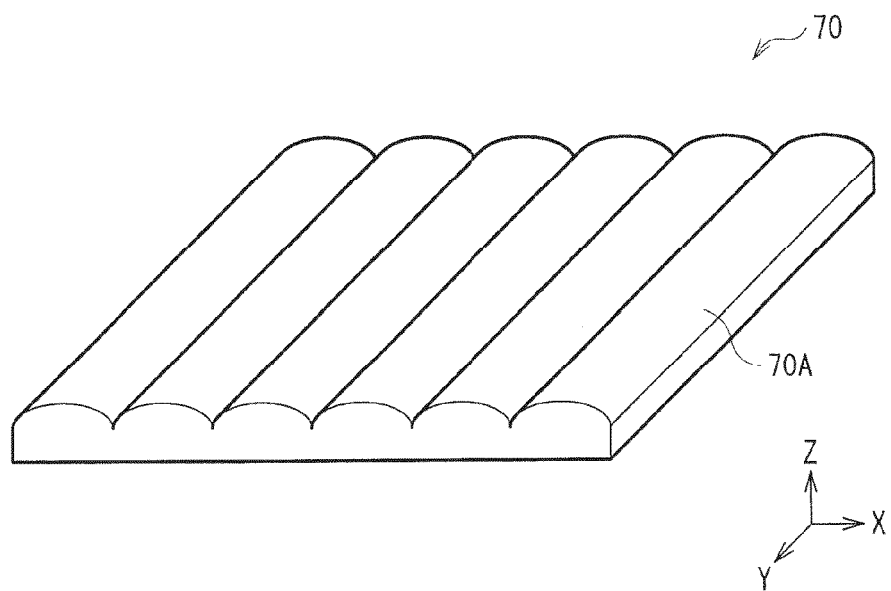
FIG. 14 is a diagram illustrating a second modification of the perspective configuration of the lens sheet in FIG. 11.
Figure 15:
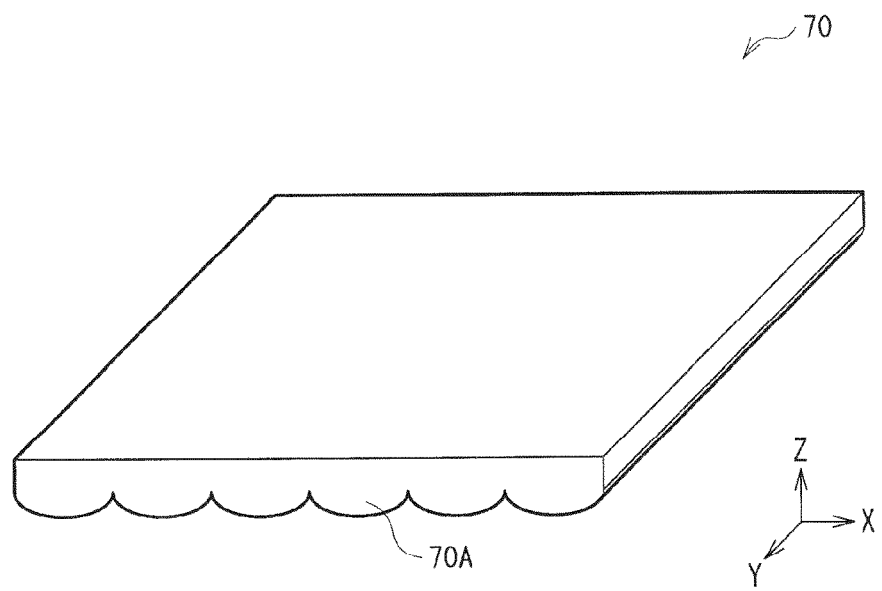
FIG. 15 is a diagram illustrating a third modification of the perspective configuration of the lens sheet in FIG. 11.

The belt-like convex section 70A extends in a direction parallel to the extending direction of the lower electrode 32 (or the light modulation cell 30a). It is to be noted that, when the light modulation cell 30a is in a scattering state, the light modulation cell 30a is a linear scattering region. Therefore, it can also be said that, in this case, the belt-like convex section 70A extends in a direction parallel to an extending direction of the linear scattering region. As shown in FIG. 12 and FIG. 13, the cross-section of the belt-like convex section 70A (the cross-section in a width direction of the belt-like convex section 70A) may have, for example, a cylindrical shape. The cylindrical shape does not utilize reflection as in the case of the triangular shape. Therefore, the cylindrical shape is a shape that is capable of increasing front luminance while suppressing decrease in contrast to the minimum. As the cylindrical shape, for example, a circular shape as shown in FIG. 12 and FIG. 13, an aspherical shape as shown in FIG. 14 and FIG. 15, etc. may be mentioned. When the cross-section of the belt-like convex section 70A has the aspherical shape, it is possible to increase a focal length of the belt-like convex section 70A. Accordingly, a distance between the light modulation cell 30a and the belt-like convex section 70A is allowed to be increased as the focal length of the belt-like convex section 70A is increased. Therefore, it is possible to increase degree of freedom in design of the thicknesses of the light guide plate 10, the transparent substrate 37, etc. The belt-like convex section 70A has a convex shape that protrudes toward a side opposite from the side of the flat face of the lens sheet 70. It is to be noted that FIG. 14 is a perspective configuration example in a case where the belt-like convex section 70A is arranged on the light emission side of the lens sheet 70, and FIG. 15 is a perspective configuration example in a case where the belt-like convex section 70A is arranged on the light incident side of the lens sheet 70.

It is to be noted that, in a case where an end portion of the cross-section has a circular shape, the shape of the end portion corresponds to a shape in a case where k=0 is established in a conic surface shown below. Alternatively, in a case where the end portion of the cross-section has an elliptical shape, the shape of the end portion corresponds to a shape in a case where −1<k<0 is established in the conic surface shown below. Alternatively, in a case where the end portion of the cross-section has a parabolic shape, the shape of the end portion corresponds to a shape in a case where k=−1 is established in the conic surface shown below. Alternatively, in a case where the end portion of the cross-section has a hyperbolic shape, the shape of the end portion corresponds to a shape in a case where k<−1 is established in the conic surface shown below. It is to be noted that, in order to keep the distance between the belt-like convex section 70A and the light modulation cell 30a to be long, and to achieve improvement in front luminance and suppression in decrease in contrast, −40<k<0 may be preferably established, and −30<k<−4 may be more preferably established.

$$y = \frac{x^2}{R + \sqrt{R^2 - (1+k)x^2}}$$

FIG. 16 to FIG. 23 illustrate cross-sectional configuration examples of the lens sheet 70 together with the light guide plate 10 and the light modulation device 30. FIG. 16 to FIG. 19 illustrate examples of the belt-like convex section 70A that has a cross-section of a circular shape. On the other hand, FIG. 20 to FIG. 23 illustrate examples of the belt-like convex section 70A that has a cross-section of an aspherical shape.

A pitch in the concave-convex face of the lens sheet 70 may be preferably P1/n (n=1, 2, . . . ) in terms of improvement in front luminance, where P1 is a pitch of the pitch of the sub-electrodes 32B (the width of the light modulation cell 30a). It is to be noted that, when the widths of the respective belt-like convex sections 70A are equal to one another, the pitch in the concave-convex face is equal to the pitch of the belt-like convex sections 70A. When the widths of the respective belt-like convex sections 70A are cyclically different, the pitch in the concave-convex face is equal to a cycle of the cyclic variation in widths of the belt-like convex sections 70A.

Here, at the time of three-dimensional display, the pitch in the concave-convex face may be preferably P1/n (n=1, 2, . . . , N) in terms of further increasing the front luminance, where the number of images perceived three-dimensionally including reverse vision is the number of perspectives N. Further, the pitch in the concave-convex face may be more preferably P1/n (n=1, . . . , m, N), where m is a divisor of the number of perspectives N. Moreover, in terms of eliminating or reducing as much as possible decrease in contrast resulting from the provision of the lens sheet 70, the pitch in the concave-convex face may be preferably P1/n (n=M, N), and may be more preferably P1/N, where M is a greatest divisor (except for N) of the number of perspectives N.

Figure 16:
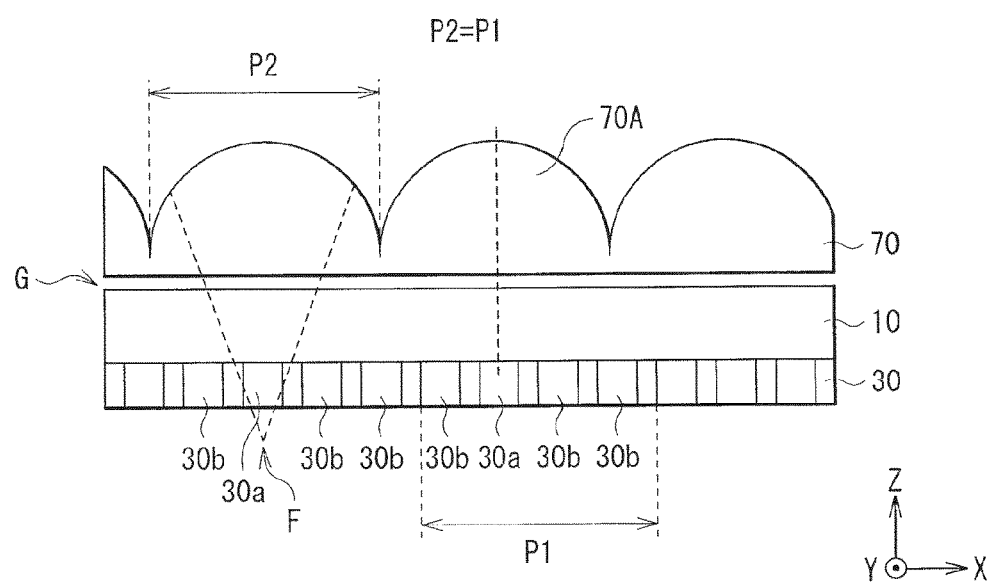
FIG. 16 is a diagram illustrating a cross-sectional configuration example of a lens sheet in FIG. 12 together with a light guide plate and a light modulation device.
Figure 17:
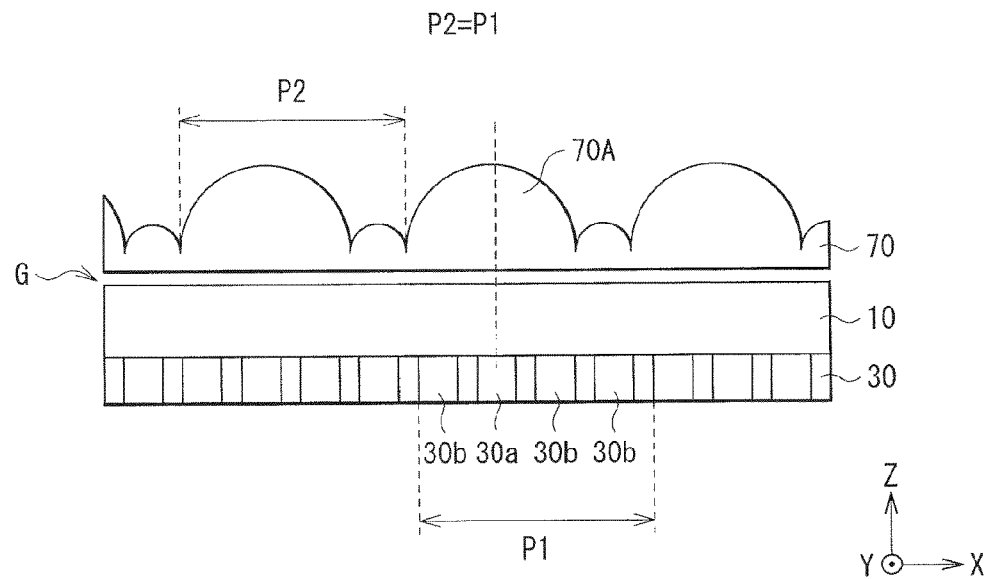
FIG. 17 is a diagram illustrating a first modification of the cross-sectional configuration of the lens sheet in FIG. 12 together with the light guide plate and the light modulation device.
Figure 20:
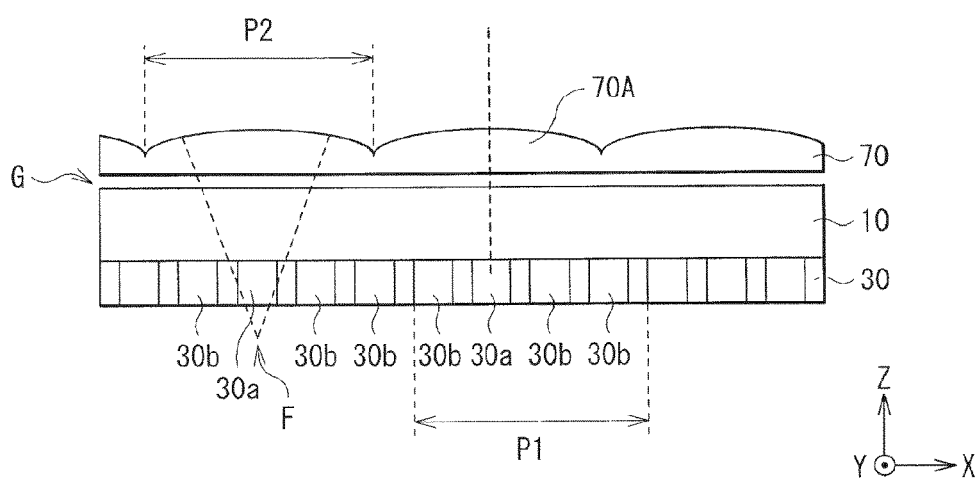
FIG. 20 is a diagram illustrating a cross-sectional configuration example of a lens sheet in FIG. 14 together with the light guide plate and the light modulation device.
Figure 21:
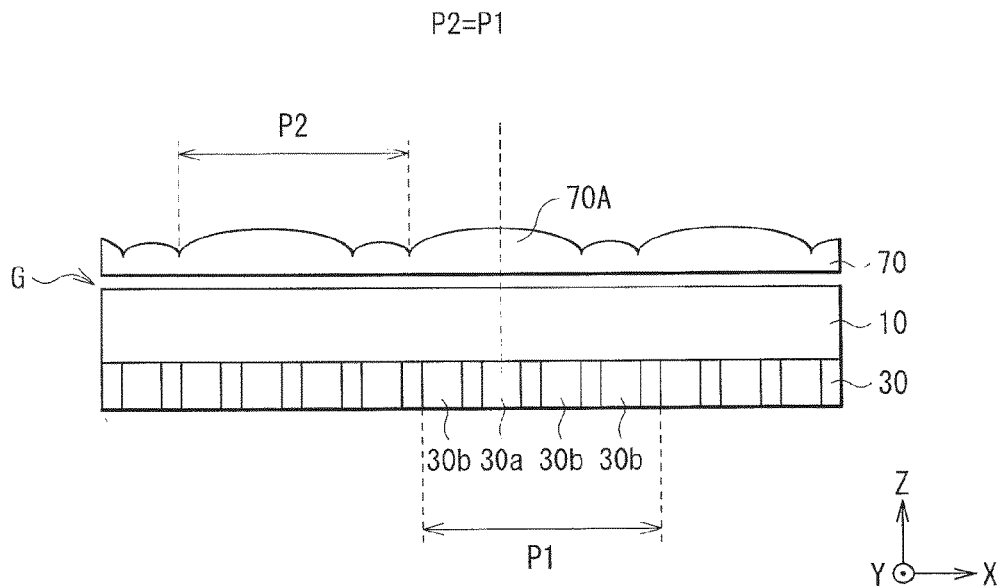
FIG. 21 is a diagram illustrating a first modification of the cross-sectional configuration of the lens sheet in FIG. 14 together with the light guide plate and the light modulation device.

The pitch P2 in the concave-convex face may be, for example, P1 as shown in FIGS. 16 and 20. It is to be noted that the widths of the respective belt-like convex sections 70A may not be necessarily equal to one another. As shown in FIGS. 17 and 21, for example, the belt-like convex sections 70A that have wide widths and the belt-like convex sections 70A that have narrow widths may be arranged alternately. At this time, the belt-like convex section 70A that has a wide width may be preferably arranged in a position that faces the light modulation cell 30a. It is to be noted that, when the belt-like convex sections 70A that have wide widths and the belt-like convex sections 70A that have narrow widths are arranged alternately, the pitch P2 in the concave-convex face may not be necessarily P1 at all time, and may be P1/n (n=2, . . . )

Figure 18:
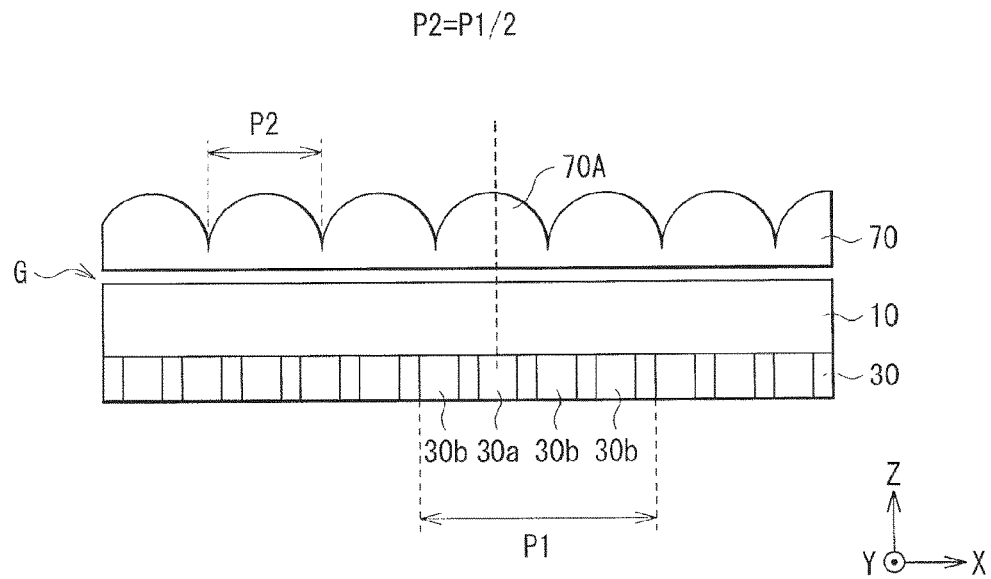
FIG. 18 is a diagram illustrating a second modification of the cross-sectional configuration of the lens sheet in FIG. 12 together with the light guide plate and the light modulation device.
Figure 19:
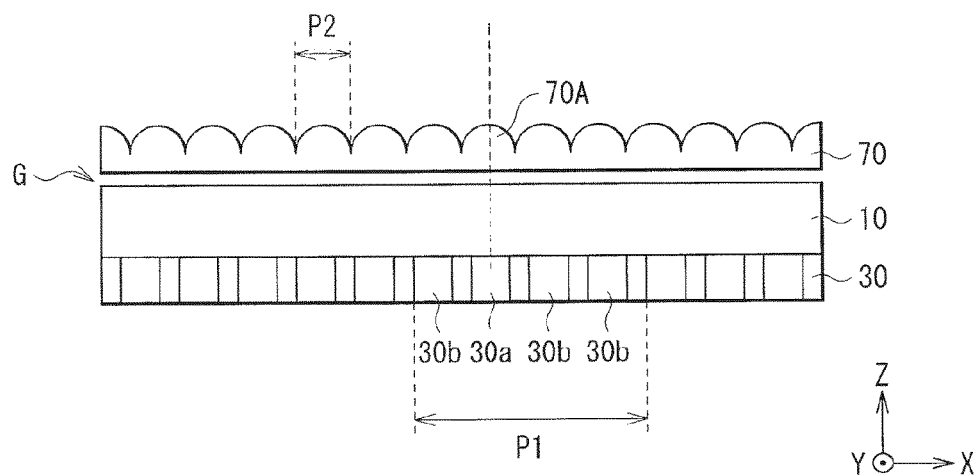
FIG. 19 is a diagram illustrating a third modification of the cross-sectional configuration of the lens sheet in FIG. 12 together with the light guide plate and the light modulation device.
Figure 22:
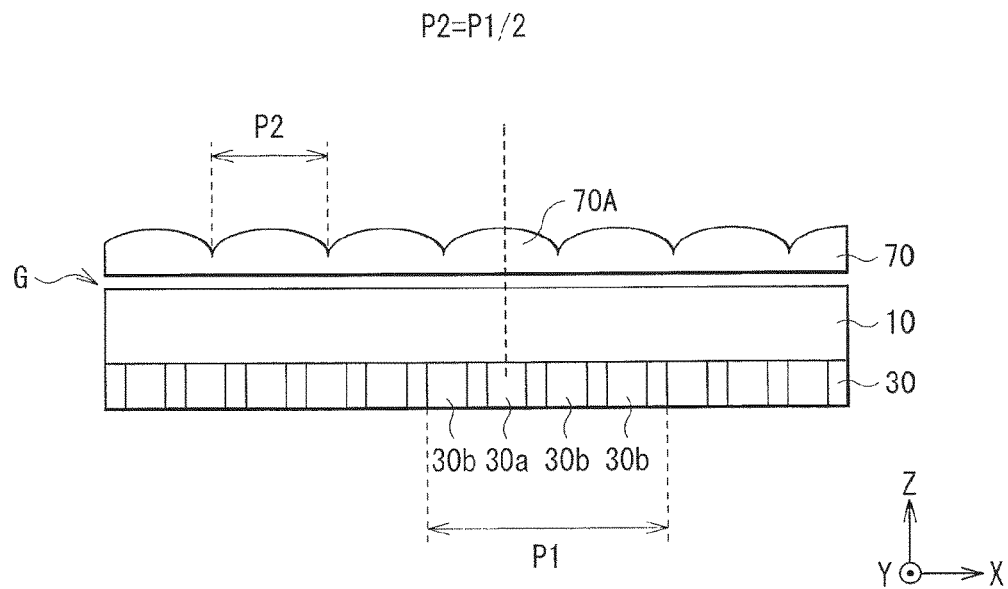
FIG. 22 is a diagram illustrating a second modification of the cross-sectional configuration of the lens sheet in FIG. 14 together with the light guide plate and the light modulation device.
Figure 23:
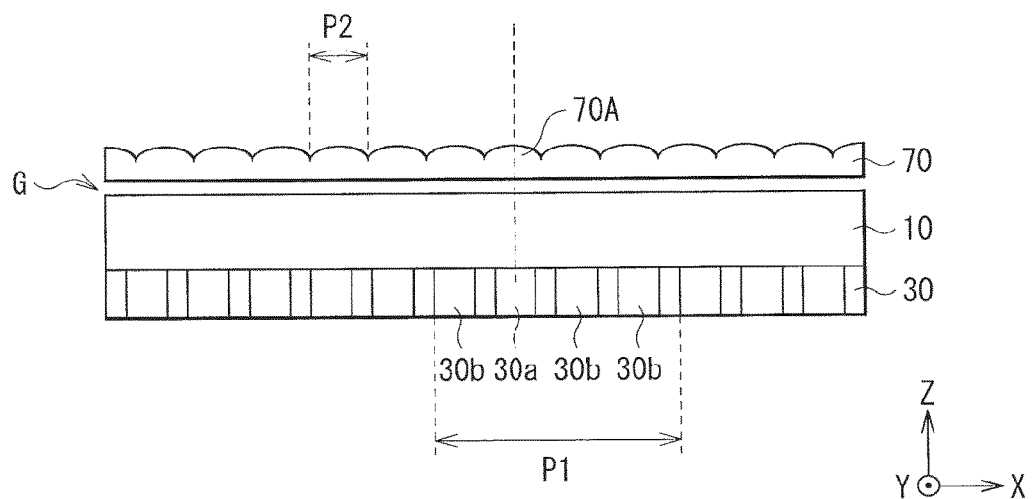
FIG. 23 is a diagram illustrating a third modification of the cross-sectional configuration of the lens sheet in FIG. 14 together with the light guide plate and the light modulation device.

Moreover, when the sub-electrode group is configured of one sub-electrode 32B and three sub-electrodes 32C (when the number of perspectives at the time of three-dimensional display is 4), the pitch P2 in the concave-convex face may be, for example, P½ as shown in FIGS. 18 and 22, or may be, for example, P¼ as shown in FIGS. 19 and 23.

A radius R of the belt-like convex section 70A may preferably satisfy P1/N×0.6<R<P1/N×1.4 where P1 is the pitch of the light modulation cells 30a (portions that may be the linear scattering regions), and N is the number of three-dimensional perspectives. Further, the radius R of the belt-like convex section 70A may more preferably satisfy P1/N×0.8<R<P1/N×1.2.

The belt-like convex section 70A is arranged so that the middle of that belt-like convex section 70A in a width direction faces the light modulation cell 30a (a portion that may be the linear scattering region). The belt-like convex section 70A may be preferably arranged so that the middle of that belt-like convex section 70A in the width direction faces the middle of the light modulation cell 30a in the width direction. Further, the distance Lz between the belt-like convex section 70A and the light modulation cell 30a may preferably satisfy 0<Lz<R/(n2(n1−1))×1.4, where R is the curvature radius of the belt-like convex section 70A, n1 is a refractive index of the belt-like convex section 70A, and n2 is a refractive index between the belt-like convex section 70A and the light modulation cell 30a. Further, the distance Lz may more preferably satisfy R/(n2(n1−1))×0.7<Lz<R/(n2(n1−1))×1.2. In such cases, luminance in the front direction is increased compared to that in a case where the distance Lz between the belt-like convex section 70A and the light modulation cell 30a is positioned in farther places than the above-described range.

The lens sheet 70 may be preferably configured of a material that has isotropic refractive index. The light emitted from the top face of the light guide plate 10 is polarized light that has a polarization axis in a direction parallel to the optical axis AX1 of the bulk 34 that has low electric field responsiveness. Therefore, for example, when it is preferable that the light emitted from the illumination unit 2 is polarized light in terms of improving luminance of the display panel, the light emitted from the top face of the light guide plate 10 may be utilized as emission light of the illumination unit 2 as it is without varying polarization. However, when the lens sheet 70 has a large phase difference, a polarization component of the light emitted from the illumination unit 2 may be varied by the lens sheet 70. Therefore, in terms of not varying the polarization component of the light emitted from the top face of the light guide plate 10, the lens sheet 70 may be preferably configured of the material that has isotropic refractive index.

Next, description will be given on effects of the illumination unit 2 of the present embodiment. In the illumination unit 2 of the present embodiment, the lens sheet 70 that narrows the divergence angle of the illumination light is provided. Accordingly, luminance in the front direction is allowed to be increased compared to a case where the lens sheet 70 is not provided. As a result, for example, when the illumination unit 2 is used as the backlight of the display apparatus, it is possible to increase light amount of light that enters the display panel in the display apparatus at an angle from 0° to an appropriate viewing angle (for example, 15°). Therefore, high luminance is obtainable in a displayed image.

3. Modifications of Above-Described Respective Embodiments

Modification 1

Figure 24:
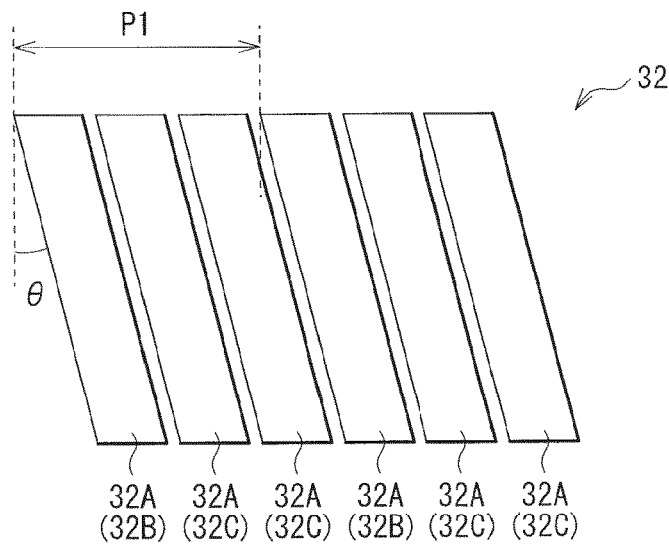
FIG. 24 is a diagram illustrating a first modification of the electrode in FIG. 2.

In the above-described respective embodiments, the case in which each sub-electrode 32A extends in the direction parallel to the light incident face 10A has been described as an example. However, as shown in FIG. 24, for example, each sub-electrode 32A may extend in a direction obliquely intersecting with the light incident face 10A. In this case, the extending direction of each sub-electrode 32A may preferably extend in a direction intersecting with the arrangement direction of the pixels in the display panel 210 which will be described later (see FIG. 70 which will be described later). In such a case, it is possible to reduce a difference between resolution in a direction parallel to a normal to the light incident face 10A and resolution in the direction parallel to the light incident face 10A at the time of three-dimensional display.

Modification 2

Figure 25:
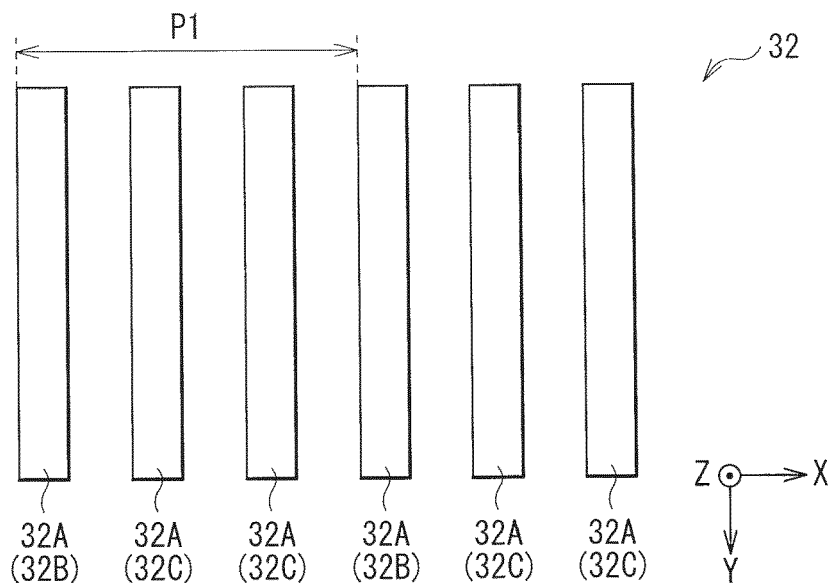
FIG. 25 is a diagram illustrating a second modification of the electrode in FIG. 2.
Figure 26:
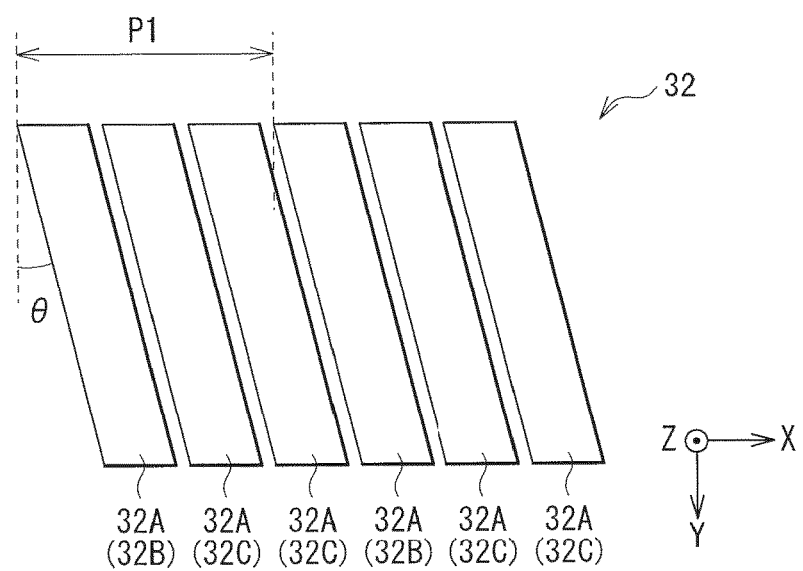
FIG. 26 is a diagram illustrating a third modification of the electrode in FIG. 2.

Moreover, in the above-described respective embodiments and Modification 1, for example, the width of the sub-electrode 32A may be small as shown in FIG. 25 and FIG. 26. For example, when the sub-electrode group is configured of one sub-electrode 32B and three sub-electrodes 32C (when the number of perspectives at the time of three-dimensional display is 4), the width of the sub-electrode 32A may be equal to or smaller than $P^{1}/_{20}$ ($=P1\times(\frac{1}{4})\times(\frac{1}{5})$). In such a case, a width of light emission line (a width of the scattering region) in the illumination unit 1 or 2 becomes small. As a result, when the illumination unit 1 or 2 is used as the backlight of the display apparatus, double images formed in the front direction of the display apparatus is allowed to be less likely to be seen at the time of three-dimensional display. Moreover, when the width of the sub-electrode 32A is small, a rate of light condensing by the lens is increased, and therefore, front luminance is allowed to be increased.

Modification 3

Figure 27:
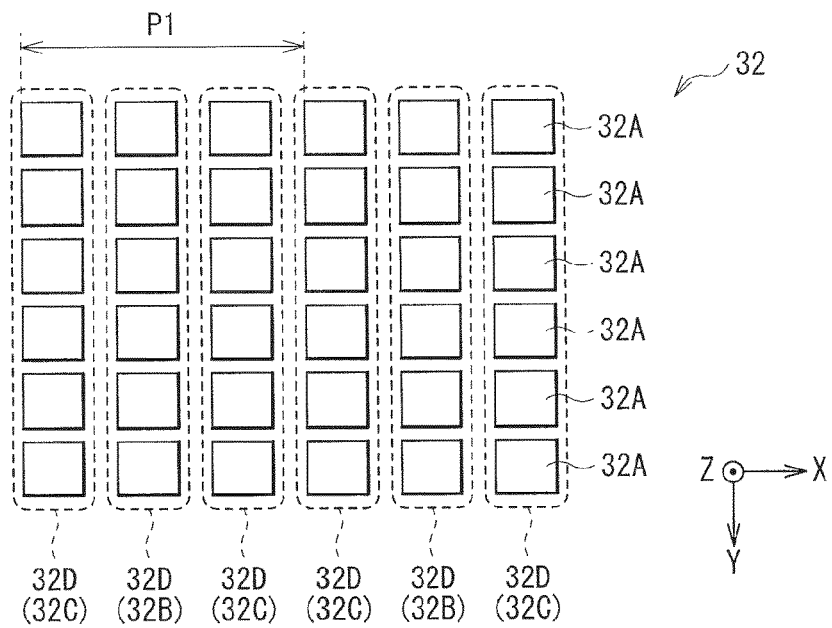
FIG. 27 is a diagram illustrating a fourth modification of the electrode in FIG. 2.
Figure 28:
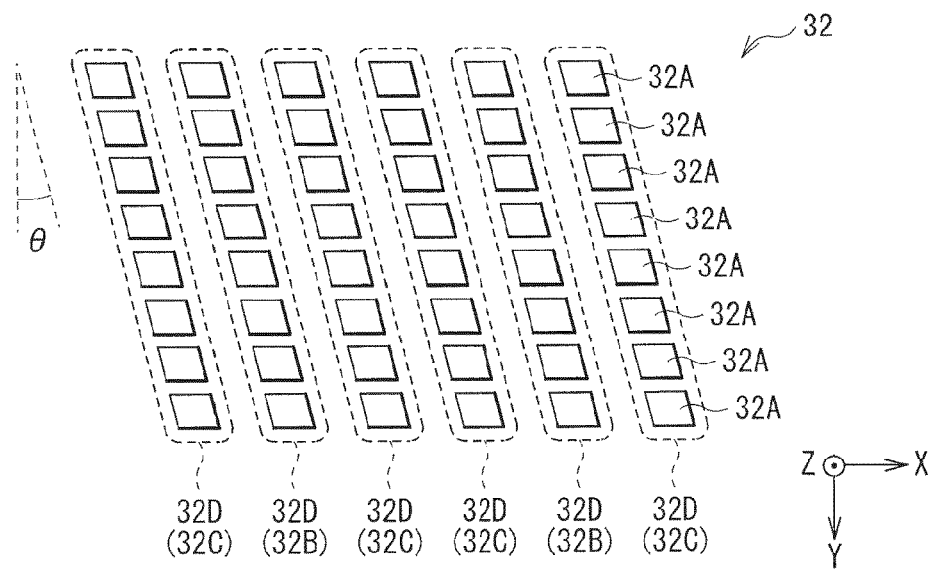
FIG. 28 is a diagram illustrating a fifth modification of the electrode in FIG. 2.

Moreover, in the above-described respective embodiments and Modifications 1 and 2, the illumination unit 1 or 2 may be capable of outputting, as illumination light, planar illumination light, a plurality of linear illumination lights, or linear illumination light formed of a plurality of point lights that are arranged in a line. For example, each sub-electrode 32A may have a block shape, and the plurality of sub-electrodes 32A may be arranged two-dimensionally, as shown in FIG. 27 and FIG. 28. In this case, when the plurality of sub-electrodes 32A arranged in a line are considered as one linear electrode 32D, each linear electrode 32D may be used as the above-described sub-electrode 32B or 32C. For example, a plurality of specific linear electrodes 32D out of the plurality of linear electrodes 32D may be used as the sub-electrodes 32B. A plurality of linear electrodes 32D other than those used as the sub-electrodes 32B out of the plurality of linear electrodes 32D are used as the sub-electrodes 32C. In other words, in the present modification, the lower electrode 32 generates an electric field that generates a plurality of columns each including a plurality of point scattering regions arranged in a line (substantially, a linear scattering region) with respect to the light modulation layer 34 in the three-dimensional display mode. It is to be noted that the illumination unit 1 or 2 according to the present modification has a configuration equivalent to a configuration in which "linear scattering region" is replaced by "linear scattering region formed of a plurality of point scattering regions arranged in a line" in the description of the above respective embodiments and Modifications 1 and 2.

The respective sub-electrodes 32A included in the linear electrode 32D may be separately formed, or may be connected to one another via a fine line (not illustrated). When the respective sub-electrodes 32A included in the linear electrode 32D are connected to one another via the fine line, the linear electrode 32D is a so-called step-like electrode. In the present modification, the illumination unit 1 or 2 emits linear illumination light or the plurality of point illumination lights arranged in a line (substantially, linear illumination light) in correspondence with each linear electrode 32D.

Modification 4

Figure 29:
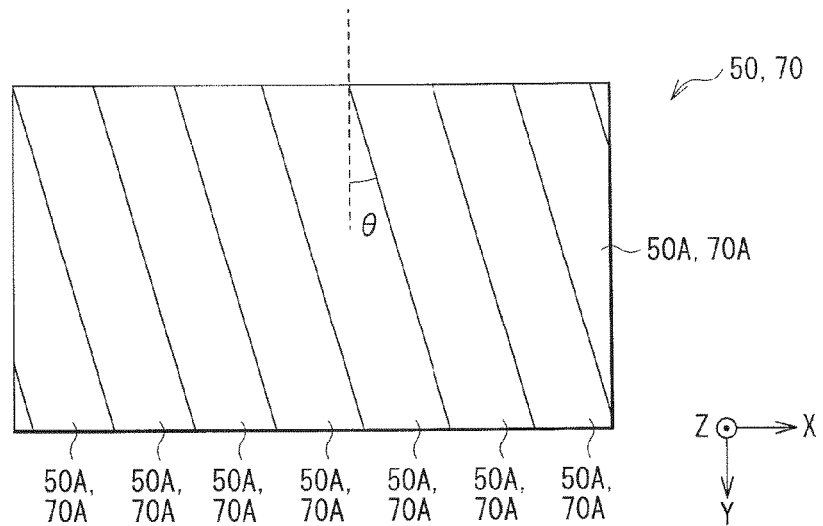
FIG. 29 is a diagram illustrating a first modification of the lens sheets in FIG. 9, FIG. 10, and FIG. 12 to FIG. 23.

Moreover, in the above-described Modification 3, when each linear electrode 32D extends in a direction obliquely intersecting with the light incident face 10A, for example, also the belt-like convex section 50A or 70A may extend in the direction obliquely intersecting with the light incident face 10A as shown in FIG. 29. The belt-like convex section 50A or 70A may preferably extend in a direction parallel to the extending direction of each linear electrode 32D. In this case, the belt-like convex section 50A or 70A may preferably extend in a direction parallel to the extending direction of the scattering region (the plurality of point scattering regions arranged in a line (substantially, the linear scattering region)) that is generated in correspondence with the linear electrode 32D.

Modification 5

Figure 30:
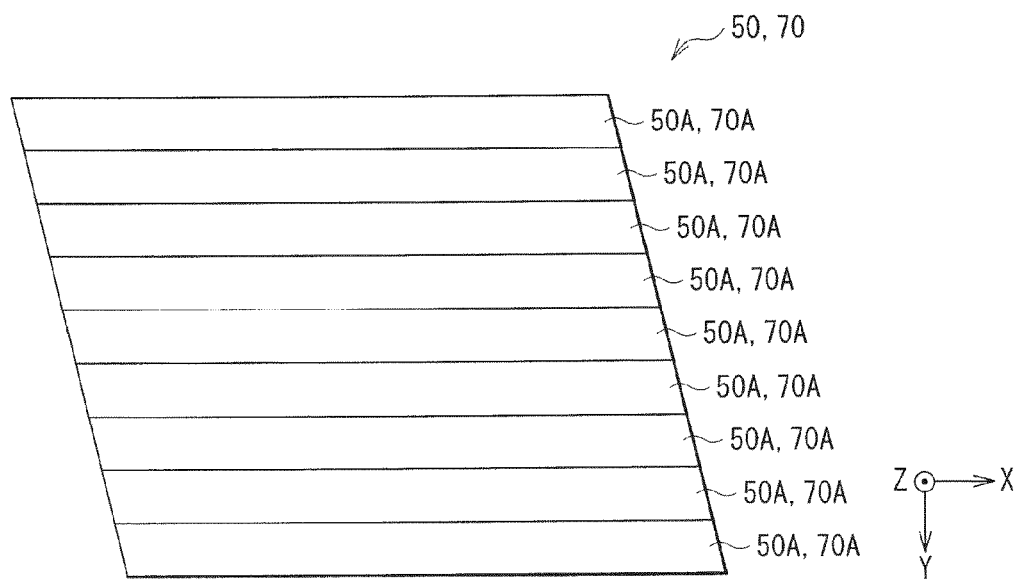
FIG. 30 is a diagram illustrating a second modification of the lens sheets in FIG. 9, FIG. 10, and FIG. 12 to FIG. 23.
Figure 31:
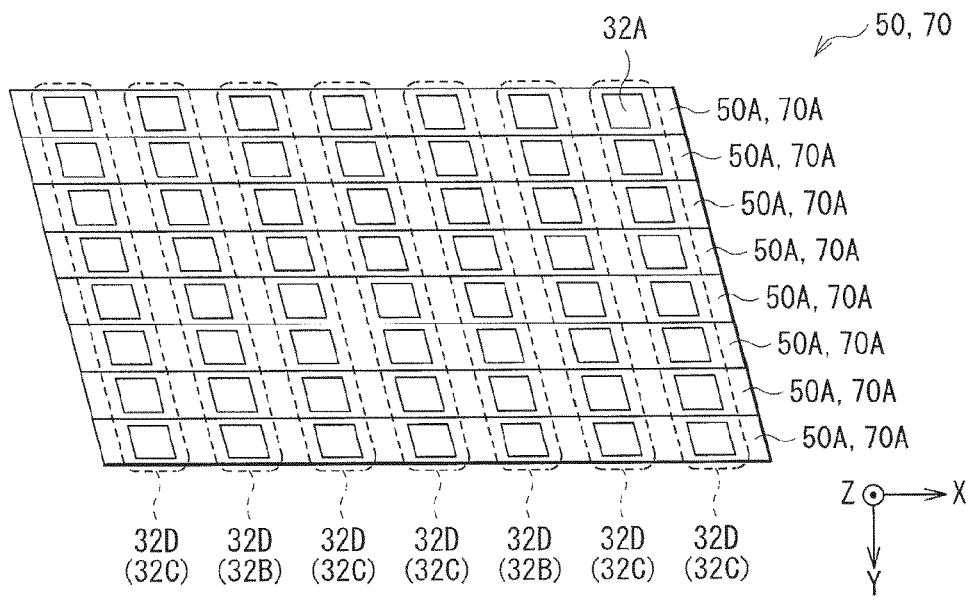
FIG. 31 is a diagram illustrating a state in which a lens sheet in FIG. 30 and an electrode in FIG. 28 are overlapped on each other.

Moreover, in the above-described Modification 3, when the respective linear electrodes 32D extend in the direction obliquely intersecting with the light incident face 10A, and are arranged side by side in the direction parallel to the light incident face 10A, for example, the plurality of sub-electrodes 32A may be arranged side by side in the direction parallel to the light incident face 10A as shown in FIG. 28. In this case, for example, the belt-like convex section 50A or 70A may extend in the direction parallel to the light incident face 10A (or in an arrangement direction of the linear electrodes 32D (the linear scattering regions)) as shown in FIG. 30. Here, for example, as shown in FIG. 31, the sub-electrode 32A may be preferably arranged so as not to face two belt-like convex sections 50A (or two belt-like convex sections 70A), in other words, so as to face only one belt-like convex section 50A (or one belt-like convex section 70A). Further, each sub-electrode 32A may be preferably arranged so as to face the middle of the belt-like convex section 50A (or the belt-like convex section 70A) in the width direction.

The direction parallel to the light incident face 10A may be preferably a direction parallel to a parallax direction at the time of three-dimensional display. In this case, the extending direction of the belt-like convex sections 50A or 70A is parallel to the parallax direction at the time of three-dimensional display. In this case, light incident from the back face of the lens sheet 50 or 70 is condensed in the arrangement direction of the belt-like convex sections 50A or 70A, and is not condensed in the extending direction of the belt-like convex sections 50A or 70A. Therefore, a viewing angle in the parallax direction at the time of three-dimensional display is not narrowed by the lens sheet 50 or 70, and is allowed to be sufficiently large for practical use.

Modification 6

Figure 32:
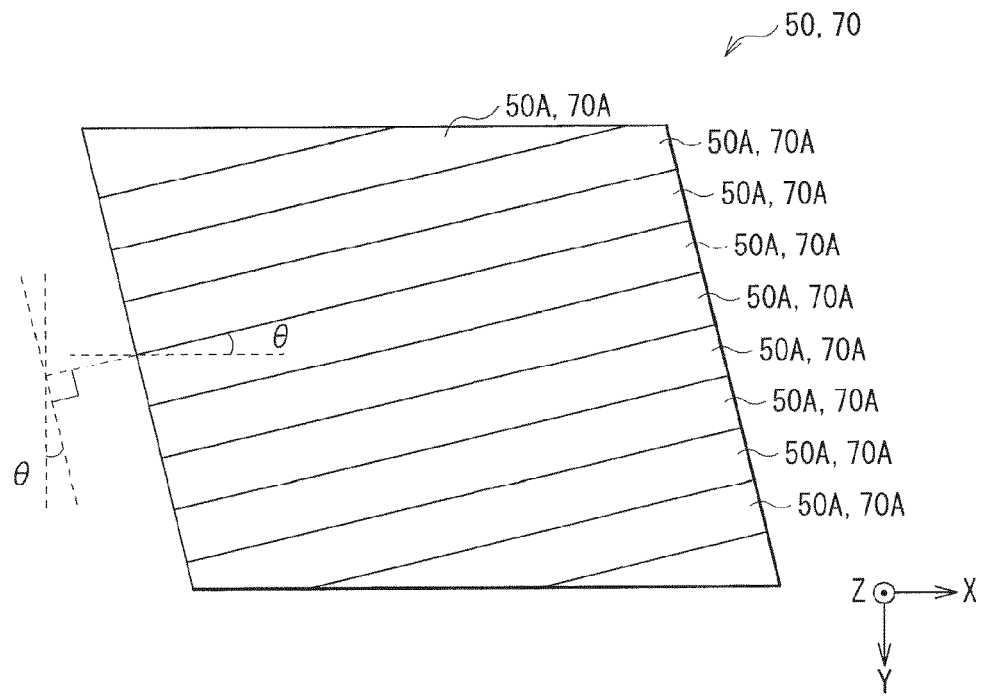
FIG. 32 is a diagram illustrating a third modification of the lens sheets in FIG. 9, FIG. 10, and FIG. 12 to FIG. 23.

Moreover, in the above-described Modification 3, when the respective linear electrodes 32D extend in the direction obliquely intersecting with the light incident face 10A, and are arranged side by side in the direction parallel to the light incident face 10A, for example, the plurality of sub-electrodes 32A may be arranged side by side in the direction parallel to the light incident face 10A as shown in FIG. 28. In this case, for example, as shown in FIG. 32, the belt-like convex sections 50A or 70A may extend in a direction obliquely intersecting with both the extending direction of the linear electrodes 32D (the linear scattering regions) and the arrangement direction of the linear electrodes 32D (the linear scattering regions). Moreover, for example, as shown in FIG. 28 and FIG. 32, the belt-like convex sections 50A or 70A may extend in a direction orthogonal to the linear electrodes 32D.

Figure 33:
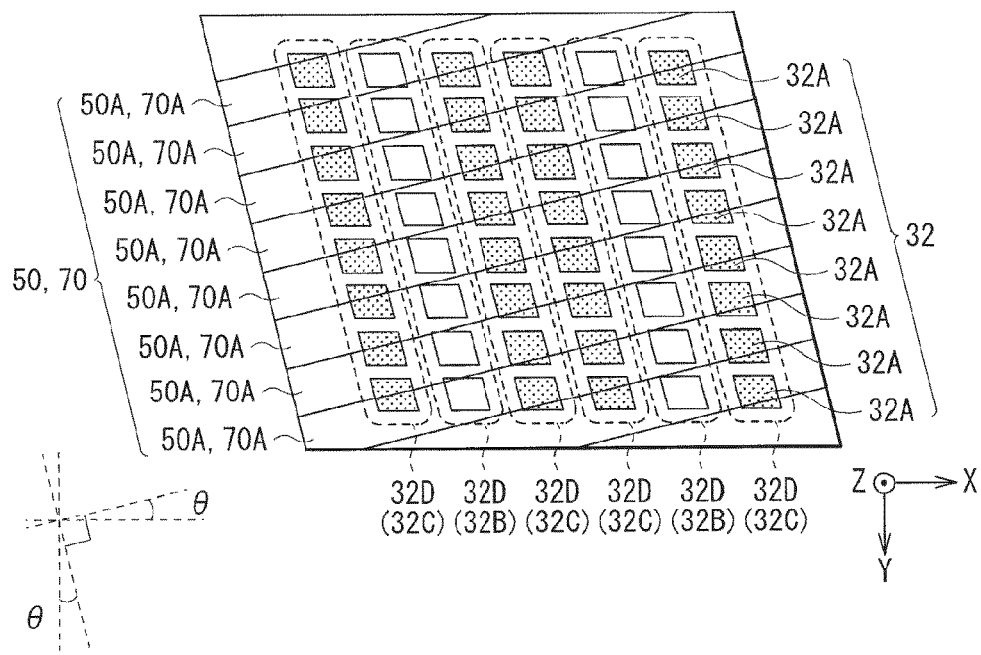
FIG. 33 is a diagram illustrating a state in which a lens sheet in FIG. 32 and the electrode in FIG. 28 are overlapped on each other.

Here, for example, as shown in FIG. 33, the sub-electrode 32B to be driven in the three-dimensional display mode may be preferably arranged so as not to face two belt-like convex sections 50A (or two belt-like convex sections 70A), in other words, so as to face only one belt-like convex section 50A (or one belt-like convex section 70A). Further, each sub-electrode 32A may be preferably arranged so as to face the middle of the belt-like convex section 50A (or the belt-like convex section 70A) in the width direction. It is to be noted that, in FIG. 33, the sub-electrode 32B to be driven in the three-dimensional display mode is expressed with white, and the sub-electrode 32C not to be driven in the three-dimensional display mode is expressed with black.

In the present modification, the extending direction of the belt-like convex sections 50A or 70A obliquely intersects with the parallax direction at the time of three-dimensional display. Therefore, the light incident from the back face of the lens sheet 50 or 70 is only condensed a little in the parallax direction at the time of three-dimensional display and in a direction orthogonal to the parallax direction at the time of three-dimensional display. Therefore, the viewing angle in the parallax direction at the time of three-dimensional display is not narrowed by the lens sheet 50 or 70, and is allowed to be sufficiently large for practical use. Further, the width of the light emission line (the width of the scattering region) in the illumination unit 1 or 2 is not increased by the lens sheet 50 or 70 in the parallax direction at the time of three-dimensional display and in the direction orthogonal to the parallax direction at the time of three-dimensional display. As a result, when the illumination unit 1 or 2 is used as the backlight of the display apparatus, double images formed in the front direction of the display apparatus is allowed to be less likely to be seen at the time of three-dimensional display.

Modification 7

Figure 34:
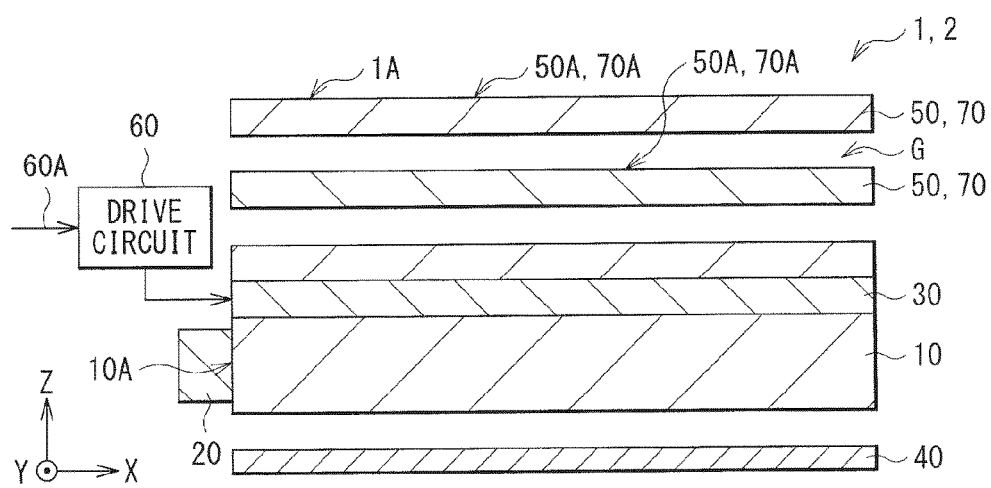
FIG. 34 is a diagram illustrating a first modification of a cross-sectional configuration of the illumination units in FIG. 1 and FIG. 11.

In the above-described respective embodiments and Modifications 1 to 6, only one lens sheet 50 (or only one lens sheet 70) is provided. However, a plurality of lens sheets may be provided. As shown in FIG. 34, for example, the illumination unit 1 or 2 may include two lens sheets 50 (or two lens sheets 70) that are overlapped on each other so that the flat face and the concave-convex face are in contact with each other. In this case, the two lens sheets 50 may be preferably arranged so that the belt-like convex sections 50A in the respective lens sheets 50 intersect or are orthogonal to each other. Also, the two lens sheets 70 may be preferably arranged so that the belt-like convex sections 70A in the respective lens sheets 70 intersect or are orthogonal to each other.

Modification 8

Figure 35:
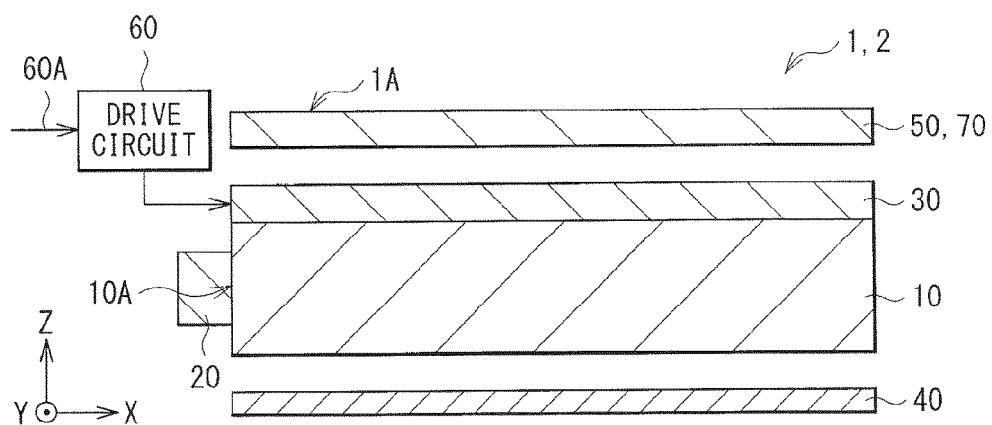
FIG. 35 is a diagram illustrating a second modification of the cross-sectional configuration of the illumination units in FIG. 1 and FIG. 11.
Figure 36:
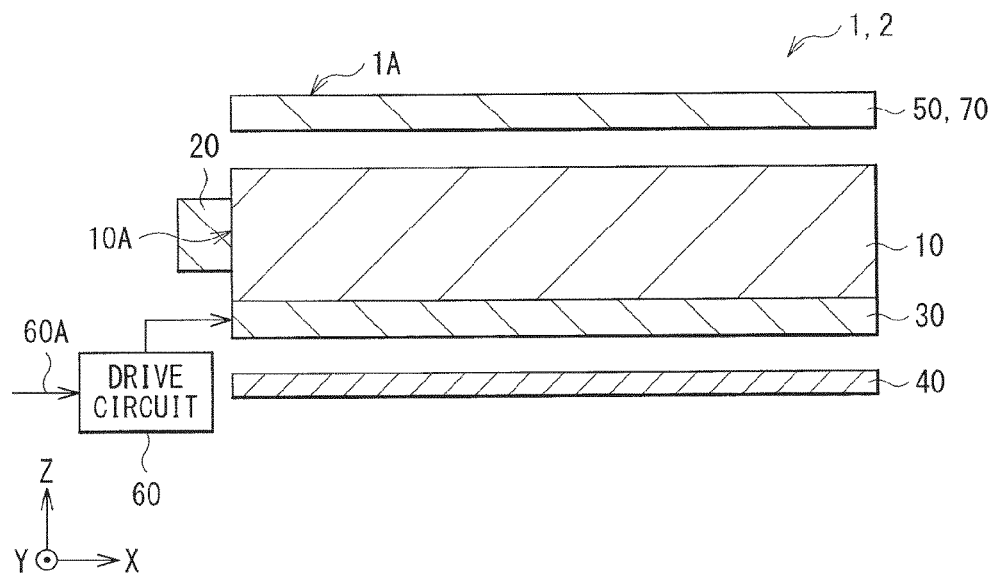
FIG. 36 is a diagram illustrating a third modification of the cross-sectional configuration of the illumination units in FIG. 1 and FIG. 11.

In the above-described respective embodiments and Modifications 1 to 7, the light modulation device 30 is joined to the inside of the light guide plate 10 in close contact therewith with no air layer in between. However, as shown in FIG. 35, for example, the light modulation device 30 may be joined to the top face of the light guide plate 10 in close contact therewith with no air layer in between. Alternatively, as shown in FIG. 36, for example, the light modulation device 30 may be joined to the back (the bottom face) of the light guide plate 10 in close contact therewith with no air layer in between.

Modification 9

Moreover, in the above-described respective embodiments and Modifications 1 to 8, the upper electrode 36 is configured of a sheet-like electrode (a continuous film) formed on the entire face, and the lower electrode 32 is configured of a plurality of belt-like sub-electrodes 32A. However, for example, the upper electrode 36 may be configured of a plurality of belt-like sub-electrodes 32A, and the lower electrode 32 may be configured of a sheet-like electrode (a continuous film) formed on the entire face. Alternatively, for example, the lower electrode 32 may be configured of a plurality of belt-like sub-electrodes 32A, and the upper electrode 36 may also be configured of a plurality of belt-like sub-electrodes 32A.

Modification 10

Figure 37:
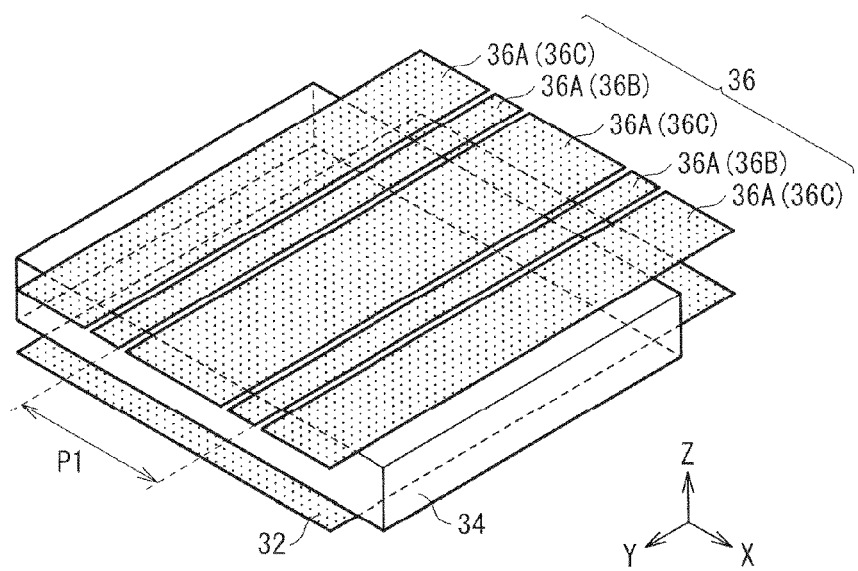
FIG. 37 is a diagram illustrating a sixth modification of the electrode in FIG. 2.

In the above-described respective embodiments and Modifications 1 to 9, the upper electrode 36 is configured of a sheet-like electrode (a continuous film) formed on the entire face, and the lower electrode 32 is configured of a plurality of belt-like sub-electrodes 32A. However, as shown in FIG. 37, for example, the upper electrode 36 may be configured of a plurality of belt-like sub-electrodes 36A, and the lower electrode 32 may be configured of a sheet-like electrode (a continuous film) formed on the entire face. In this case, each sub-electrode 36A has a configuration similar to that of each sub-electrode 32A. As shown in FIG. 37, for example, part of the sub-electrodes 36A are sub-electrodes 36B corresponding to the above-described sub-electrodes 32B, and other sub-electrodes 36A are the sub-electrodes 36C corresponding to the above-described sub-electrodes 32C.

Modification 11

Figure 38:
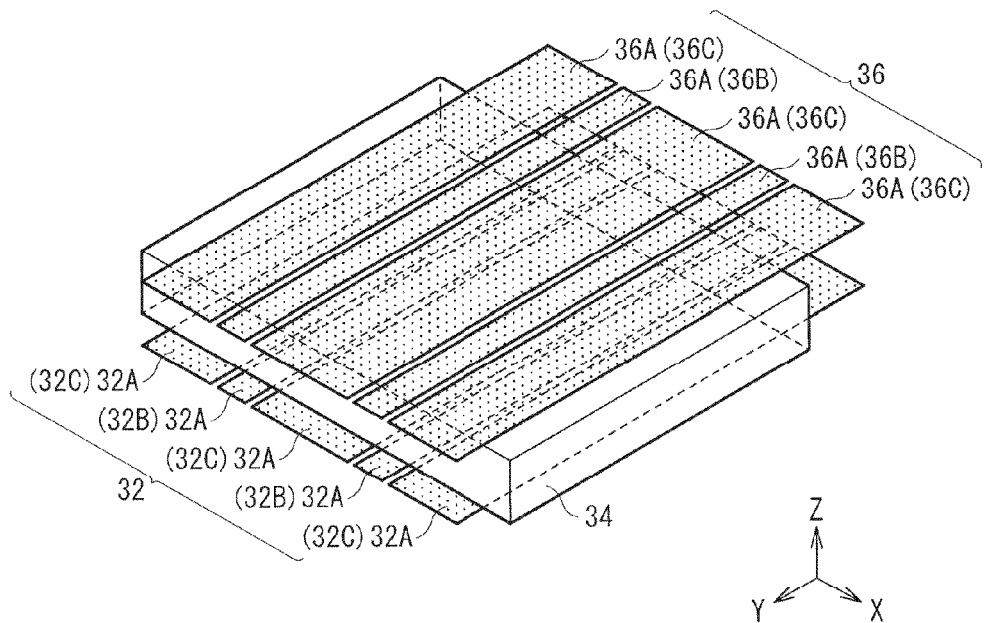
FIG. 38 is a diagram illustrating a seventh modification of the electrode in FIG. 2.

In the above-described Modification 10, as shown in FIG. 38, for example, the lower electrode 32 may be configured of a plurality of belt-like sub-electrodes 36A, and the upper electrode 36 may also be configured of a plurality of belt-like sub-electrodes 36A. In this case, the sub-electrode 32A and the sub-electrode 36A may preferably face each other. Further, it may be preferable that the sub-electrode 32B and the sub-electrode 36B face each other, and the sub-electrode 32C and the sub-electrode 36C face each other. In such a case, the lower electrode 32 and the upper electrode 36 are not formed in places that do not contribute to light emission. Therefore, it is possible to reduce light absorption by the lower electrode 32 and the upper electrode 36, compared to the case where the lower electrode 32 or the upper electrode 36 is formed on the entire face.

Modification 12

Figure 39:
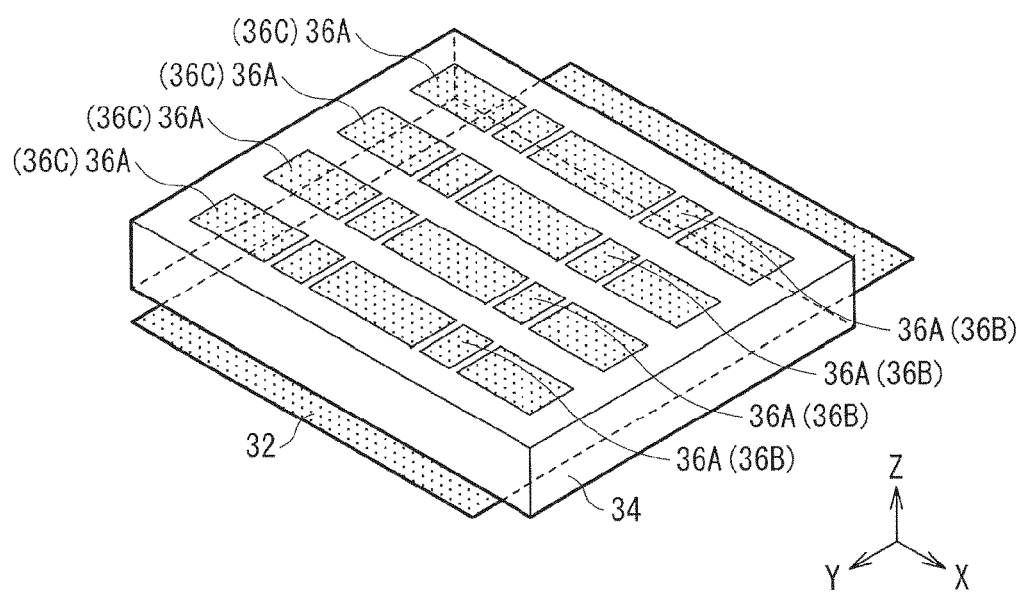
FIG. 39 is a diagram illustrating an eighth modification of the electrode in FIG. 2.

In the above-described Modification 10, as shown in FIG. 39, for example, the lower electrode 32 may be configured of a sheet-like electrode (a continuous film) formed on the entire face, and the upper electrode 36 may be configured of block-like sub-electrodes 36A that are arranged in a matrix.

In this case, for example, each of the sub-electrodes 36A included in a plurality of specific columns that are parallel to the light incident face 10A is the above-described sub-electrode 36B, and each of the sub-electrodes 36A included in other examples parallel to the light incident face 10A is the above-described sub-electrode 36C.

Moreover, in the present modification, a source or a drain of a TFT may be connected to each sub-electrode 36A, a scanning line may be connected to a gate of the TFT, and one of the source and the drain of the TFT that is not connected to the sub-electrode 36A may be connected to a data line. In this case, the drive circuit 60 may be configured to sequentially select the plurality of scanning lines, and to apply signal voltages corresponding to image signals to the respective data lines. In other words, the drive circuit 60 may be configured to drive the respective sub-electrodes 36A in an active matrix manner.

Modification 13

Figure 40:
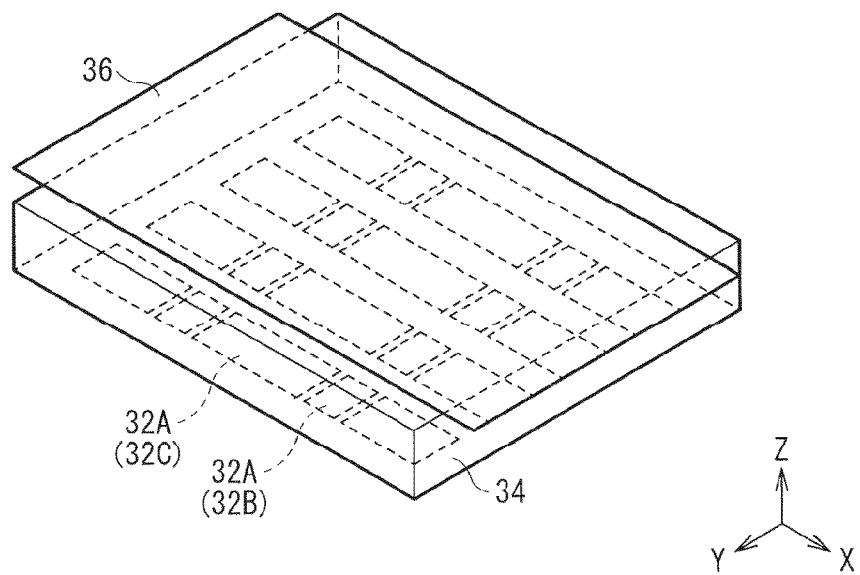
FIG. 40 is a diagram illustrating a ninth modification of the electrode in FIG. 2.
Figure 41:
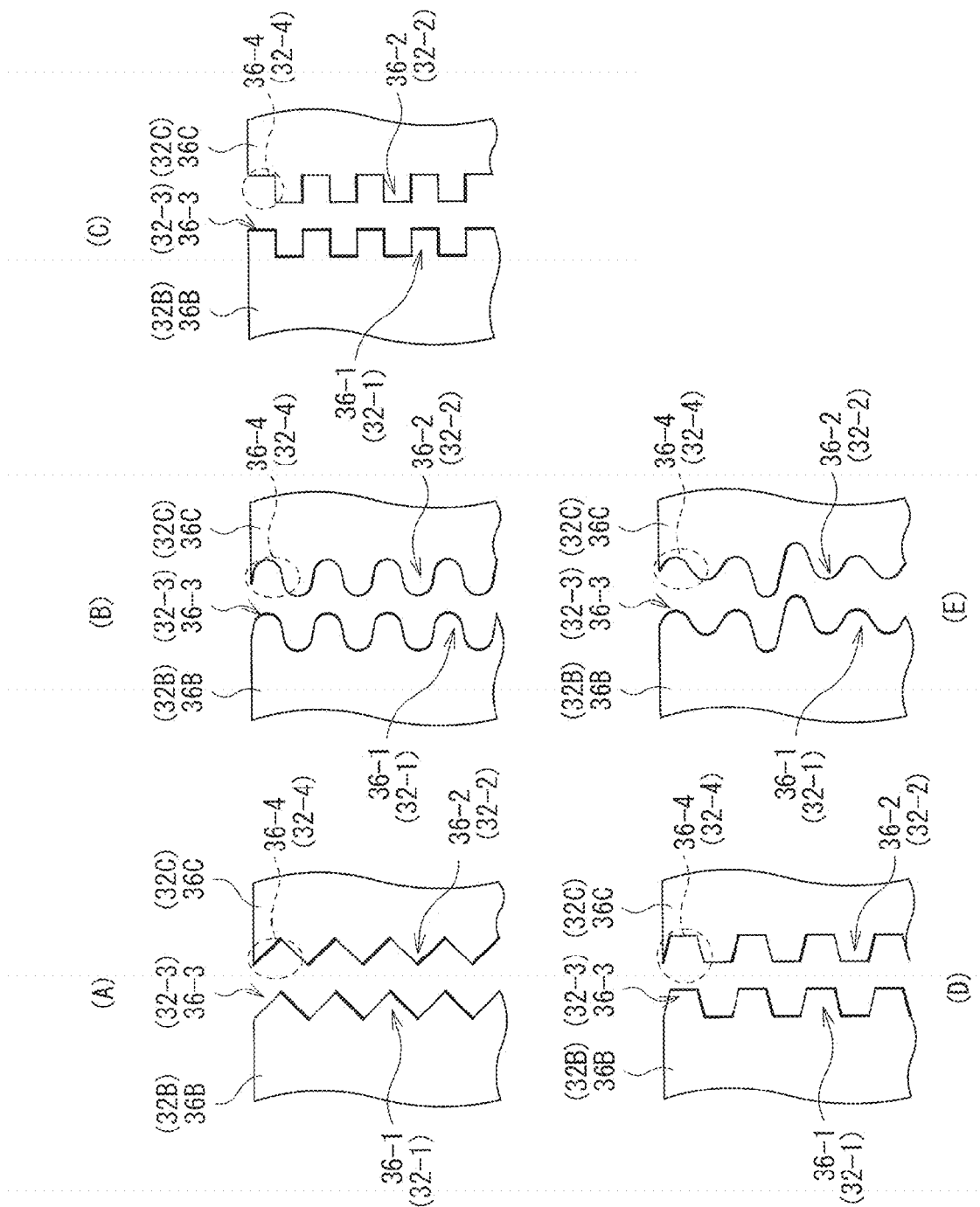
FIG. 41 is a diagram illustrating a tenth modification of the electrode in FIG. 2.
Figure 42:
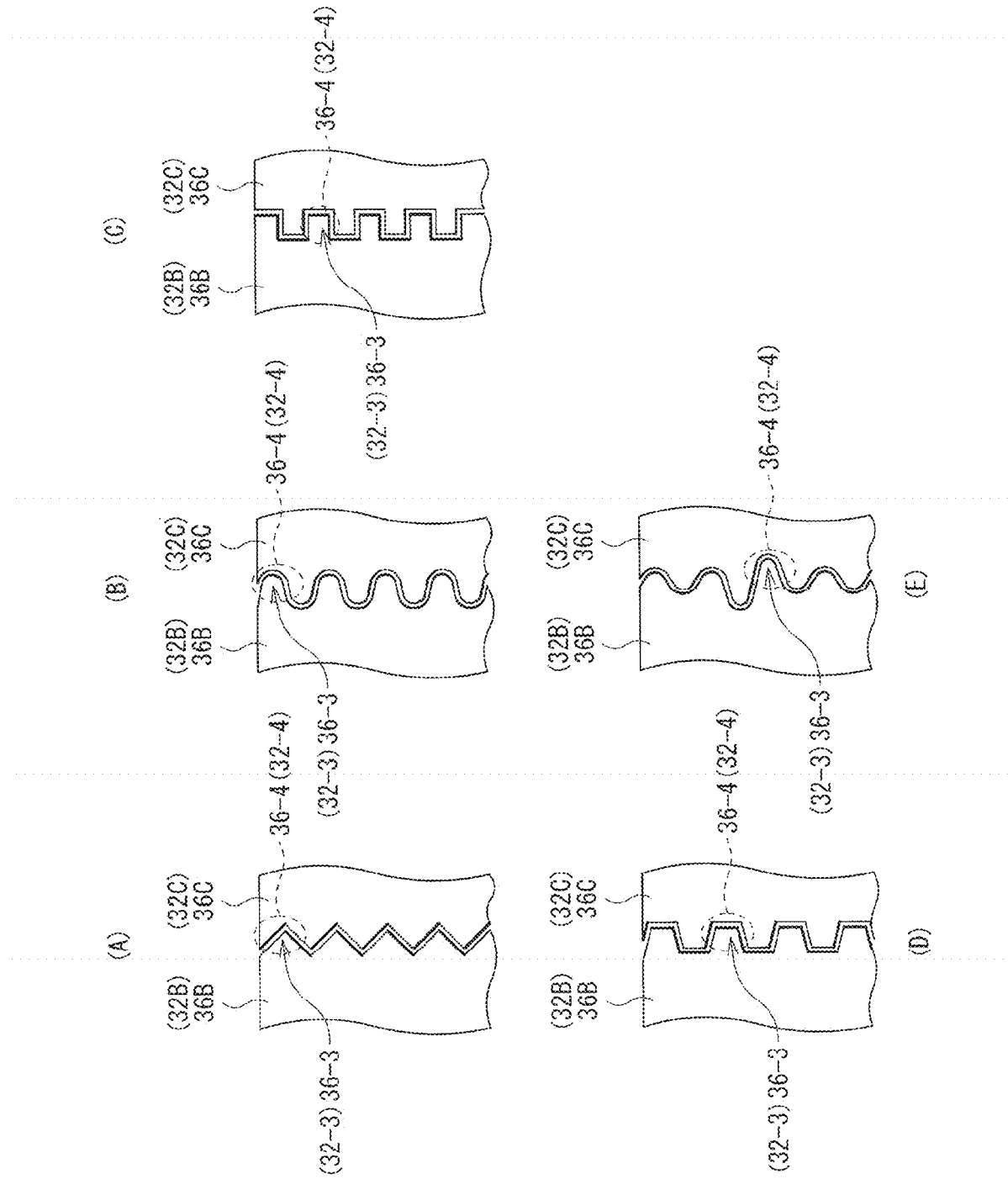
FIG. 42 is a diagram illustrating an eleventh modification of the electrode in FIG. 2.

Contrary to the above-described Modification 12, as shown in FIG. 40, for example, the upper electrode 36 may be configured of a sheet-like electrode (a continuous film) formed on the entire face, and the lower electrode 32 may be configured of block-like sub-electrodes 32A that are arranged in a matrix. In this case, for example, each of the sub-electrodes 32A included in a plurality of specific columns that are parallel to the light incident face 10A is the sub-electrode 32B, and each of the sub-electrodes 32A included in other examples parallel to the light incident face 10A is the sub-electrode 32C.

Moreover, in the present modification, a source or a drain of a TFT may be connected to each sub-electrode 32A, a scanning line may be connected to a gate of the TFT, and one of the source and the drain of the TFT that is not connected to the sub-electrode 32A may be connected to a data line. In this case, the drive circuit 60 may be configured to sequentially select the plurality of scanning lines, and to apply signal voltages corresponding to image signals to the respective data lines. In other words, the drive circuit 60 may be configured to drive the respective sub-electrodes 32A in an active matrix manner.

Modification 14

In the above-described respective embodiments and Modifications 1 to 13, side portions of the lower electrode 32 and the upper electrode 36 are linear. However, the side portions of the lower electrode 32 and the upper electrode 36 may be non-linear. For example, in each of the sub-electrodes 36B or 36C, a side portion, of the sub-electrode 36B, that is adjacent to the sub-electrode 36C may have a concave-convex shape. Similarly, in each of the sub-electrodes 36B or 36C, a side portion, of the sub-electrode 36C, that is adjacent to the sub-electrode 36B may have a concave-convex shape. Further, for example, in each of the sub-electrodes 32B or 32C, a side portion, of the sub-electrode 32B, that is adjacent to the sub-electrode 32C may have a concave-convex shape. Similarly, in each of the sub-electrodes 32B or 32C, a side portion, of the sub-electrode 32C, that is adjacent to the sub-electrode 32B may have a concave-convex shape.

The concave-convex shape formed in each sub-electrode 32B, 32C, 36B, or 36C may be, for example, a zigzag shape, a wavy shape, a lump shape, a trapezoidal shape, or a random shape, as shown in FIG. 41A to FIG. 41E. It is to be noted that, in FIG. 41A to FIG. 41E, 36B(32B) means 36B or 32B, and other symbols also mean similar things.

The concave-convex shape of each sub-electrode 36B is configured of a plurality of convex sections 36-1 arranged along the side portion, and the concave-convex shape of each sub-electrode 36C is configured of a plurality of convex sections 36-2 arranged along the side portion. The plurality of convex sections 36-1 and the plurality of convex sections 36-2 may be arranged, for example, alternately, as shown in FIG. 41A to FIG. 41E. Similarly, the concave-convex shape of each sub-electrode 32B is configured of a plurality of convex sections 32-1 arranged along the side portion, and the concave-convex shape of each sub-electrode 32C is configured of a plurality of convex sections 32-2 arranged along the side portion. The plurality of convex sections 32-1 and the plurality of convex sections 32-2 may be arranged, for example, alternately, as shown in FIG. 41A to FIG. 41E.

A width of a gap (a slit portion) between the side portion in which the concave-convex shape of each sub-electrode 36B is formed and the side portion in which the concave-convex shape of each sub-electrode 36C is formed is equal to or smaller than a predetermined size. Similarly, a width of a gap (a slit portion) between the side portion in which the concave-convex shape of each sub-electrode 32B is formed and the side portion in which the concave-convex shape of each sub-electrode 32C is formed is equal to or smaller than a predetermined size. A tip 36-3 of each convex section 36-1 may be arranged, for example, outside a concave section 36-4 that is formed between two convex sections 36-2 adjacent to each other, as shown in FIG. 41A to FIG. 41E. Similarly, a tip 32-3 of each convex section 32D may be arranged, for example, outside a concave section 32-4 that is formed between two convex sections 32-3 adjacent to each other, as shown in FIG. 41A to FIG. 41E.

It is to be noted that the tip 36-3 of each convex section 36-1 may be arranged, for example, in the concave section 36-4, as shown in FIG. 42A to FIG. 42E. Similarly, the tip 32-3 of each convex section 32-1 may be arranged, for example, in the concave section 32-4, as shown in FIG. 42A to FIG. 42E. In layouts shown in FIG. 42A to FIG. 42E, it is possible to allow the width of the slit portion to be narrower, compared to the layouts shown in FIG. 41A to FIG. 41E.

By providing concavities and convexities in the side portion of electrode, it is possible to blur an edge of luminance profile of the linear illumination light. However, when it is not favorable to blur the edge of the luminance profile of the linear illumination light a lot, the width of the slit portion may be preferably as narrow as possible. On the other hand, when it is positively favorable to blur the edge of the luminance profile of the linear illumination light, the width of the slit portion may be preferably configured not to be excessively small. When the edge of the luminance profile of the linear illumination light is blurred, for example, it is possible to eliminate sudden switching of the displayed image when a viewer (not illustrated) has moved.

It is to be noted that, in each sub-electrode 36B and each sub-electrode 36C, the concave-convex shape may not necessarily be provided in both of the adjacent side portions, and the concave-convex shape may be provided only in one side portion thereof. Similarly, in each sub-electrode 32B and each sub-electrode 32C, the concave-convex shape may not necessarily be provided in both of the adjacent side portions, and the concave-convex shape may be provided only in one side portion thereof.

Modification 15

In the above-described respective embodiments and Modifications 1 to 14, the inside of the lower electrode 32 and the inside of the upper electrode 36 are not patterned. However, the inside of at least one of the lower electrode 32 and the upper electrode 36 may be patterned. In this case, pattern density of the patterned electrode out of the lower electrode 32 and the upper electrode 36 may be different depending on a distance from the light source 20.

Figure 43:
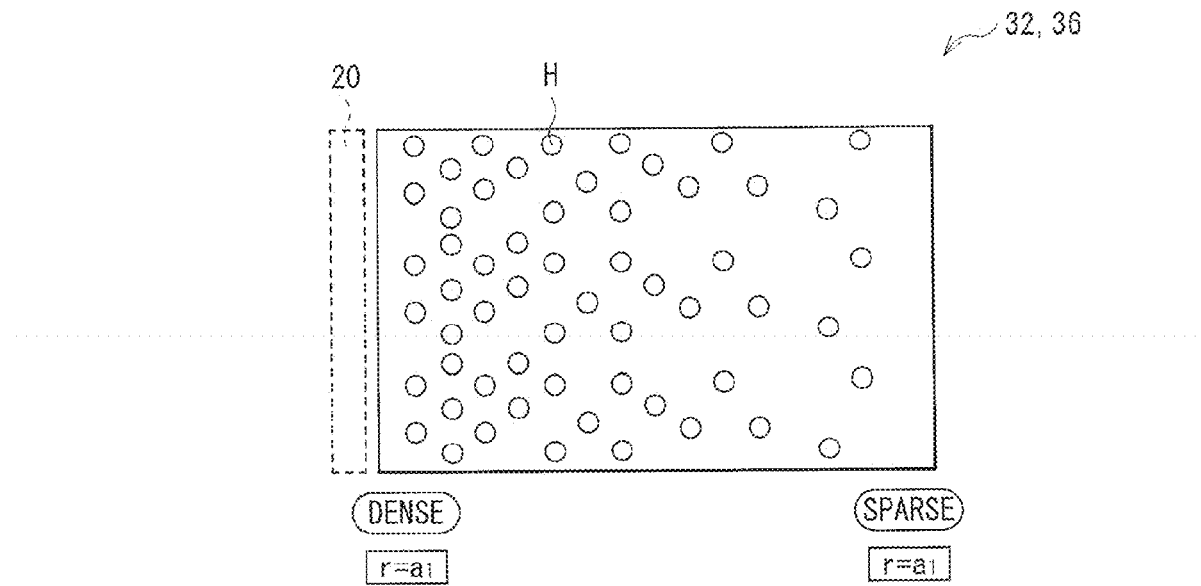
FIG. 43 is a diagram illustrating a twelfth modification of the electrode in FIG. 2.
Figure 44:
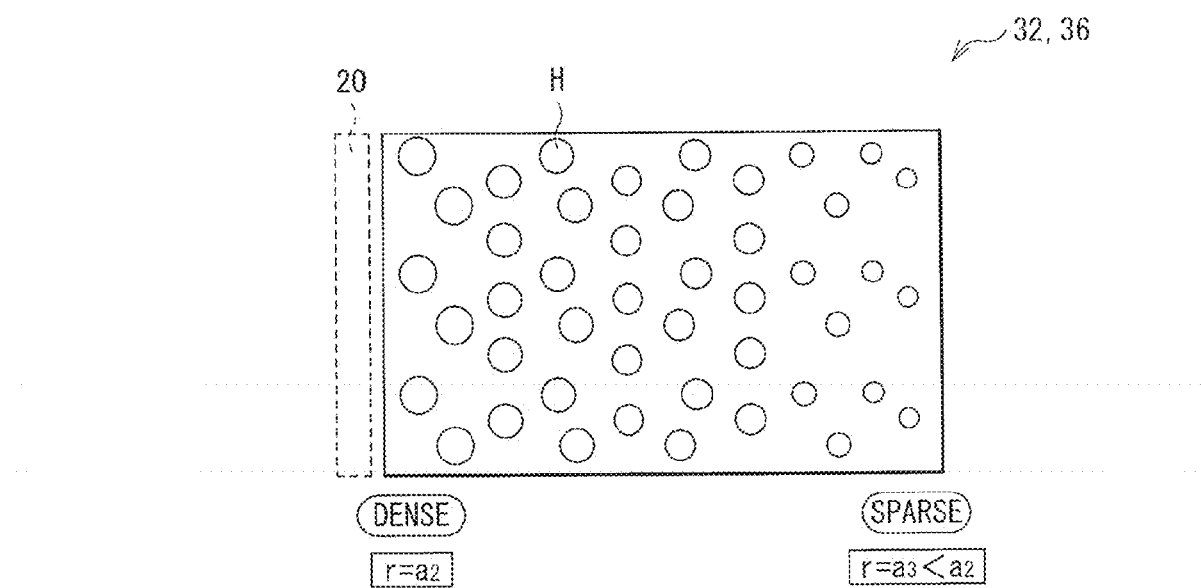
FIG. 44 is a diagram illustrating a thirteenth modification of the electrode in FIG. 2.

When the lower electrode 32 or the upper electrode 36 is configured of a planar electrode, as shown in FIG. 43 and FIG. 44, for example, a plurality of apertures H are provided in the lower electrode 32 or the upper electrode 36. The density of the apertures H is different in the upper electrode 36 or the lower electrode 32 as a whole depending on a distance from the light source 20 (the light incident face 10A). It is to be noted that both of the lower electrode 32 and the upper electrode 36 may be configured of planar electrodes that each include a plurality of apertures H, and the density of the apertures H may be different depending on the distance from the light source 20 in both of the lower electrode 32 and the upper electrode 36. A shape of the aperture H may be, for example, circular, as shown in FIG. 43 and FIG. 44. It is to be noted that the shape of the aperture H may be a shape other than the circular shape, and may be, for example, an ellipsoidal shape, or a polygonal shape. In an example shown in FIG. 43, a diameter r of the aperture H is constant ($r=a_1$) irrespective of the distance from the light source 20, and the number of the apertures H per unit area decreases as the distance from the light source 20 increases. Further, in an example shown in FIG. 44, the number of the apertures H per unit area is constant irrespective of the distance from the light source 20, and the diameter r of the aperture H decreases as the distance from the light source 20 increases. It is to be noted that FIG. 44 shows, as an example, a case where the diameter r in the vicinity of the light source 20 is $a_2$, and the diameter r at a place farthest from the light source 20 is $a_3$ ($<a_2$). Therefore, in both examples in FIGS. 43 and 44, the density of the apertures H (occupancy of the apertures H per unit area) is sparser (lower) as the distance from the light source 20 increases. In other words, the pattern density of the upper electrode 36 or the lower electrode 32 (occupancy per unit area of portion other than the apertures H in the upper electrode 36 or the lower electrode 32) is denser (higher) as the distance from the light source 20 increases.

Figure 45:
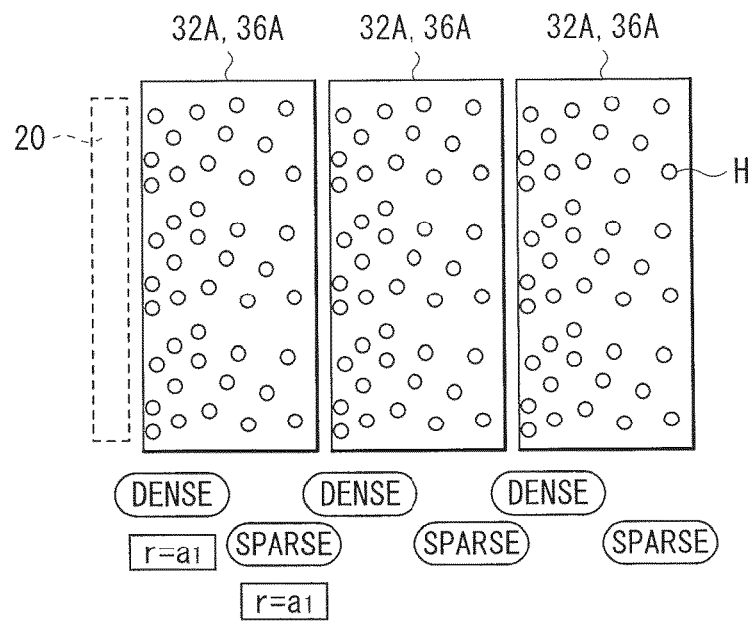
FIG. 45 is a diagram illustrating a fourteenth modification of the electrode in FIG. 2.
Figure 46:
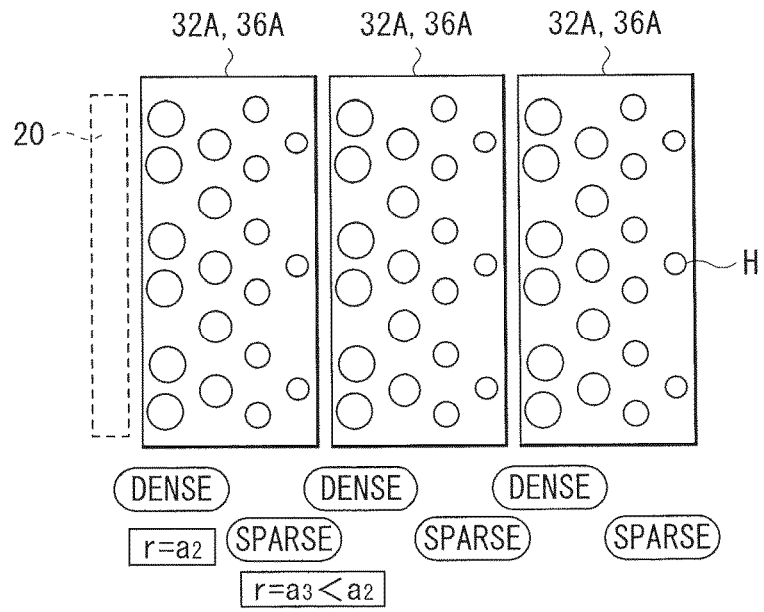
FIG. 46 is a diagram illustrating a fifteenth modification of the electrode in FIG. 2.

When the lower electrode 32 or the upper electrode 36 is configured of a plurality of sub-electrodes, as shown in FIG. 45 and FIG. 46, for example, a plurality of apertures H are provided in the sub-electrodes 32A or 36A. The density of the apertures H is different between the respective sub-electrodes 32A or 36A depending on a distance from the light source 20 (the light incident face 10A). In each sub-electrode 32A or 36A, the density of the apertures H may be different depending on the distance from the light source 20, or may be constant regardless of the distance from the light source 20. It is to be noted that, both of the sub-electrodes 32A and 36A may include a plurality of apertures H, and the density of the apertures H may be different depending on the distance from the light source 20 in each of the sub-electrodes 32A and 36A in both of the sub-electrodes 32A and 36A. A shape of the aperture H may be a shape other than that, and may be, for example, an ellipsoidal shape, or a polygonal shape. In an example shown in FIG. 45, the diameter r of the aperture H is constant ($r=a_1$) irrespective of the distance from the light source 20, and the number of the apertures H per unit area decreases as the distance from the light source 20 increases. Further, in an example shown in FIG. 46, the number of the apertures H per unit area is constant irrespective of the distance from the light source 20, and the diameter r of the aperture H decreases as the distance from the light source 20 increases. It is to be noted that FIG. 46 shows, as an example, a case where the diameter r in the vicinity of the light source 20 is $a_2$, and the diameter r at a place farthest from the light source 20 is $a_3$ ($<a_2$). Therefore, in both examples in FIG. 45 and FIG. 46, the density of the apertures H (occupancy of the apertures H per unit area) is sparser (lower) as the distance from the light source 20 increases. In other words, the pattern density of the sub-electrodes 32A or 36A (occupancy per unit area of portion other than the apertures H in the sub-electrodes 32A or 36A) is denser (higher) as the distance from the light source 20 increases.

In the present modification, the inside of at least one of the lower electrode 32 and the upper electrode 36 is patterned. Further, the pattern density of the patterned electrode out of the lower electrode 32 and the upper electrode 36 differs in the electrode as a whole, depending on the distance from the light source 20. Therefore, density distribution of the transmission region 30A and the scattering region 30B in the light emission region is allowed to be desirable distribution. Accordingly, luminance in a region on the light source 20 side in the light emission region of the illumination unit 1 or 2 is allowed to be suppressed to be lower than that in a case where the light modulation device 30 is not provided, and luminance in a region away from the light source 20 in the light emission region of the illumination unit 1 or 2 is allowed to be higher than that in the case where the light modulation device 30 is not provided. As a result, in-plane luminance is allowed to be uniform not only in a case, for example, where the entire light emission region of the illumination unit 1 or 2 is allowed to be in a dark state, but also in a case, for example, where the entire light emission region of the illumination unit 1 or 2 is allowed to be in a bright state. Accordingly, for example, it may be possible, when white display is performed in a region close to the light source 20 and a region far from the light source 20, to allow white luminance to be equal between the both regions. Also, for example, it may be possible, when black display is performed in a region closer to the light source 20 than the region in which white display is performed, and a region far from the light source 20 than the region in which white display is performed, to allow black luminance to be equal between these regions. Accordingly, it is possible to increase modulation ratio while allowing in-plane luminance to be uniform in the present modification.

Moreover, in the present modification, a design example and a calculation example of the patterning density distribution will be shown. For example, one of the lower electrode 32 and the upper electrode 36 may have patterning density distribution as shown by A in FIG. 47. It is to be noted that B in FIG. 47 shows pattern density distribution in a case where patterning depending on the distance from the light source 20 is not performed on either of the lower electrode 32 or the upper electrode 36.

Figure 47:
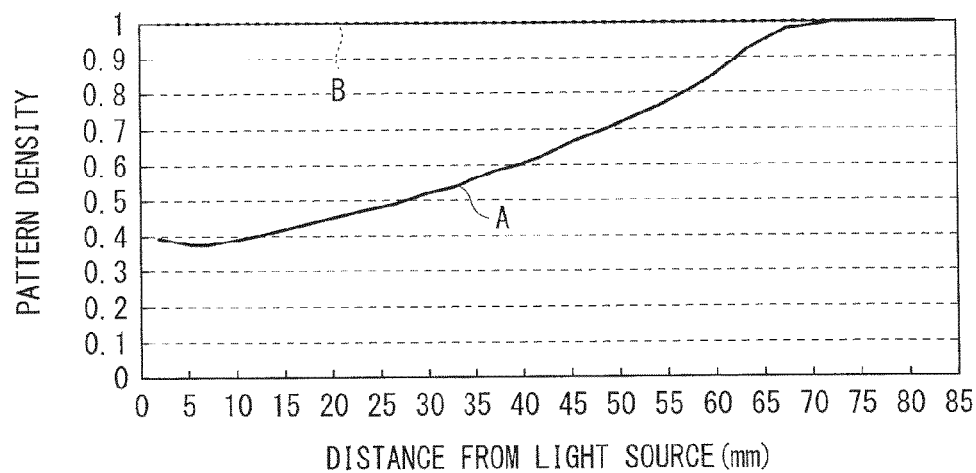
FIG. 47 is a diagram illustrating an example of pattern density distribution in electrodes in FIG. 43 to FIG. 46.
Figure 48:
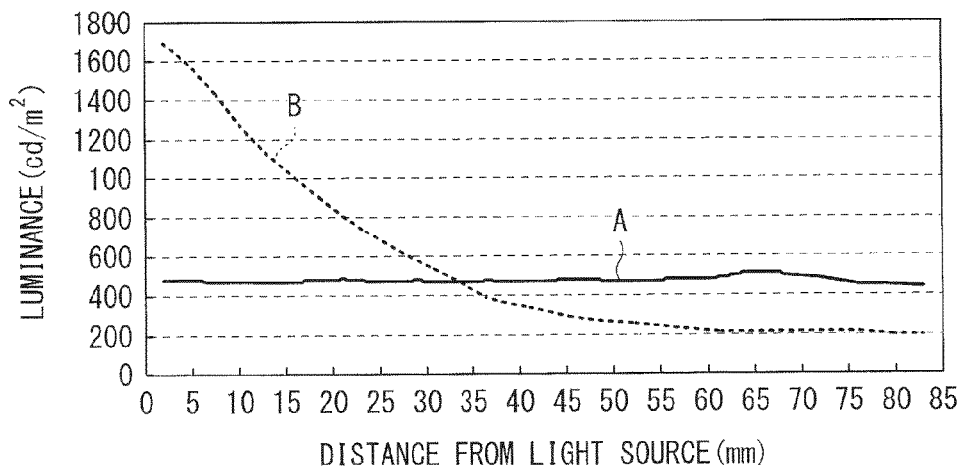
FIG. 48 is a diagram illustrating an example of luminance distribution in a case where an electrode that has pattern density in FIG. 47 is used.

When one of the lower electrode 32 and the upper electrode 36 has the patterning density distribution shown by A in FIG. 47, the in-plane luminance of the illumination unit 1 or 2 is allowed to be uniform as shown by A in FIG. 48. It is to be noted that B in FIG. 48 shows in-plane luminance distribution in the case where patterning depending on the distance from the light source 20 is not performed on either of the lower electrode 32 or the upper electrode 36.

Modification 16

In the above-described respective embodiments and Modifications 1 to 15, the same voltage may be applied from the drive circuit 60 to the respective sub-electrodes 32A irrespective of the distance from the light source 20, or voltages in accordance with the distance from the light source 20 may be applied from the drive circuit 60. Similarly, in the above-described respective embodiments and the modifications thereof, the same voltage may be applied from the drive circuit 60 to the respective sub-electrodes 36A irrespective of the distance from the light source 20, or voltages in accordance with the distance from the light source 20 may be applied from the drive circuit 60.

As described above, in the case where voltages in accordance with the distance from the light source 20 are applied to the respective sub-electrodes 32A or the respective sub-electrodes 36A, when illumination light is outputted that allows only part of the top face of the illumination unit 1 or 2 to have white luminance, it is possible to reduce a possibility of occurrence of a difference in magnitude of white luminance between a case where the part to have the white luminance is close to the light source 20 and a case where the part to have the white luminance is far from the light source 20.

Modification 17

In the above-described respective embodiments and Modifications 1 to 16, for example, each sub-electrode 32A may be further configured of a plurality of fine electrodes. Similarly, each sub-electrode 36A may be further configured of a plurality of fine electrodes.

Modification 18

Figure 49:
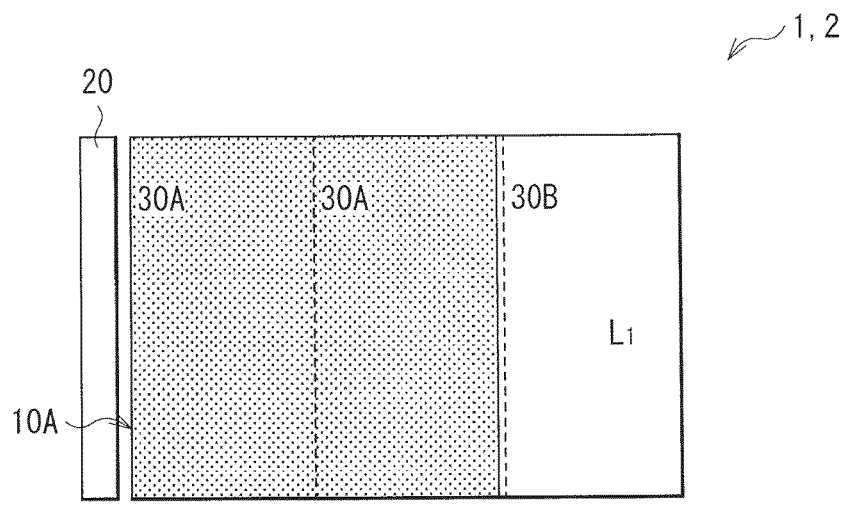
FIG. 49 is a schematic diagram for explaining about an example of a function of a light modulation device that has any of the electrodes in FIG. 43 to FIG. 46.
Figure 50:
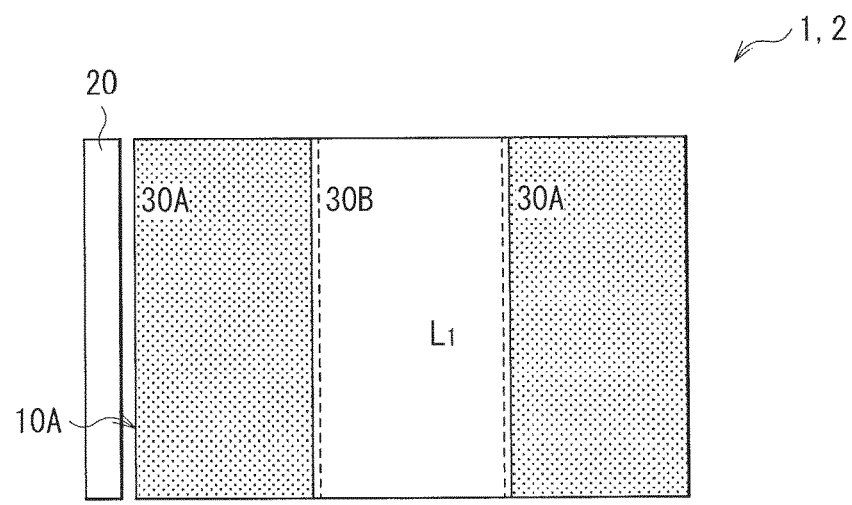
FIG. 50 is a schematic diagram for explaining about another example of the function of the light modulation device that has any of the electrodes in FIG. 43 to FIG. 46.
Figure 51:
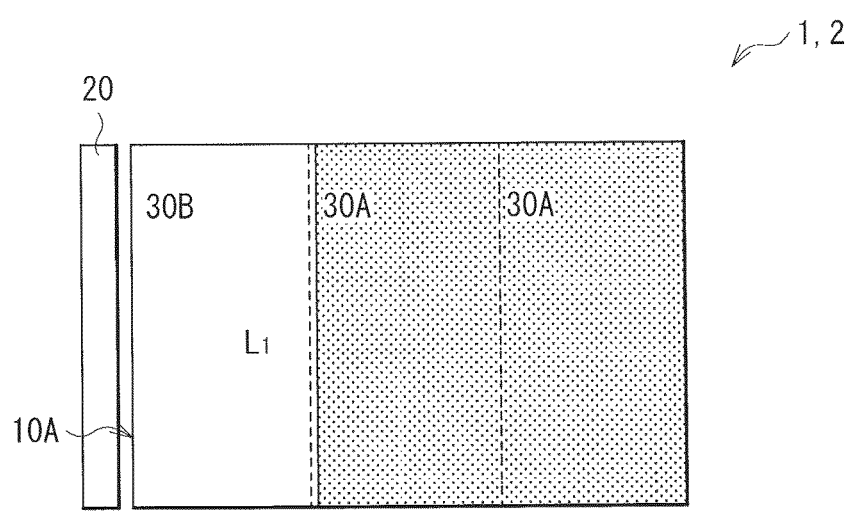
FIG. 51 is a schematic diagram for explaining about other example of the function of the light modulation device that has any of the electrodes in FIG. 43 to FIG. 46.

In the above-described respective embodiments and Modifications 1 to 17, the drive circuit 60 may apply voltages to the lower electrode 32 and the upper electrode 36 so as to scan the scattering region 30B in a direction orthogonal to the light incident face 10A. For example, as shown in FIG. 49, FIG. 50, and FIG. 51 in order, it is possible to move the scattering region 30B toward the light source 20 by application of voltage to the lower electrode 32 and the upper electrode 36 by the drive circuit 60.

Modification 19

Figure 52:
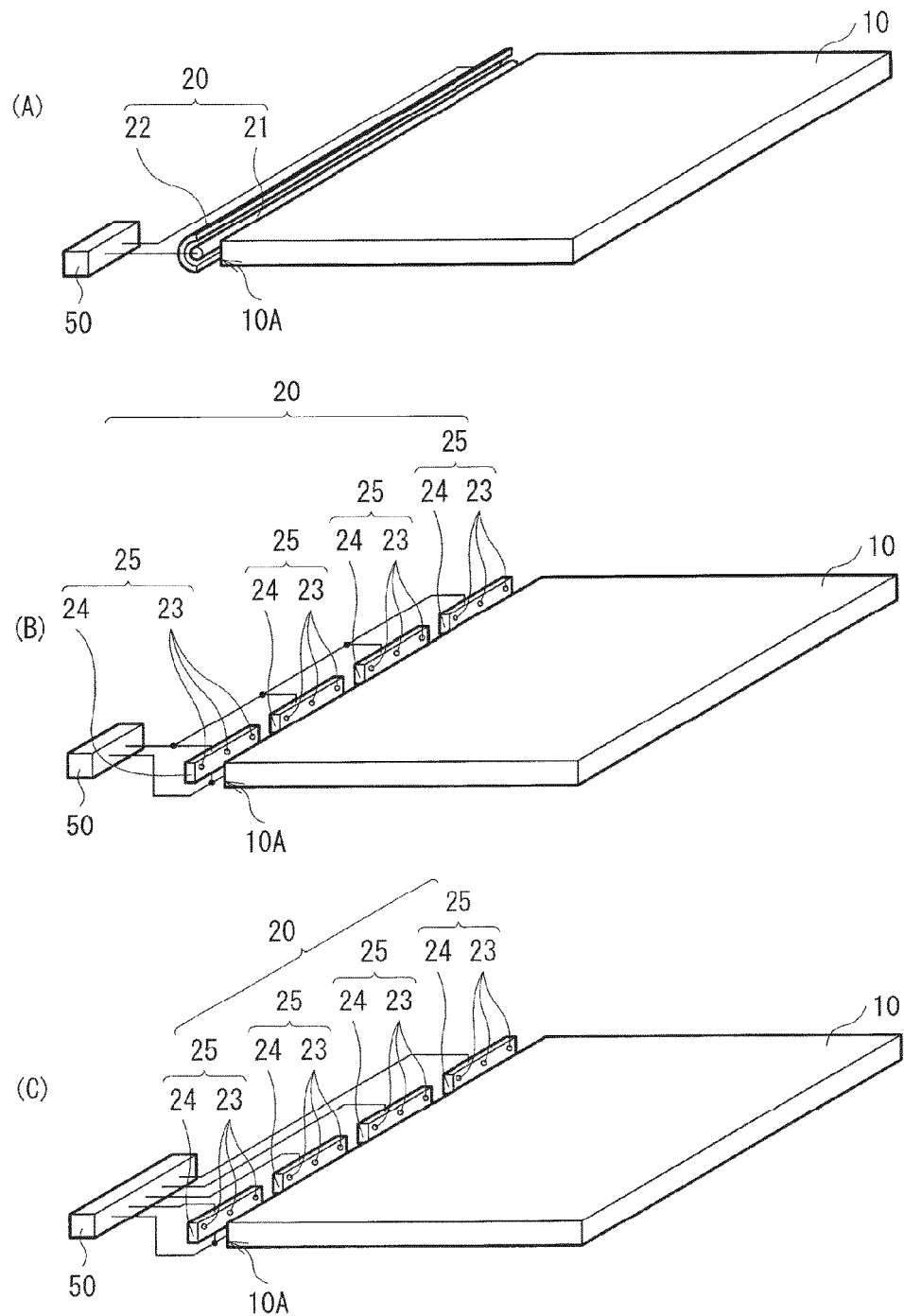
FIG. 52 is a perspective view illustrating an example of a configuration of a light source in each embodiment.

In the above-described respective embodiments and Modifications 1 to 18, the light source 20 may be configured, for example, of a linear light source 21 and a reflection mirror 22 as shown in FIG. 52A. The linear light source 21 may be configured, for example, of an HCFL or a CCFL. The reflection mirror 22 reflects, toward the light incident face 10A side, light that travels in a direction not directly entering the light incident face 10A out of light emitted from the liner light source 21. The light source 20 may be configured, for example, of a plurality of point light sources 23 that are arranged in a line, as shown in FIG. 52B or FIG. 52C. Each point light source 23 is configured to emit light toward the light incident face 10A, and may be configured, for example, of a light emitting element that has a light emission spot in a face facing the light incident face 10A. As such a light emitting element, for example, an LED, a laser diode (LD), or the like may be mentioned. In terms of efficiency, thinness, and uniformity, each point light source 23 may be preferably a white LED. It is to be noted that the plurality of point light sources 23 included in the light source 20 may be configured, for example, including a red LED, a green LED, and a blue LED.

The plurality of point light sources 23 may be provided, for example, on a two-or-more point light sources 23 basis, on a common substrate 24, as shown in FIG. 52B and FIG. 52C. In this case, one substrate 24 and a plurality of point light sources 23 provided on the substrate 24 configure a light source block 25. The substrate 24 may be, for example, a circuit substrate on which wiring is formed that electrically connects the point light sources 23 and the drive circuit 60. The respective point light sources 23 are mounted on this circuit substrate. The respective point light sources 23 (the respective point light sources 23 in the light source block 25) provided on the common substrate 24 are configured to be driven collectively (non-independently) by the drive circuit 60, and may be connected to one another in parallel or in series, for example, which is not illustrated. Alternatively, the respective point light sources 23 (the respective point light sources 23 in the light source block 25) provided on the common substrate 24 may be driven by the drive circuit 60 independently from one another. In this case, the point light sources 23 (the point light sources 23 in the light source block 25) provided on different common substrates 24 may be connected to different current paths, for example, as shown in FIG. 52C.

The light source 20 may be provided on only one side face of the light guide plate 10 as shown in FIG. 52A to FIG. 52C, or may be provided on two side faces, three side faces, or all side faces of the light guide plate 10, which is not illustrated. Further, when the light sources 20 are provided on three side faces or on all side face, only the light sources 20 provided on the facing two side faces may be lit only when performing partial lighting, and all of the light sources 20 may be lit when lighting in the entire face is performed.

Modification 20

Figure 53:
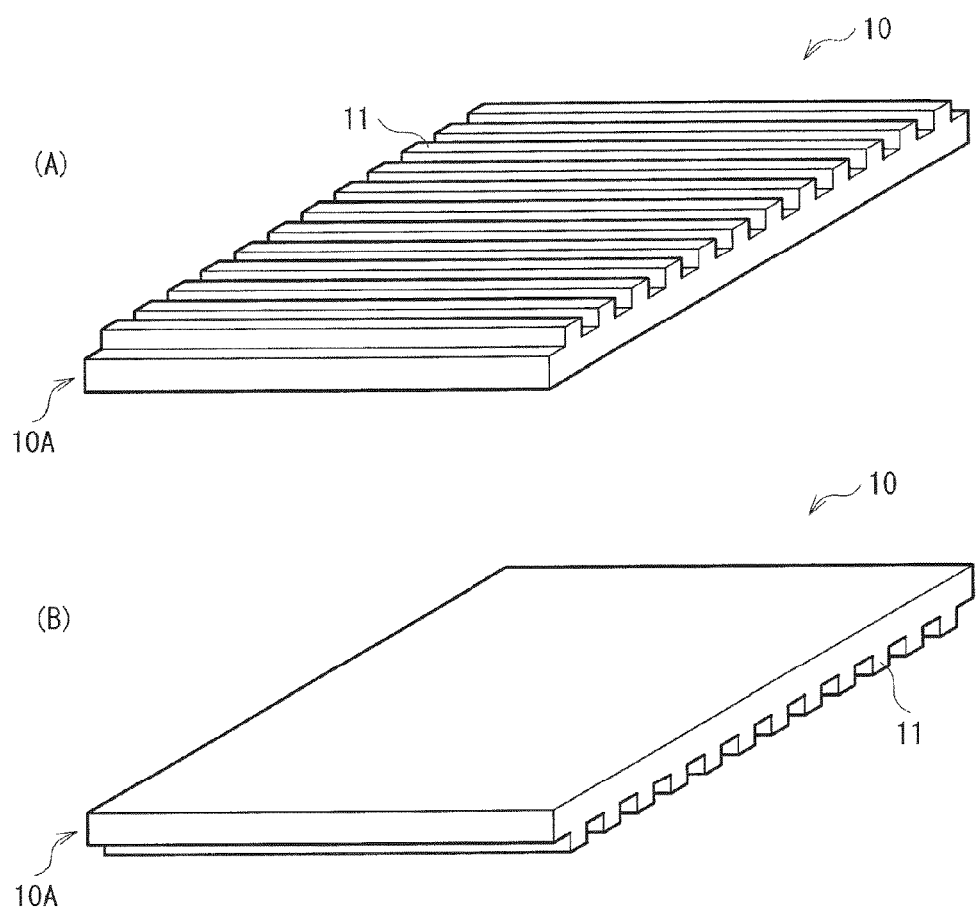
FIG. 53 is a perspective view illustrating an example of a configuration of a light guide plate in each embodiment.

In the above-described respective embodiments and Modifications 1 to 19, the light guide plate 10 may include, for example, a plurality of belt-like convex sections 11 on the top face thereof as shown in FIG. 53A. It is to be noted that the light guide plate 10 may include, for example, a plurality of belt-like convex sections 11 on the bottom face thereof as shown in FIG. 53B. Alternatively, the light guide plate 10 may include, for example, a plurality of belt-like convex sections 11 inside the light guide plate 10, which is not illustrated. Further, the inside of the light guide plate 10 may be hollow, or may be filled densely.

The respective convex sections 11 extend in a direction parallel to a normal to the light incident face 10A, and may be formed, for example, continuously from one side face of the light guide plate 10 to other side face facing that side face, as shown in FIG. 53A and FIG. 53B. A cross-section of each convex section 11 in the arrangement direction may be, for example, rectangular, trapezoidal, or triangular. When the cross-section of each convex section 11 in the arrangement direction is rectangular, straightness of light is extremely high, and such a convex section 11 is suitable for a large backlight. When the cross-section of each convex section 11 in the arrangement direction is trapezoidal, a mold is easily processed that is used to form the respective convex sections 11 by injection molding, melting-and-pushing molding, thermal press molding, etc. Also, demolding properties at the time of molding are also favorable. Therefore, it is possible to improve yield, molding speed, etc. due to decrease in defects.

Figure 54:
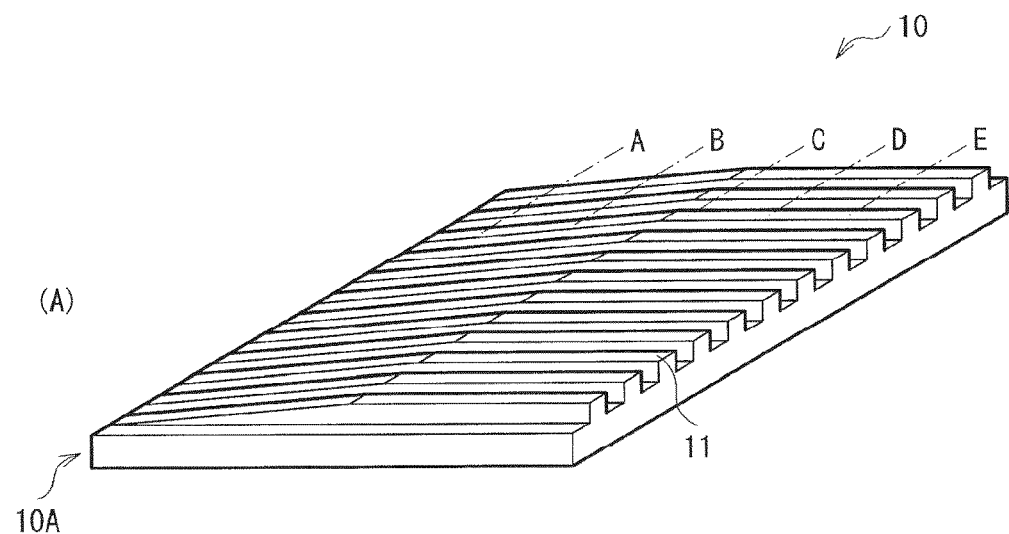
FIG. 54 includes a perspective view and a cross-sectional view illustrating another example of the configuration of the light guide plate in each embodiment.
Figure 54:
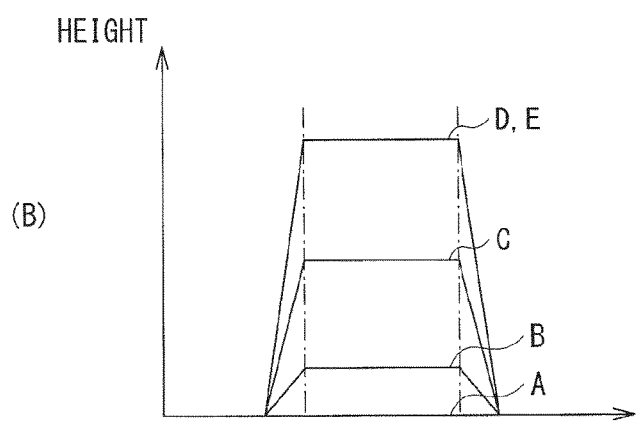

A flat face may be provided, or may not be provided between the convex sections 11 adjacent to each other. Heights of the respective convex sections 11 may be uniform in a plane, or may be non-uniform in the plane. As shown in FIG. 54A and FIG. 54B, for example, when one side face of the light guide plate 10 serves as the light incident face 10A, the heights of the respective convex sections 11 may be relatively low on the light incident face 10A side, and may be relatively high on a side of a side face that faces the light incident face 10A. Alternatively, for example, when a pair of side faces that face each other of the side faces of the light guide plate 10 serve as the light incident faces 10A, the heights of the respective convex sections 11 may be relatively low in the both light incident faces 10A and in the vicinity thereof, and may be relatively high in other portions. Out of the respective convex sections 11, the heights thereof in the light incident faces 10A and in the vicinity thereof may be zero, or substantially zero. As shown in FIG. 54A and FIG. 54B, for example, the heights of the respective convex sections 11 may increase as a distance from the light incident face 10A side, from the light incident face 10A increases. In this case, the heights of the respective convex sections 11 may be constant in the middle of a way from the light incident face 10A side to the side of the side face that faces the light incident face 10A. It is to be noted that the plurality of convex sections 11 that have non-uniform heights as shown in FIG. 54A may be provided in a place other than the top face of the light guide plate 10, and may be provided, for example, on the bottom face of or inside the light guide plate 10.

Figure 55:
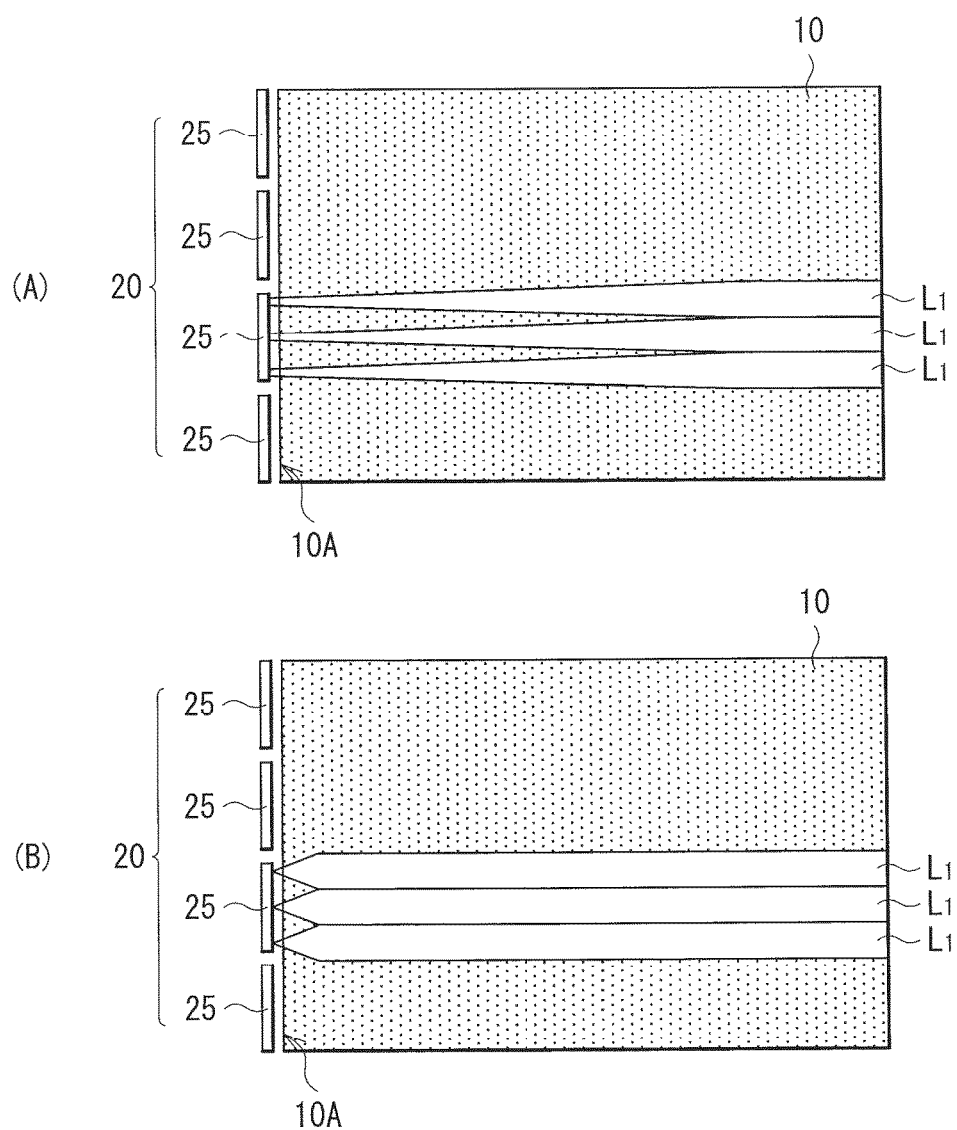
FIG. 55 is a schematic diagram illustrating an example of a function of light guide plates in FIG. 53 and FIG. 54.

As described above, by varying the heights of the convex sections 11 (in other words, depths of grooves formed between the convex sections 11), it is possible to vary straightness of light. As shown in FIG. 54A and FIG. 54B, for example, in a case where the respective convex sections 11 are provided also in the light incident face 10A and in the vicinity thereof, for example, when one light source block 25 is lit, light L1 outputted from that light source block 25 propagates inside the light guide plate 10 without spreading a lot in a lateral direction (a width direction) as exemplified in FIG. 55A, for example. In this case, a dark portion may be caused between the point light sources 23 in the vicinity of the light incident face 10A. In that case, image quality may be decreased. Therefore, in such a case, as shown in FIG. 54A and FIG. 54B, for example, the heights of the respective convex sections 11 may be preferably allowed to be relatively low, or to be zero in the light incident face 10A and in the vicinity thereof. Thus, as shown in FIG. 55B, for example, the light L1 outputted from the light source block 23 may be allowed to spread in the lateral direction (the width direction) at a divergence angle of the point light source 23 in the light incident face 10A and in the vicinity thereof, and to propagate with a substantially-constant width in a region away from the light incident face 10A.

Modification 21

Figure 56:
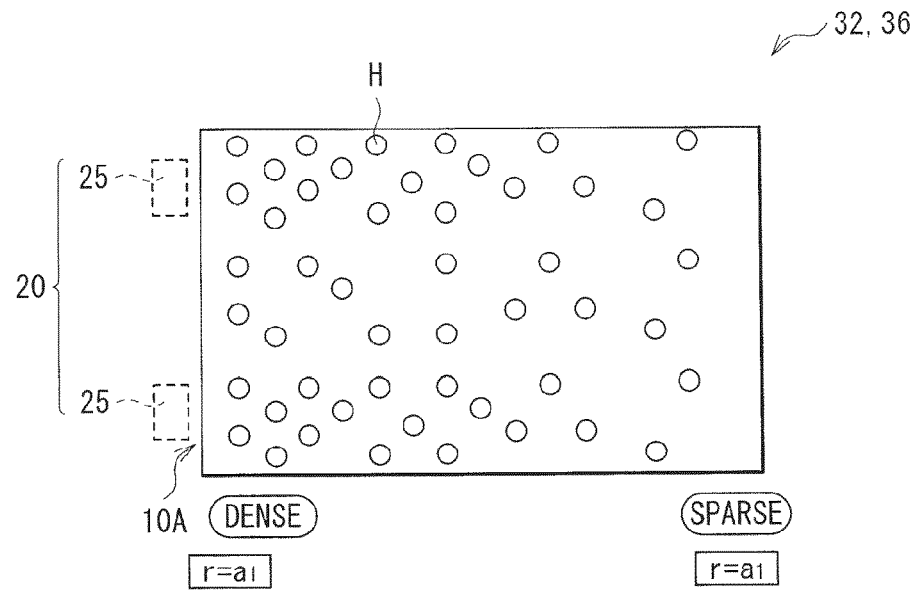
FIG. 56 is a diagram illustrating a sixteenth modification of the electrode in FIG. 2.
Figure 57:
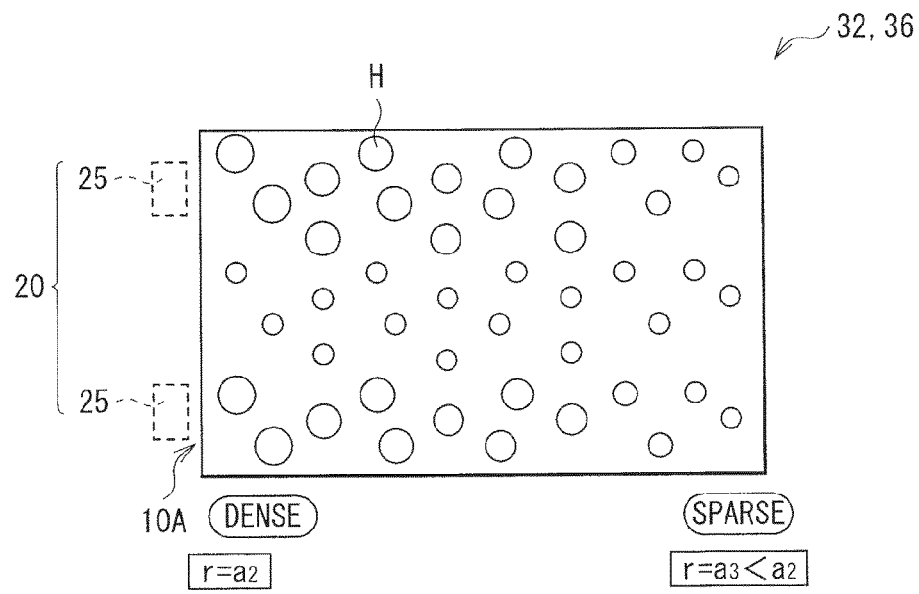
FIG. 57 is a diagram illustrating a seventeenth modification of the electrode in FIG. 2.
Figure 58:
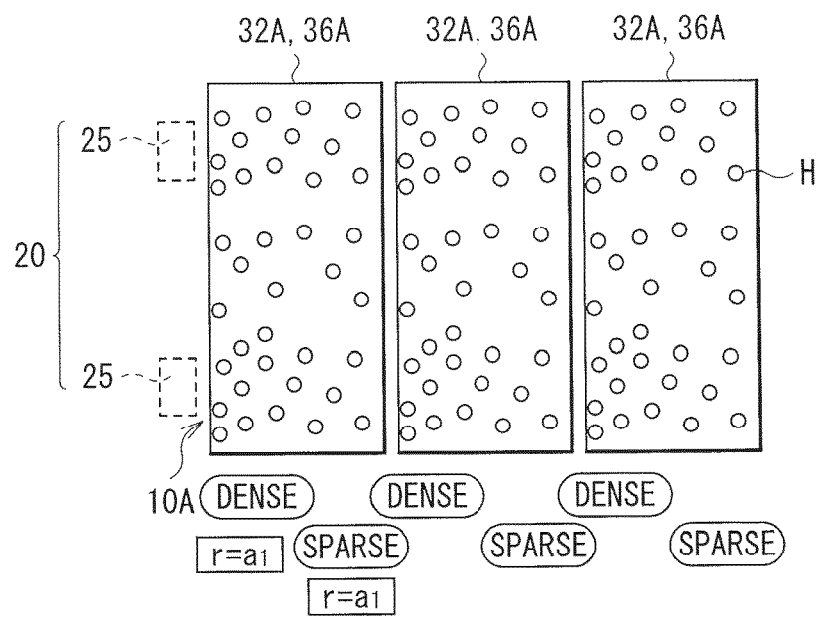
FIG. 58 is a diagram illustrating an eighteenth modification of the electrode in FIG. 2.
Figure 59:
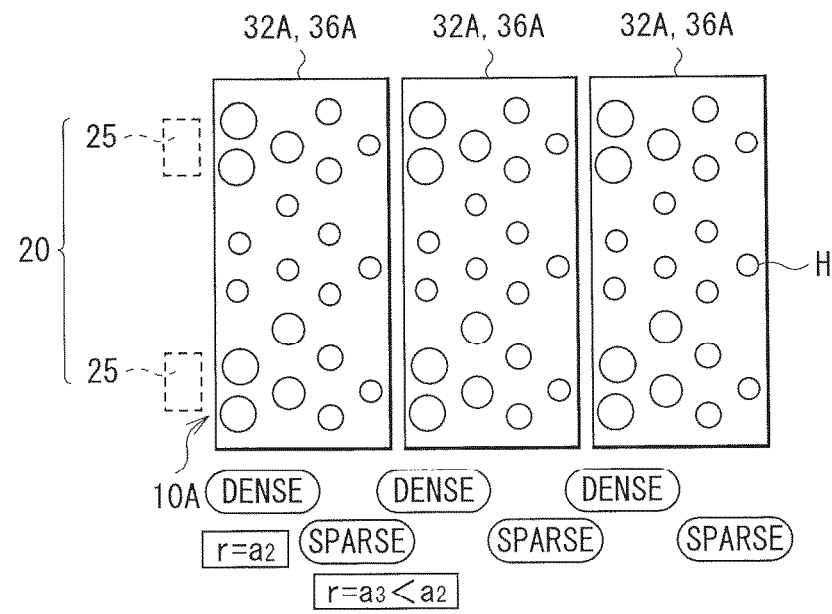
FIG. 59 is a diagram illustrating a nineteenth modification of the electrode in FIG. 2.
Figure 60:
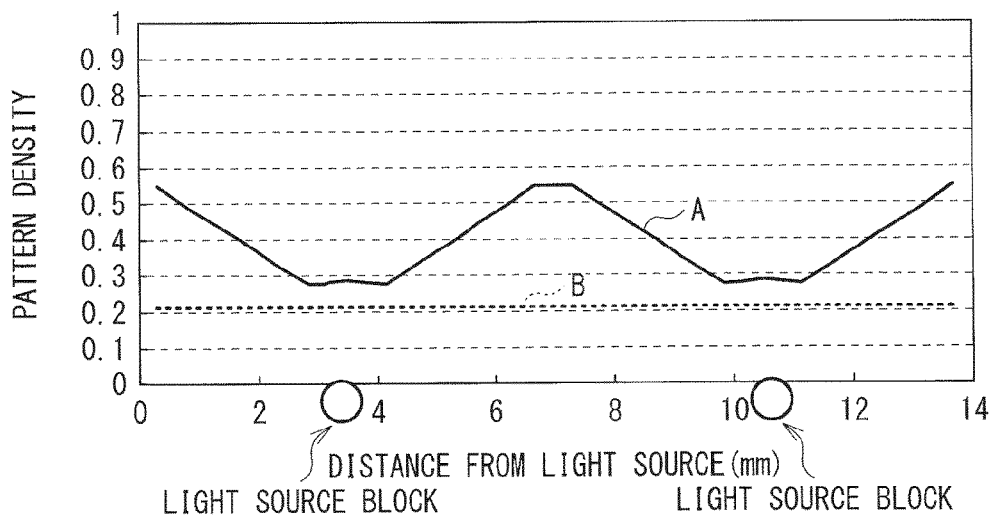
FIG. 60 is a diagram illustrating an example of pattern density distribution in electrodes in FIG. 43 to FIG. 46 and FIG. 56 to FIG. 59.
Figure 61:
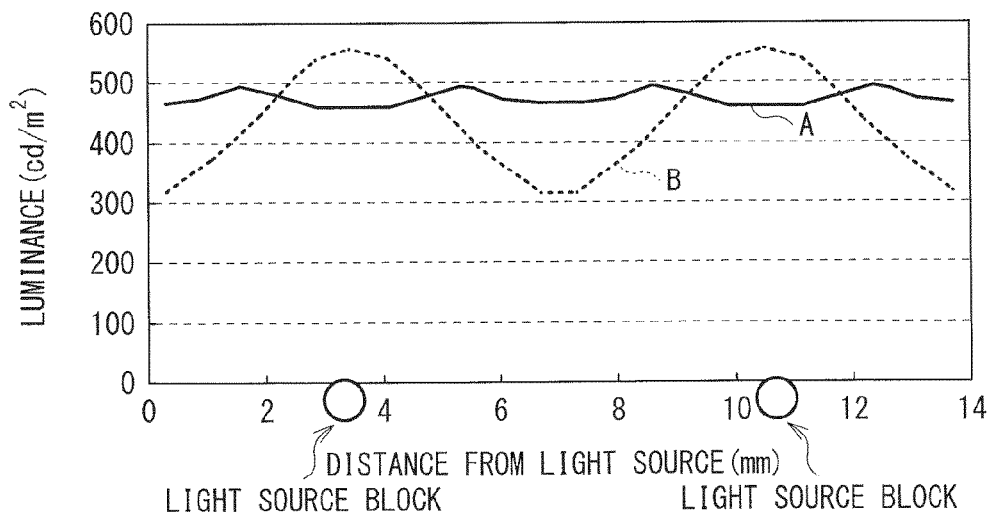
FIG. 61 is a diagram illustrating an example of luminance distribution in a case where an electrode that has pattern density in FIG. 60 is used.

In the above-described Modification 19, as shown in FIG. 52B and FIG. 52C, for example, the light source 20 may be configured of a plurality of light source blocks 25 that are arranged in a line. In this case, when a gap between the two light source blocks 25 adjacent to each other is wide, density of the apertures H per unit area in the direction parallel to the light incident face 10A may be relatively high in a place closer to the light source block 25, and may be relatively low in a place away from the light source block 25, in the direction parallel to the light incident face 10A. As shown in FIG. 56 and FIG. 58, for example, the number of the apertures H (constant radius) per unit area may be relatively large in a place closer to the light source block 25, and may be relatively small in a place away from the light source block 25, in the direction parallel to the light incident face 10A. Alternatively, as shown in FIG. 57 and FIG. 59, for example, the radii of the apertures H may be relatively large in a place closer to the light source block 25, and may be relatively small in a place away from the light source block 25, in the direction parallel to the light incident face 10A. In such a case, it is possible to suppress luminance in a place closer to the light source block 25 to be lower than that in a case without the aperture H, and is possible to allow the luminance in the place away from the light source block 25 to be higher than that in the case without the aperture H, in the direction parallel to the light incident face 10A. As a result, for example, when the entire light emission region of the backlight 1 or 2 is allowed to be in the bright state, it is possible to allow the in-plane luminance to be uniform. For example, when patterning density of a place 2 mm away from the light incident face 10A has distribution as shown by A in FIG. 60, as shown by A in FIG. 61, it is possible to allow in-plane luminance to be uniform in the direction parallel to the light incident face 10A. On the other hand, for example, when patterning density in the place 2 mm away from the light incident face 10A has flat distribution as shown by B in FIG. 60, as shown by B in FIG. 61, in-plane luminance varies largely in the direction parallel to the light incident face 10A. It is to be noted that, in the present modification, when the point light source 23 is used instead of the light source block 25, the density of the apertures H per unit area may be relatively high in a place closer to the point light source 23, and may be relatively low in a place away from the point light source 23, in the direction parallel to the light incident face 10A. Also in such a case, it is possible to allow in-plane luminance to be uniform in the direction parallel to the light incident face 10A.

Modification 22

Figure 62:
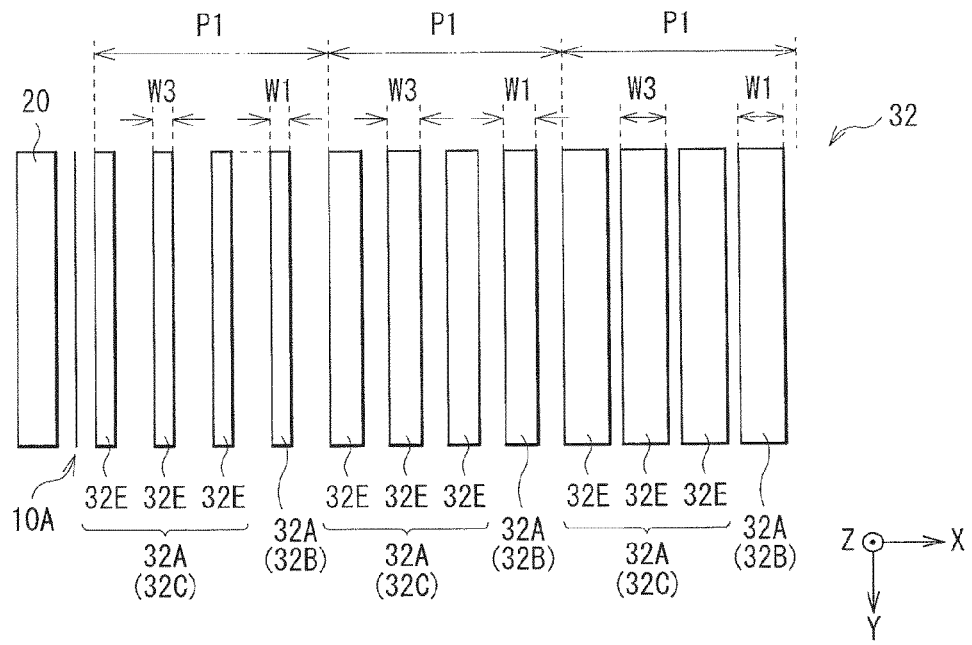
FIG. 62 is a diagram illustrating a twentieth modification of the electrode in FIG. 2.

In the above-described respective embodiments and Modifications 1 to 21, when each sub-electrode 32C is configured of a plurality of belt-like sub-electrodes 32E that extend in one direction (the direction parallel to the light incident face 10A) in a plane, a width W1 of the sub-electrode 32B and a width W3 of the sub-electrode 32E may be different depending on a distance from the light source 20. As shown in FIG. 62, for example, the width W1 of the sub-electrode 32B and the width W3 of the sub-electrode 32E may be relatively small in a place closer to the light source 20, and may be relatively large in a place away from the light source 20. In such a case, for example, when the entire light emission region of the illumination unit 1 or 2 is allowed to be in the bright state, it is possible to allow in-plane luminance to be uniform. Further, for example, when white display is performed in a region close to the light source 20 and in a region far from the light source 20 in the direction perpendicular to the light incident face 10A, it is possible to allow white luminance to be equal in both regions.

Modification 23

Figure 63:
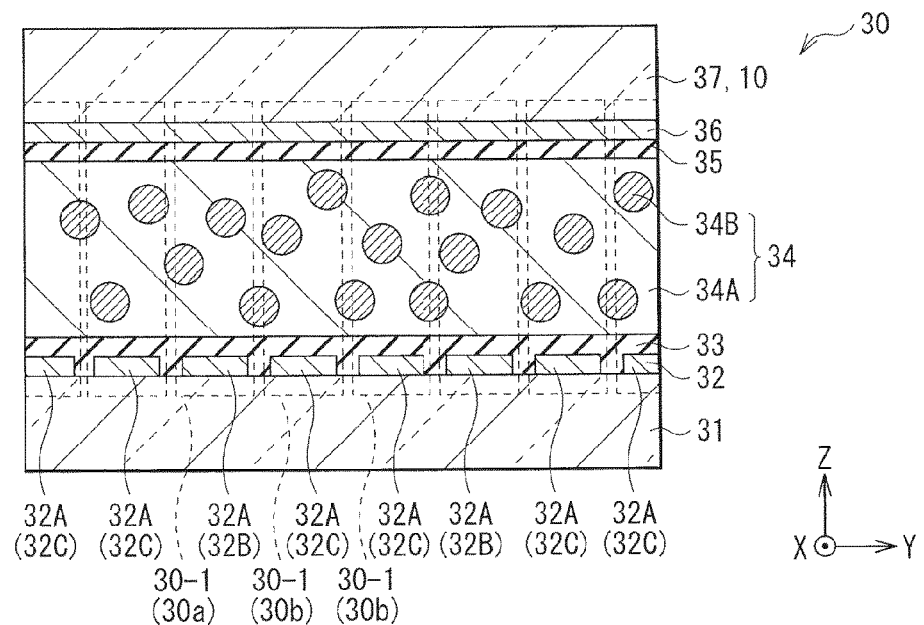
FIG. 63 is a diagram illustrating a first modification of the cross-sectional configuration of the light modulation device in FIG. 1.
Figure 64:
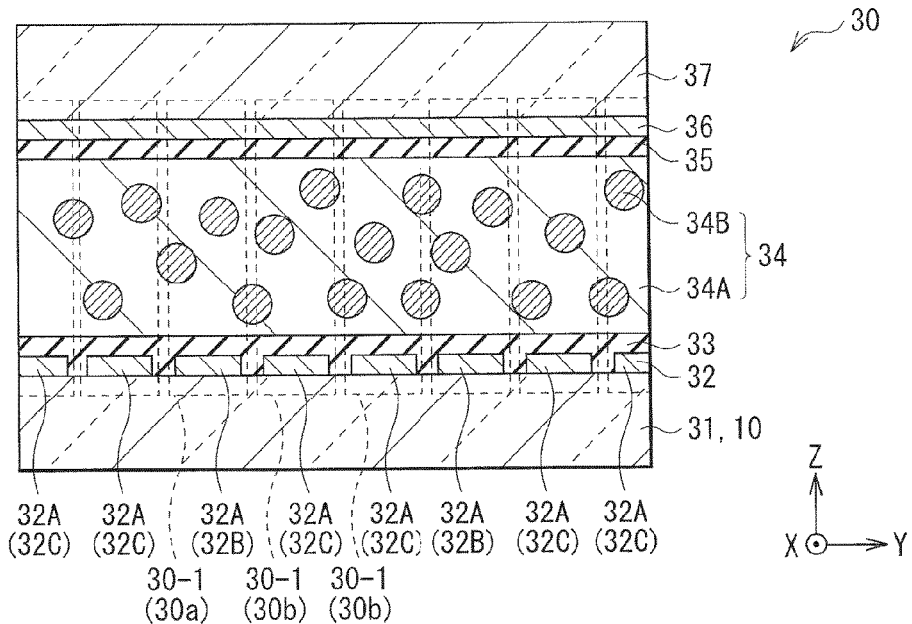
FIG. 64 is a diagram illustrating a second modification of the cross-sectional configuration of the light modulation device in FIG. 1.
Figure 65:
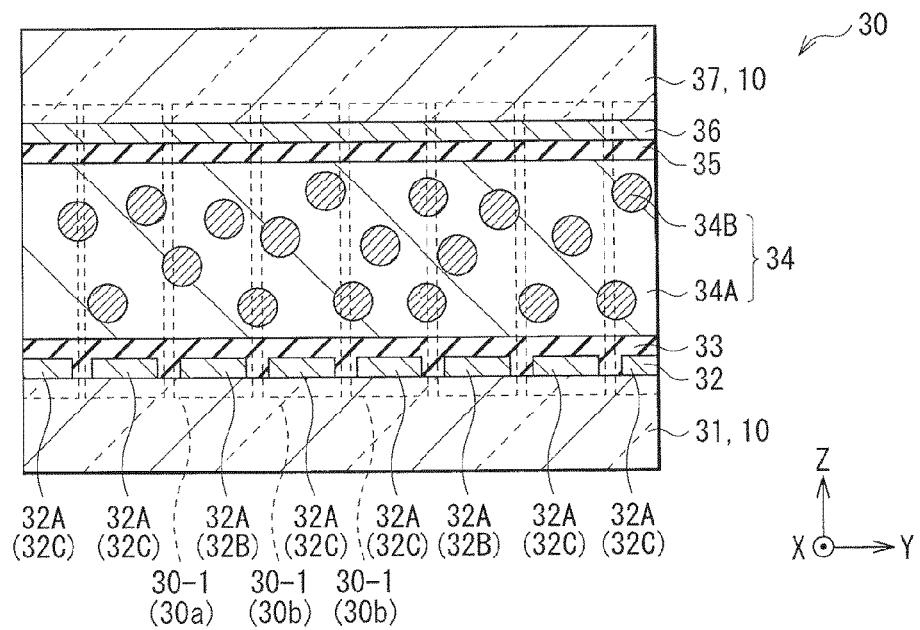
FIG. 65 is a diagram illustrating a third modification of the cross-sectional configuration of the light modulation device in FIG. 1.

Moreover, in the above-described respective embodiments and Modifications 1 to 22, at least one of the transparent substrate 31 and the transparent substrate 37 may be formed integrally with the light guide plate 10. For example, in the above-described respective embodiments, the first modification, and the second modification, when the transparent substrate 37 is in contact with the light guide plate 10, for example, the transparent substrate 37 may be formed integrally with the light guide plate 10 as shown in FIG. 63. In this case, the transparent substrate 37 corresponds to a specific example of "first transparent substrate" or "second transparent substrate" in the present technology. Moreover, for example, in the above-described respective embodiments and Modifications 1 to 22, when the transparent substrate 31 is in contact with the light guide plate 10, for example, the transparent substrate 31 may be formed integrally with the light guide plate 10 as shown in FIG. 64. In this case, the transparent substrate 31 corresponds to a specific example of "first transparent substrate" or "second transparent substrate" in the present technology. Moreover, for example, in the above-described respective embodiments and Modifications 1 to 22, when both of the transparent substrates 31 and 37 are in contact with the light guide plate 10, for example, the transparent substrates 31 and 37 may be formed integrally with the light guide plate 10 as shown in FIG. 65. In this case, the transparent substrate 31 or the transparent substrate 37 corresponds to a specific example of "first transparent substrate" or "second transparent substrate" in the present technology.

Modification 24

Figure 66:
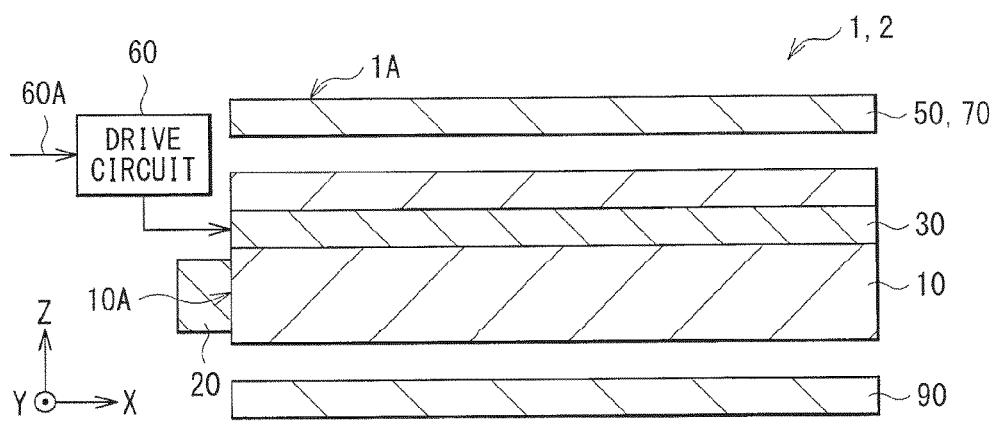
FIG. 66 is a diagram illustrating a fourth modification of the cross-sectional configuration of the illumination units in FIG. 1 and FIG. 11.

Moreover, in the above-described respective embodiments and Modifications 1 to 23, a light reflection suppression layer may be provided instead of the reflective plate 40. The light reflection suppression layer may be, for example, a component in which a low-reflectance material is applied on a surface of a base, or a component in which a material that absorbs light is applied on the surface of the base. As shown in FIG. 66, for example, a light reflection suppression layer 90 may be provided instead of the reflective plate 40. The light reflection suppression layer 90 may be configured, for example, of a component in which a low-reflectance material is applied on a surface of a base, or a component in which a material that absorbs light is applied on the surface of the base. By thus providing the light reflection suppression layer 90, it is possible to suppress a ratio, to be low, of the light that has been reflected by the reflective plate 40 to pass through the transmission region 30A and to enter the display panel 210. As a result, it is possible to increase contrast.

Modification 25

Moreover, in the above-described respective embodiments and Modifications 1 to 24, horizontal alignment films are used as the alignment films 33 and 35. However, vertical alignment films may be used. However, in such a case, as the liquid crystal molecules included in the microparticles 34B, those having negative dielectric constant anisotropy (so-called negative liquid crystal) may be preferably used.

Modification 26

Moreover, in the above-described respective embodiments and Modifications 1 to 25, thicknesses of the transparent members (the transparent substrate 37 and the light guide plate 10) arranged on the light emitting face 1A side may be reduced in a relationship with the light modulation layer 34. In such a case, light condensing rate is decreased, and therefore, the width of light emission line (the width of the scattering region) in the illumination unit 1 or 2 becomes small. As a result, when the illumination unit 1 or 2 is used as the backlight of the display apparatus, double images formed in the front direction of the display apparatus is allowed to be less likely to be seen at the time of three-dimensional display. Moreover, the viewing angle in the parallax direction at the time of three-dimensional display is not narrowed by the lens sheet 50 or 70 due to the decrease in the light condensing rate, and is allowed to be sufficiently large for practical use.

4. Third Embodiment

Description will be given on a receiving-transmitting system of a television broadcasting signal that includes the illumination unit 1 or 2 according to the above-described respective embodiments and Modifications 1 to 26.

Figure 67:
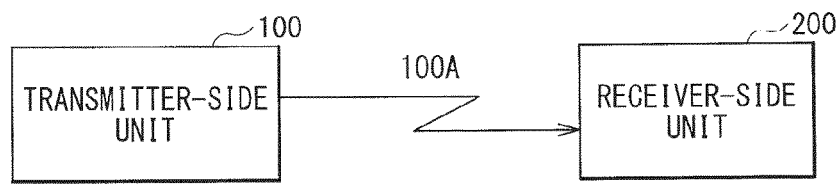
FIG. 67 is a diagram illustrating an example of a receiving-transmitting system of a television broadcasting signal according to a third embodiment of the present technology.

FIG. 67 is a block diagram illustrating a configuration example of a receiving-transmitting system of a television broadcasting signal 100A according to a third embodiment of the present technology. This receiving-transmitting system may include, for example, a transmitter-side unit 100 and a receiver-side unit 200. The transmitter-side unit 100 transmits a television broadcasting signal via wire (such as a cable TV) or radio (such as terrestrial digital wave and satellite wave). The receiver-side unit 200 receives the television broadcasting signal from the transmitter-side unit 100 via the above-described wire or radio. It is to be noted that the receiver-side unit 200 corresponds to a specific example of "display apparatus" in the present technology.

The television broadcasting signal 100A includes image data for two-dimensional display (planar display) or image data for three-dimensional display (stereoscopic display). Here, the image data for two-dimensional display refers to two-dimensional image data that does not have perspective information. Further, the image data for three-dimensional display refers to two-dimensional image data that has perspective information. The image data for three-dimensional display is configured including a plurality of two-dimensional image data that have perspectives different from one another. The transmitter-side unit 100 may be, for example, a television broadcasting signal transmitter placed in a broadcasting station, a server on the Internet, etc.

[Functional Block of Receiver-Side Unit 200]

Figure 68:
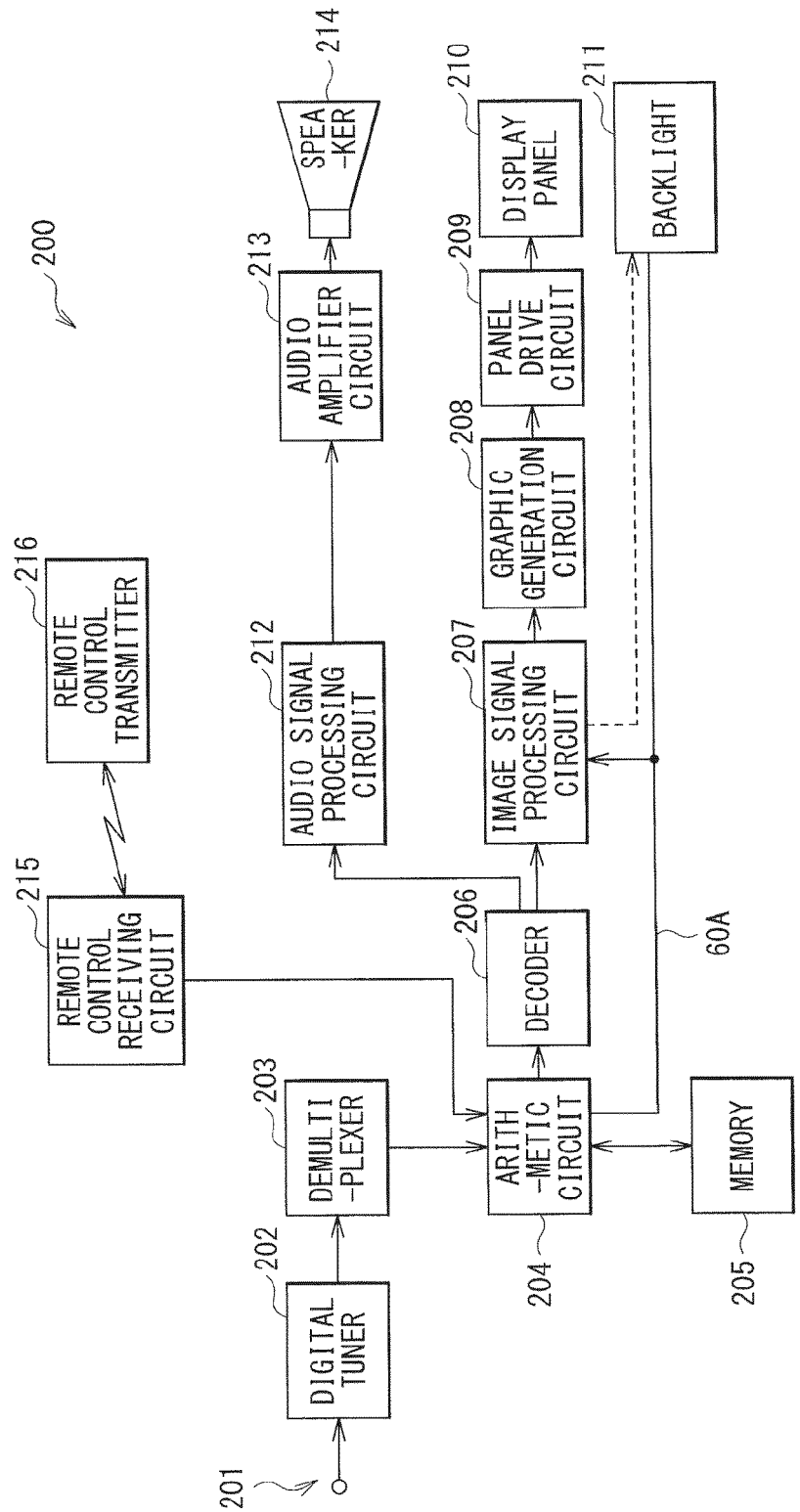
FIG. 68 is a diagram illustrating an example of a functional block of a receiver-side unit in FIG. 67.

FIG. 68 is a block diagram illustrating a configuration example of the receiver-side unit 200. The receiver-side unit 200 may be, for example, a television connectable to the above-described wire or radio. The receiver-side unit 200 may include, for example, an antenna terminal 201, a digital tuner 202, a demultiplexer 203, an arithmetic circuit 204, and a memory 205. The receiver-side unit 200 may also include, for example, a decoder 206, an image signal processing circuit 207, a graphic generation circuit 208, a panel drive circuit 209, the display panel 210, a backlight 211, an audio signal processing circuit 212, an audio amplifier circuit 213, and a speaker 214. The receiver-side unit 200 may further include, for example, a remote control receiving circuit 215 and a remote control transmitter 216.

It is to be noted that the backlight 211 corresponds to the illumination unit 1 or 2 according to the above-described respective embodiments and the modifications thereof. Further, the display panel 210 corresponds to a specific example of "display panel" in the present technology, and the backlight 211 corresponds to a specific example of "illumination unit" in the present technology.

The antenna terminal 201 is a terminal that inputs the television broadcasting signal received by the receiving antenna (not illustrated). For example, the digital tuner 202 may processes the television broadcasting signal inputted to the antenna terminal 201, and may output predetermined transport stream corresponding to a channel selected by a user. For example, the demultiplexer 203 may extract partial TS (Transport Stream) corresponding to the channel selected by the user from the transport stream obtained by the digital tuner 202.

The arithmetic circuit 204 controls operation of each section in the receiver-side unit 200. For example, the arithmetic circuit 204 may store, in the memory 205, the partial TS obtained by the demultiplexer 203, or may transmit the partial TS read from the memory 205 to the decoder 206. Further, for example, the arithmetic circuit 204 may transmit, to the image signal processing circuit 207 and the backlight 211, a control signal 60A that specifies two-dimensional display or three-dimensional display. The arithmetic circuit 204 may set the above-described control signal 60A, for example, based on setting information stored in the memory 205, predetermined information included in the partial TS, or setting information inputted from the remote control receiving circuit 215.

For example, the memory 205 may store the setting information of the receiver-side unit 200 and manage data of the receiver-side unit 200. For example, the memory 205 may be allowed to store the partial TS obtained by the demultiplexer 203, the setting information such as a display method, etc.

For example, the decoder 206 may obtain image data by performing a decoding process on image PES (Packetized Elementary Stream) packets included in the partial TS obtained by the demultiplexer 203. Further, for example, the decoder 206 may obtain audio data by performing a decoding process on audio PES packet included in the partial TS obtained by the demultiplexer 203. Here, the image data refers to the image data for two-dimensional display or the image data for three-dimensional display.

For example, the image signal processing circuit 207 and the graphic generation circuit 208 may perform a multiple image process, an imposing process of graphics data, etc. as necessary on the image data obtained by the decoder 206.

In a case where a signal that specifies three-dimensional display is inputted as the control signal 60A from the arithmetic circuit 204, and when the image data inputted from the decoder 206 is the image data for three-dimensional display, for example, the image signal processing circuit 207 may generate one two-dimensional image data with the use of a plurality of two-dimensional image data that are included in the image data for three-dimensional display inputted from the decoder 206 and have perspectives different from one another, and may select the generated two-dimensional image data as image data to be outputted to the graphic generation circuit 208. For example, when the image data for three-dimensional display includes two two-dimensional image data that have perspectives different from each other, the image signal processing circuit 207 may perform, for each row, a process of arranging two two-dimensional image data alternately one by one in the horizontal direction, and may generate one image data in which two two-dimensional image data are arranged alternately in the horizontal direction. Similarly, for example, when the image data for three-dimensional display includes four two-dimensional image data that have perspectives different from one another, the image signal processing circuit 207 perform, for each row, a process of arranging four two-dimensional image data cyclically one by one in the horizontal direction, and may generate one image data in which four two-dimensional image data are arranged cyclically one by one in the horizontal direction.

In a case where a signal that specifies two-dimensional display is inputted as the control signal 60A from the arithmetic circuit 204, and when the image data inputted from the decoder 206 is the image data for three-dimensional display, for example, the image signal processing circuit 207 may select any one image data of the plurality of two-dimensional image data that are included in the image data for three-dimensional display inputted from the decoder 206 and that have perspectives different from one another, as the image data to be outputted to the graphic generation circuit 208. In a case where a signal that specifies two-dimensional display is inputted as the control signal 60A from the arithmetic circuit 204, and when the image data inputted from the decoder 206 is the image data for two-dimensional display, for example, the image signal processing circuit 207 may select the image data for two-dimensional display inputted from the decoder 206, as the image data to be outputted to the graphic generation circuit 208.

For example, the graphic generation circuit 208 may generate a UI (User Interface) screen that is used at the time of screen display. For example, the panel drive circuit 209 may drive the display panel 210 based on the image data outputted from the graphic generation circuit 208.

A configuration of the display panel 210 will be described in detail later. For example, the audio signal processing circuit 212 may perform a process such as D/A conversion on the audio data obtained by the decoder 206. For example, the audio amplifier circuit 213 may amplify an audio signal outputted from the audio signal processing circuit 212, and may supply the amplified audio signal to the speaker 214.

For example, the remote control receiving circuit 215 may receive a remote control signal transmitted from the remote control transmitter 216, and may supply the received remote control signal to the arithmetic circuit 204. For example, the arithmetic circuit 204 may control each section in the receiver-side unit 200 in accordance with the remote control signal.

[Cross-Sectional Configuration of Receiver-Side Unit 200]

Figure 69:
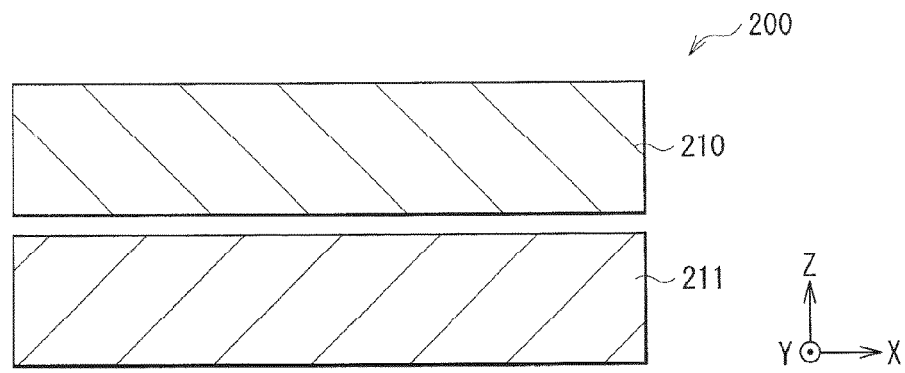
FIG. 69 is a diagram illustrating a cross-sectional configuration example of a display section in the receiver-side unit in FIG. 67.

FIG. 69 illustrates an example of a cross-sectional configuration of the display section in the receiver-side unit 200. It is to be noted that FIG. 69 is a schematic illustration, and may not be the same as the actual dimensions and shapes. The receiver-side unit 200 includes the display panel 210, and the backlight 211 that is arranged on the back of the display panel 210.

The display panel 210 generates image light by modulating the illumination light from the backlight 211 in accordance with the image signal. The display panel 210 includes a plurality of pixels that are arranged two-dimensionally, and displays an image by drive of the respective pixels or specific pixels. The display panel 210 may be, for example, a transmissive liquid crystal display (LCD) panel in which the respective pixels or the specific pixels are driven in accordance with the image signal. The display panel 210 may have a structure in which a liquid crystal layer is sandwiched by a pair of transparent substrates. The display panel 210 may include, for example, a polarizing plate, a transparent substrate, a pixel electrode, an alignment film, a liquid crystal layer, an alignment film, a common electrode, a color filter, a transparent substrate, and a polarizing plate in order from the backlight 211, which are not illustrated. It is to be noted that, in the display panel 210, a lamination configured of the transparent substrate, the pixel electrode, the alignment film, the liquid crystal layer, the alignment film, the common electrode, the color filter, and the transparent substrate corresponds to a liquid crystal panel 210A. Further, the polarizing plate on the backlight 211 side corresponds to a polarizing plate 210B in FIG. 70, and the polarizing plate on a side opposite from the backlight 211 corresponds to a polarizing plate 210C in FIG. 70.

The transparent substrate is configured of a substrate transparent with respect to visible light, and may be configured, for example, of a plate glass. It is to be noted that, an active drive circuit that includes a TFT (Thin Film Transistor) electrically connected to the pixel electrode, a wiring, etc. is formed on the transparent substrate on the backlight 211 side, which is not illustrated. The pixel electrodes and the common electrode may be configured, for example, of indium tin oxide (ITO). The pixel electrodes are arranged two-dimensionally on the transparent substrate, and serve as electrodes for the respective pixels. On the other hand, the common electrode is formed on one face on the color filter, and serves as a common electrode that faces the respective pixel electrodes. The alignment film may be configured, for example, of a polymer material such as polyimide, and performs an alignment process on liquid crystal.

The liquid crystal layer may be configured, for example, of liquid crystal of a VA (Vertical Alignment) mode, a TN (Twisted Nematic) mode, or a STN (Super Twisted Nematic) mode. The liquid crystal layer may have a function that varies a direction of a polarization axis of the light emitted from the backlight 211 for each pixel by a voltage applied from a drive circuit (not illustrated). It is to be noted that a direction of a transmission axis of each pixel is adjusted in multiple steps by varying the arrangement of the liquid crystal in multiple steps. The color filter may be configured, for example, of color filters that are arranged in correspondence with the arrangement of the pixel electrodes. Such color filters each may perform color separation on the light that has passed through the liquid crystal layer into three primary colors of red (R), green (G), and blue (B), or into four colors of R, G, B, and white (W).

The polarizing plate is a kind of an optical shutter, and allows light (polarized light) having a certain vibration direction to be transmitted therethrough. It is to be noted that the polarizing plate may be an absorption-type polarizer that absorbs light (polarized light) that has a vibration direction other than the transmission axis. However, the polarizing plate may be preferably a reflective polarizer that reflects such light toward the backlight 211 in terms of improvement in luminance. The two polarizing plates are arranged to allow the polarization axes to be different from each other by 90°. Thus, the light emitted from the backlight 211 is transmitted or blocked with the liquid crystal layer in between.

Figure 70:
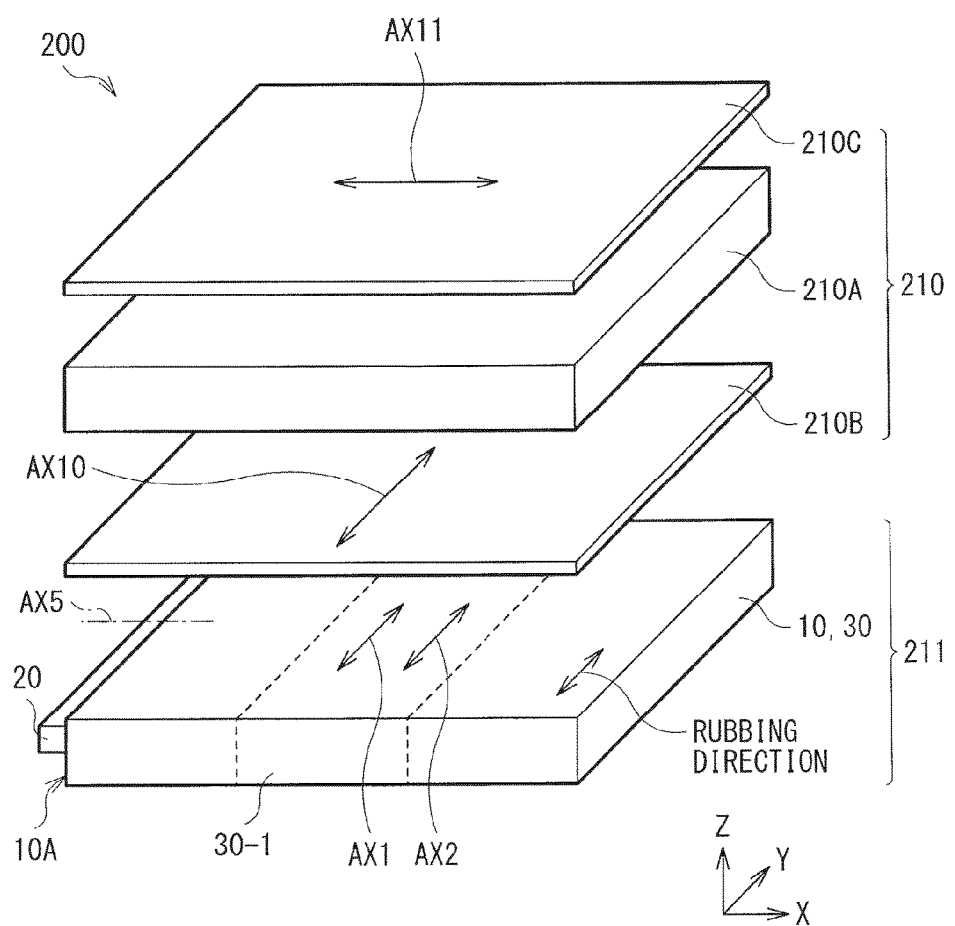
FIG. 70 is a perspective view illustrating an example of a relationship between a rubbing direction and a transmission axis of a polarizing plate in the receiver-side unit in FIG. 67.

By the way, in the present embodiment, upon no voltage application, the optical axis AX1 of the bulk 34A and the optical axis AX2 of the microparticle 34B may preferably have components of the optical axes in the same direction mainly, and for example, as shown in FIG. 70, may be preferably aligned in the rubbing direction of the alignment films 33 and 35. Further, upon no voltage application, for example, the optical axes AX1 and AX2 may preferably have components of the optical axes in a direction parallel to a transmission axis AX10 of the polarizing plate 210B on the backlight 211 side mainly, as shown in FIG. 70. The transmission axis AX10 may be preferably aligned in the rubbing direction of the alignment films 33 and 35 as shown in FIG. 70, for example.

Figure 71:
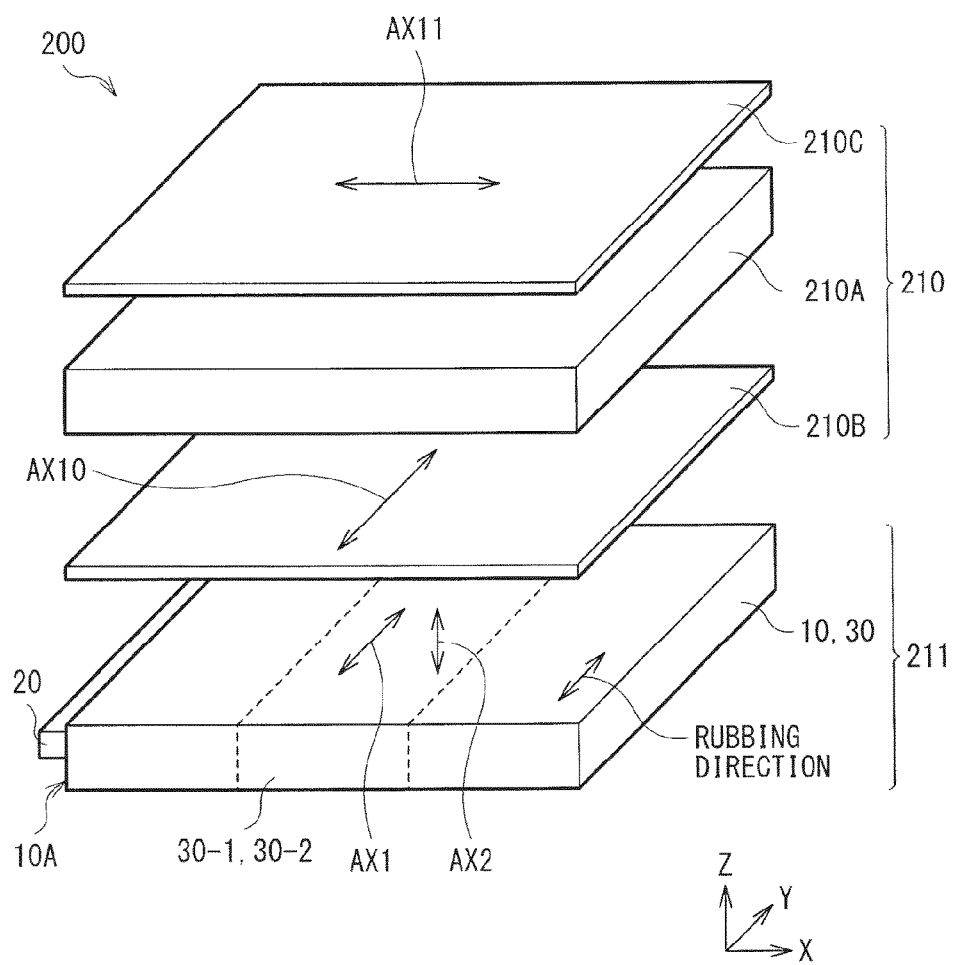
FIG. 71 is a perspective view illustrating another example of the relationship between the rubbing direction and the transmission axis of the polarizing plate in the receiver-side unit in FIG. 67.

Moreover, upon voltage application, the optical axis AX1 may be preferably aligned in a direction same as or almost the same as that upon no voltage application. Upon voltage application, the optical axis AX1 mainly has the component of the optical axis in the direction parallel to the transmission axis AX10 of the polarizing plate 210B, and for example, may be preferably aligned in the direction parallel to the transmission axis AX10 as shown in FIG. 71. Upon voltage application, the optical axis AX1 is aligned in a direction intersecting with or being orthogonal to (or being almost orthogonal to) an optical axis AX5 of the light source 20, and further, may be preferably parallel or almost parallel to the transparent substrate 31.

On the other hand, upon voltage application, the optical axis AX2 may be preferably displaced in a predetermined direction being influenced by an electric field generated by the voltages applied to the lower electrode 32 and the upper electrode 36. Upon voltage application, the optical axis AX2 may preferably intersect or be orthogonal to (or be almost orthogonal to) the transparent substrate 31 as shown in FIG. 2 and FIG. 71, for example. In other words, the optical axis AX2 may be preferably displaced in a direction in which an angle formed by the optical axis AX2 and a normal to the transparent substrate 31 to be smaller by application of voltages to the lower electrode 32 and the upper electrode 36. In this case, the optical axis AX2 intersects or is orthogonal to (or is almost orthogonal to) the optical axis AX1, and may preferably intersect or be orthogonal to (or be almost orthogonal to) the transparent substrate 31.

The backlight 211 corresponds to the illumination unit 1 or 2 according to the above-described respective embodiments and the modifications thereof. Therefore, the backlight 211 includes the lens sheet 50 or the lens sheet 70 on the light guide plate 10. The belt-like convex section 50A or the belt-like convex section 70A extends in a direction parallel to the pixel column in the display panel 10.

Next, description will be given on functions and effects of the receiver-side unit 200 of the present embodiment.

In the receiver-side unit 200 in the present embodiment, the illumination unit 1 or the illumination unit 2 according to the above-described embodiments and the modifications thereof is used as the backlight 211. Therefore, at the time of three-dimensional display, a plurality of linear illumination lights are outputted in the front direction from a predetermined region in the light emitting face of the backlight 211. Accordingly, the respective linear illumination lights outputted in the front direction enter the back face of the display panel 210.

Figure 72:
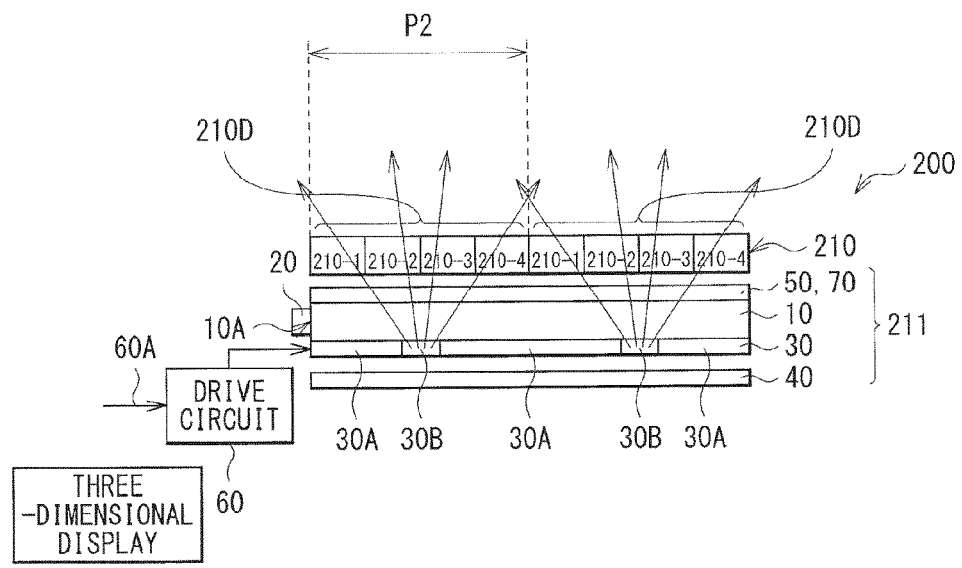
FIG. 72 is a schematic diagram for explaining three-dimensional display in a display section in FIG. 68.

Here, when the two-dimensional image data for three-dimensional display is generated in the image signal processing circuit 207 to be the pixel column of pixels 210D for three-dimension for each pixel arrangement (in other words, for pixel columns of the number equal to the number of the perspectives) corresponding to each light modulation cell 30a (a portion that may be a linear scattering region), the respective linear illumination lights enter pixels in common positions in the respective pixels 210D for three-dimension (for example, 210-1, 210-2, 210-3, or 210-4 in FIG. 72) at substantially the same angle, as shown in FIG. 72, for example. As a result, from the pixels in the common positions in the respective pixels 210D for three-dimension, image light modulated by those pixels is outputted at a predetermined angle. At this time, a viewer sees images having parallaxes different from each other by his or her right and left eyes. Therefore, the viewer perceives that a three-dimensional image (a stereoscopic image) is displayed on the display panel 210.

Further, in the receiver-side unit 200 in the present embodiment, at the time of two-dimensional display, light is emitted from the entire light emitting face of the backlight 211, and planar illumination light is outputted in the front direction. Accordingly, the planar illumination light outputted in the front direction enters the back face of the display panel 210.

Figure 73:
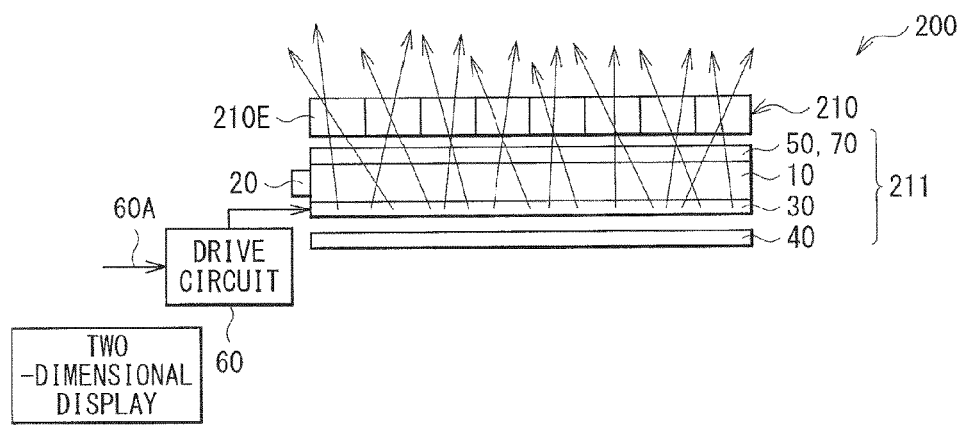
FIG. 73 is a schematic diagram for explaining two-dimensional display in the display section in FIG. 68.

Here, when the two-dimensional image data for two-dimensional display is generated in the image signal processing circuit 207 in correspondence with respective pixels 210E, for example, as shown in FIG. 73, planar illumination light enters the respective pixels 210E at any angle, and image light modulated by the respective pixels 210E is outputted from the respective pixels 210E. At this time, the viewer sees the same image with his or her both eyes. Therefore, the viewer perceives that a two-dimensional image (a planar image) is displayed on the display panel 210.

By the way, in the present embodiment, in the backlight 211, the lens sheet 50 or the lens sheet 70 is provided on the light guide plate 10. Therefore, luminance in the front direction is allowed to be increased compared to a case in which the lens sheet 50 or the lens sheet 70 is not provided. As a result, it is possible to increase the light amount of the light that enters the display panel 210 at an angle from 0° to the appropriate viewing angle (for example, 15°). Therefore, it is possible to obtain high luminance in a displayed image.

5. Modifications of Third Embodiment

Modification 1

Figure 74:
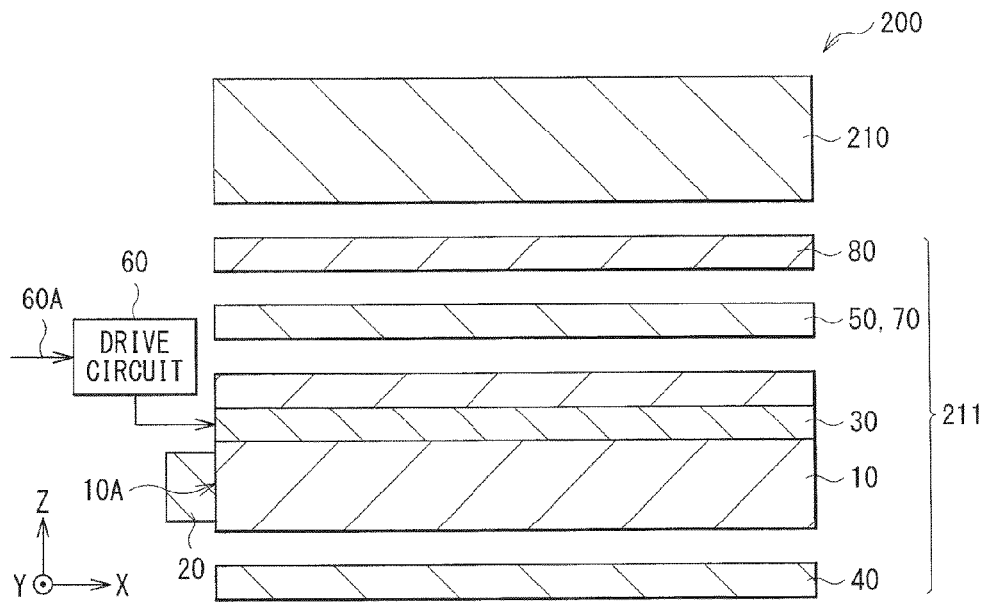
FIG. 74 is a cross-sectional view illustrating a first modification of the display section in the receiver-side unit in FIG. 67.
Figure 75:
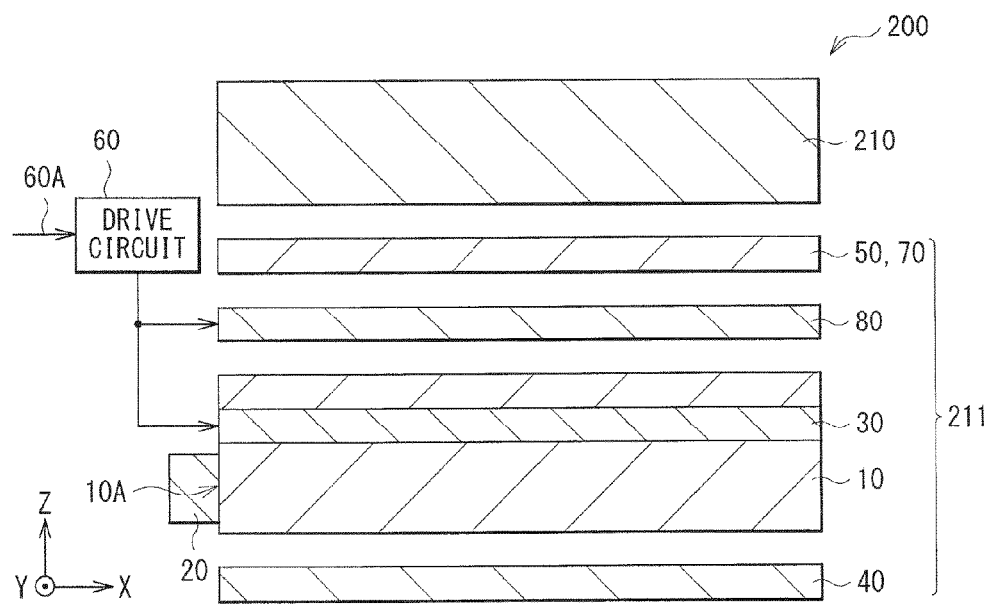
FIG. 75 is a cross-sectional view illustrating a second modification of the display section in the receiver-side unit in FIG. 67.

In the above-described third embodiment, for example, as shown in FIGS. 74 and 75, a parallax barrier 80 may be provided on the light emission side of the backlight 211. The parallax barrier 80 may be preferably provided on the lens sheet 50 or 70 as shown in FIG. 74. However, in some cases, the parallax barrier 80 may be provided between the lens sheet 50 or 70 and the light guide plate 10 as shown in FIG. 75.

When three-dimensional display is performed, the parallax barrier 80 limits the light output region of the backlight 211 to a region facing the plurality of sub-electrodes 36B or to a region corresponding thereto, and blocks noise light that is emitted from a region (for example, an end portion of the transmission region 30A) adjacent to the scattering region 30B. Further, when two-dimensional display is performed, the parallax barrier 80 expands the light output region of the backlight 211 to a region that faces a region in which the lower electrode 32 and the upper electrode 36 face each other, or to a region corresponding thereto, and transmits the light outputted from the light modulation device 30.

Figure 76:
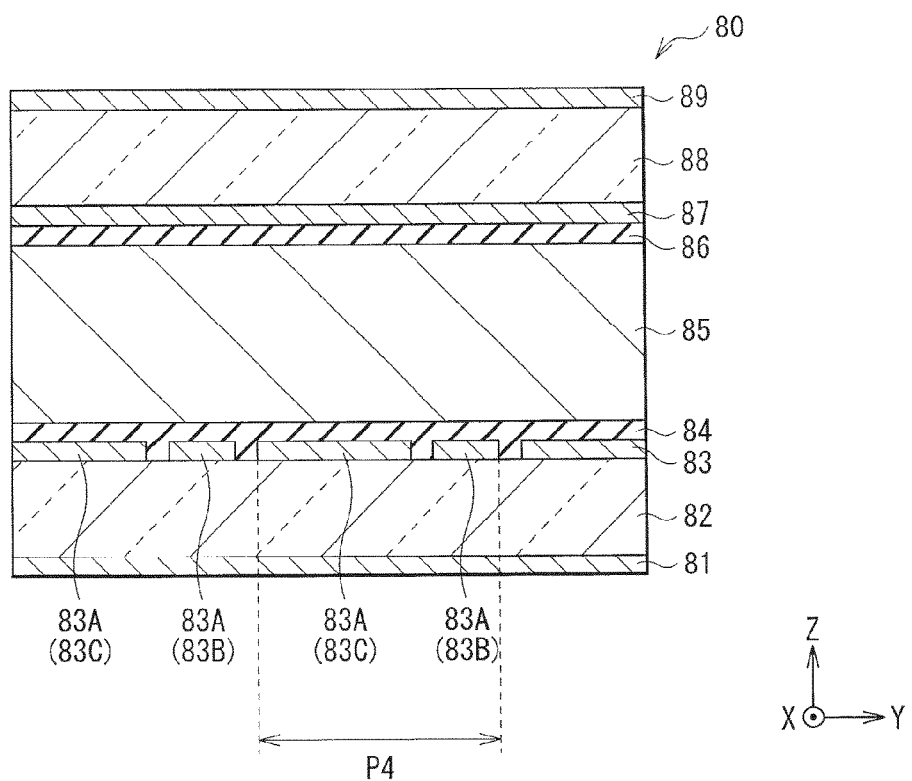
FIG. 76 is a diagram illustrating a cross-sectional configuration example of parallax barriers in FIG. 74 and FIG. 75.

For example, as shown in FIG. 76, the parallax barrier 80 may include a polarizing plate 81, a transparent substrate 82, a lower electrode 83, an alignment film 84, a liquid crystal layer 85, an alignment film 86, an upper electrode 87, a transparent substrate 88, and a polarizing plate 89 in order from the light guide plate 10.

The transparent substrates 82 and 88 are each configured of a substrate transparent with respect to visible light, and may be configured, for example, of a plate glass. It is to be noted that, for example, an active drive circuit that includes a TFT electrically connected to the lower electrode 83, a wiring, etc. may be formed on the transparent substrate on the light guide plate 10 side, which is not illustrated. The lower electrode 83 and the upper electrode 87 may each be configured, for example, of ITO. The lower electrode 83 may be configured, for example, of a plurality of sub-electrodes 83A as shown in FIG. 76. The plurality of sub-electrodes 83A are formed on the transparent substrate 82.

The plurality of sub-electrodes 83A each have a belt-like shape that extends in one direction in a plane (the direction parallel to the light incident face 10A). Widths of a plurality of specific sub-electrodes 83B out of the plurality of sub-electrodes 83A are smaller than widths of a plurality of sub-electrodes 83C other than the plurality of sub-electrodes 83B out of the plurality of sub-electrodes 83A. The plurality of sub-electrodes 83B are used for transmitting or blocking liner illumination light when three-dimensional display is performed in the receiver-side unit 200. The plurality of sub-pixels 83B are arranged with a pitch P4 (a pitch same as the pixel pitch P2, or a pitch close thereto) corresponding to the pixel pitch P2 (see FIG. 72) at the time when three-dimensional display is performed in the receiver-side unit 200. The plurality of sub-electrodes 83B and the plurality of sub-electrodes 83C are arranged alternately in the arrangement direction (the direction perpendicular to the light incident face 10A). It is to be noted that, when two-dimensional display is performed in the receiver-side unit 200, all of the sub-electrodes 83A are used in order to generate planar illumination light.

The upper electrode 87 is formed on one face on the transparent substrate 88, and serves as a common electrode that faces each sub-electrode 83A. The alignment films 84 and 86 may be configured, for example, of a polymer material such as polyimide, and performs an alignment process on liquid crystal. The liquid crystal layer 85 may be configured, for example, of liquid crystal of a VA mode, a TN mode, or a STN mode. The liquid crystal layer 85 may have a function that varies a direction of a polarization axis of the light from the light guide plate 10 side for each of the portions facing the sub-electrodes 83A by a voltage applied from the drive circuit 60. The polarizing plates 81 and 89 are each a kind of an optical shutter, and allow light (polarized light) having a certain vibration direction to pass therethrough. It is to be noted that the polarizing plates 81 and 89 may each be an absorption-type polarizer that absorbs light (polarized light) that has a vibration direction other than the transmission axis. However, the polarizing plates 81 and 89 may each be a reflective polarizer that reflects such light toward the light guide plate 10 side. The respective polarizing plates 81 and 89 are arranged to allow the polarization axes to be different from each other by 90° or to be parallel to each other. Thus, the light from the light guide plate 10 side is transmitted with the liquid crystal layer 85 in between, or is blocked.

When a signal that specifies three-dimensional display is inputted as the control signal 60A, the drive circuit 60 allows the parallax barrier 80 to serve as a slit-like light transmission section. Specifically, the drive circuit 60 applies a voltage that allows the parallax barrier 80 to exhibit transmission characteristics to a plurality of specific sub-electrodes 83B out of the plurality of sub-electrodes 83A. Also, the drive circuit 60 applies a voltage that allows the parallax barrier 80 to exhibit light blocking characteristics to a plurality of sub-electrodes 83C other than the plurality of sub-electrodes 83B out of the plurality of sub-electrodes 83A.

Moreover, when a signal that specifies two-dimensional display is inputted as the control signal 60A, the drive circuit

60 allows the parallax barrier 80 as a whole to serve as the light transmission section. Specifically, the drive circuit 60 applies a voltage that allows the parallax barrier 80 to exhibit transmission characteristics to each sub-electrode 83A.

In the present modification, the parallax barrier 80 is provided on the light emission side of the backlight 211. Therefore, when a plurality of linear illumination lights are outputted from the light modulation device 30, it is possible to block the noise light that may be outputted from the region adjacent to the scattering region 30B. Accordingly, it is possible to reduce light that enters each pixel 210-1, 210-2, 210-3, or 210-4 (see FIG. 72) at an angle different from the angle at which each linear illumination light enters. As a result, clear three-dimensional image is allowed to be obtained.

Modification 2

Figure 77:
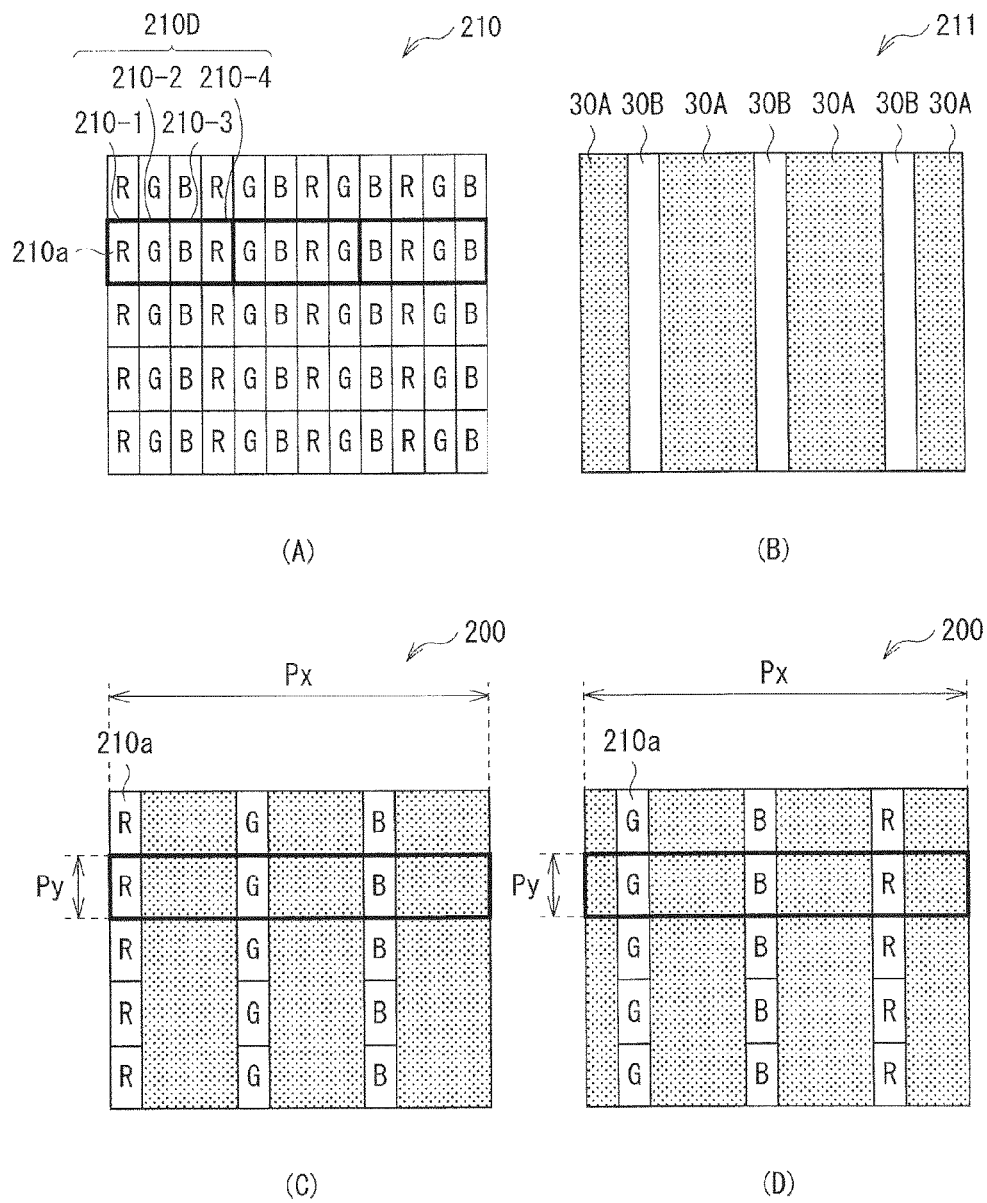
FIG. 77 is a schematic diagram illustrating an example of a relationship between pixels in a display panel and light of a backlight.

In the above-described third embodiment and the modification thereof, at the time of three-dimensional display, for example, as shown by a thick frame in FIG. 77A, the four pixels 210-1 to 210-4 in the display panel 210 are driven as one pixel 210D for three-dimension. At this time, for example, as shown in FIG. 77B, the backlight 211 forms one scattering region 30B for each of the pixels 210D for three-dimension, and allows the backlight light to enter the respective pixels 210-1 to 210-4 at incident angles different from one another. As a result, the respective belt-like illumination lights enter, at substantially the same angles, the pixels in the common positions in the respective pixels 210D for three-dimension (for example, in FIG. 72, 210-1, 210-2, 210-3, or 210-4). As a result, from the pixels in the common positions in the respective pixels 210D for three-dimension, image light modulated by that pixels are outputted at a predetermined angle. At this time, a viewer may see, for example, image light from a pixel 210*a* shown in FIG. 77C with his or her right eye, and may see image light from the pixel 210*a* shown in FIG. 77D by his or her left eye at the same time. In other words, the viewer sees images having parallaxes different from each other by his or her right and left eyes. As a result, the viewer perceives that a three-dimensional image (a stereoscopic image) is displayed on the display panel 210.

Here, comparing a pixel pitch Px in the lateral direction and a pixel pitch Py in a vertical direction, the pixel pitch Py in the vertical direction is as large as several times the pixel pitch Px in the lateral direction. Therefore, the viewer sees images that have a large difference in pixel pitch between in the vertical direction and in the lateral direction. In this case, the viewer may feel that image quality is degraded in some cases.

Figure 78:
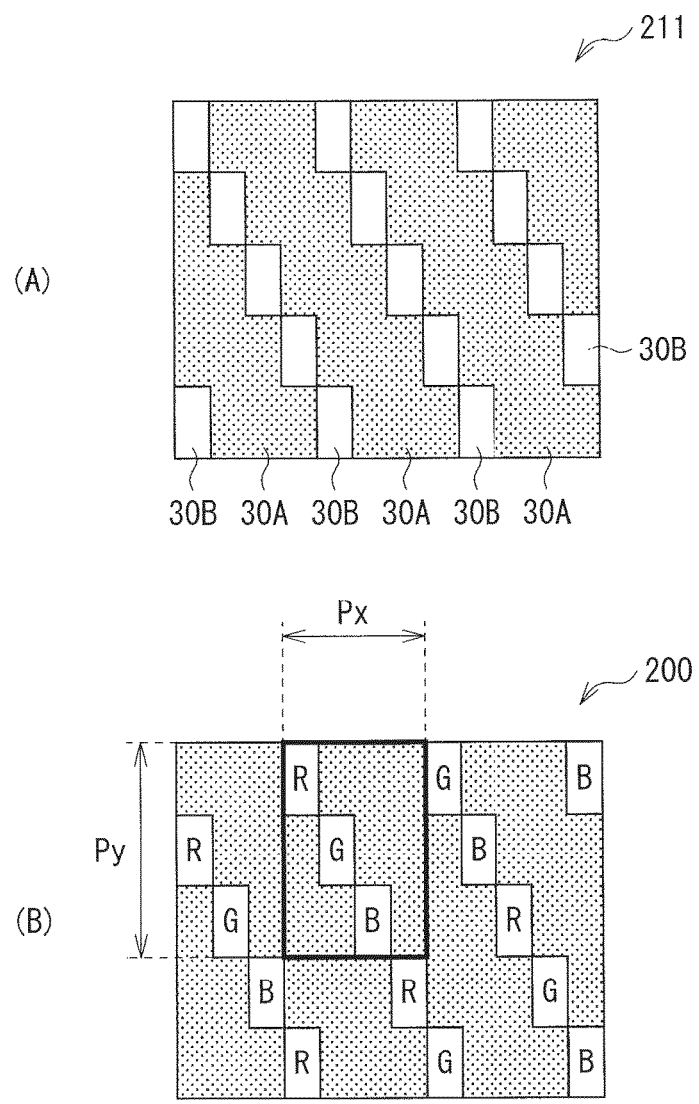
FIG. 78 is a schematic diagram illustrating another example of the relationship between the pixels in the display panel and the light of the backlight.

Therefore, for example, as shown in FIG. 78A, each scattering region 30B is arranged to be shifted in a left-right direction (the Y-axis direction) by the width of the pixel 210*a* in a relationship with another scattering region 30B adjacent thereto. In such a case, as shown in FIG. 78B, the pixel pitch Px in the lateral direction and the pixel pitch Py in the vertical direction are allowed to be closer than those in FIG. 77C and FIG. 77D. As a result, it is possible to suppress degradation in image quality.

Figure 79:
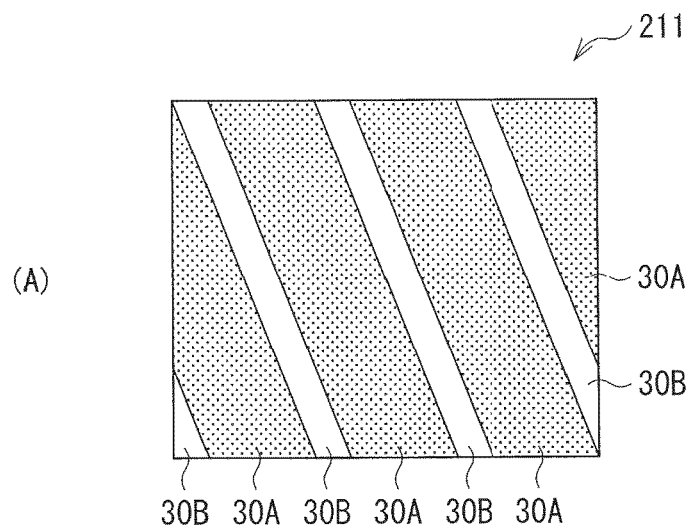
FIG. 79 is a schematic diagram illustrating other example of the relationship between the pixels in the display panel and the light of the backlight.
Figure 79:
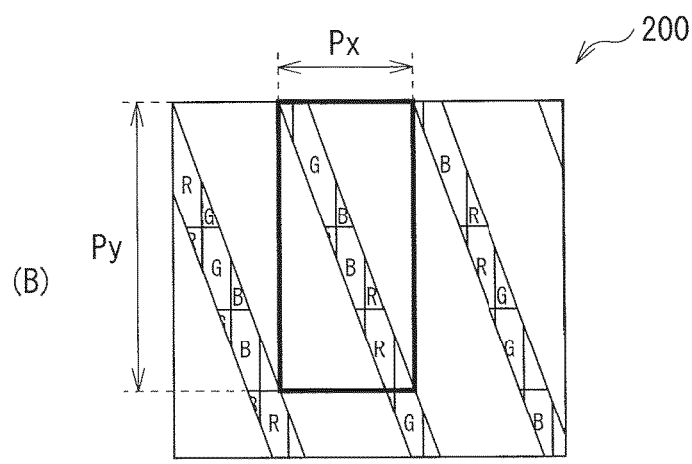
Figure 80:
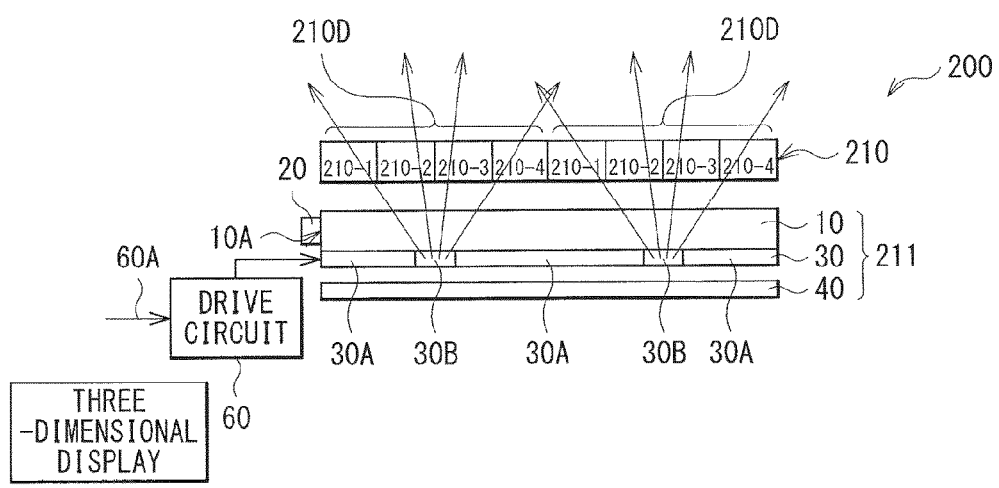
FIG. 80 is a schematic diagram illustrating an example of time-divisional drive at the time of three-dimensional display.
Figure 81:
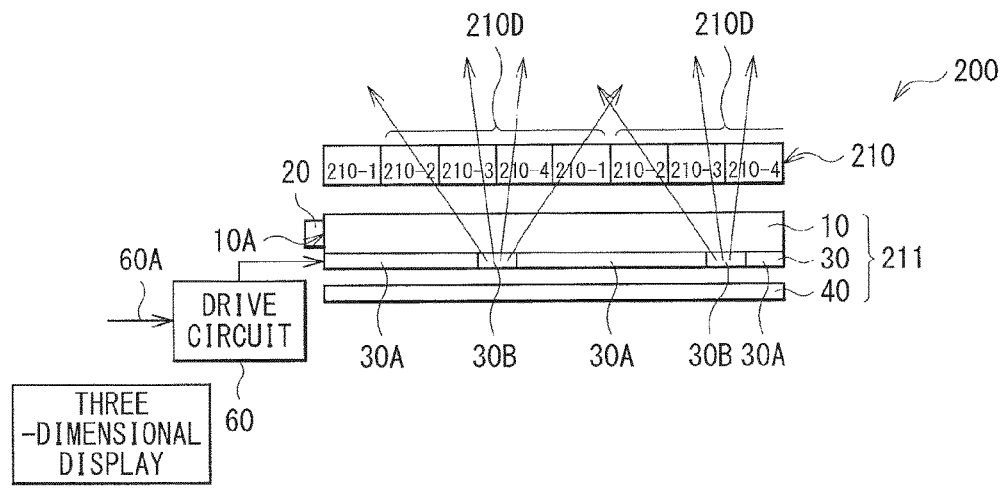
FIG. 81 is a schematic diagram illustrating an example of time-divisional drive following that in FIG. 80.
Figure 82:
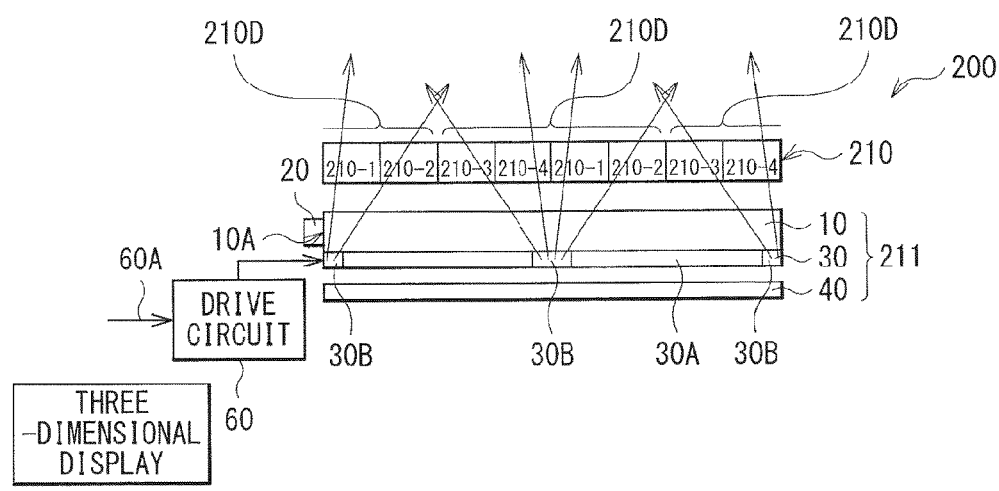
FIG. 82 is a schematic diagram illustrating an example of time-divisional drive following that in FIG. 81.
Figure 83:
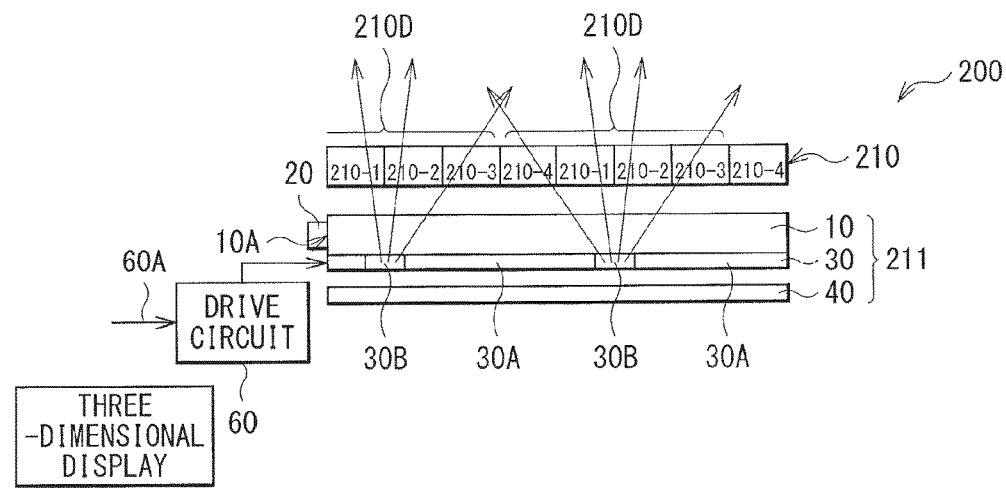
FIG. 83 is a schematic diagram illustrating an example of time-divisional drive following that in FIG. 82.

It is to be noted that, as shown in FIG. 79A, the respective scattering regions 30B may be arranged in an oblique-stripe shape. Also in such a case, as shown in FIG. 79B, it is possible to allow the pixel pitch Px in the lateral direction and the pixel pitch Py in the vertical direction to be closer than those in FIG. 77C and FIG. 77D. As a result, it is possible to suppress degradation in image quality. It is to be noted that, in a case of a display panel that has a panel size of 3.5 inches and the pixel number of 800 in vertical direction×480 in lateral direction×3 (RGB), a slope angle of each scattering region 30B is 71.57 degree at four parallaxes.

Modification 3

Moreover, in the above-described third embodiment and the modifications thereof, a drive circuit (not illustrated) that drives the display panel 210 may time-divisionally drive the display panel 210. In this case, the drive circuit 60 switches output places of belt-like illumination light from the backlight 211 in synchronization with sequential switching of display of the display panel 210 by one pixel row in pixel rows of the number equal to the number of parallaxes, in a predetermined cycle. For example, as shown in order in FIG. 80, FIG. 81, FIG. 82, and FIG. 83, the drive circuit 60 switches the output places of the belt-like illumination light from the backlight 211 in synchronization with sequential switching of the display of the display panel 210 by one pixel row in four pixel rows in one frame period (1/60 second). In this case, the drive circuit (not illustrated) that drives the display panel 210 applies, to each pixel, a voltage corresponding to the image signal, so that the display of the display panel 210 is sequentially switched by one pixel row in pixel rows of the number equal to the number of parallaxes, in one frame period (1/60 second). By thus performing switching at high speed, the viewer perceives pixels four times as the number of pixels that are emitting light in a moment. Therefore, it is possible to increase substantial resolution.

Modification 4

Figure 84:
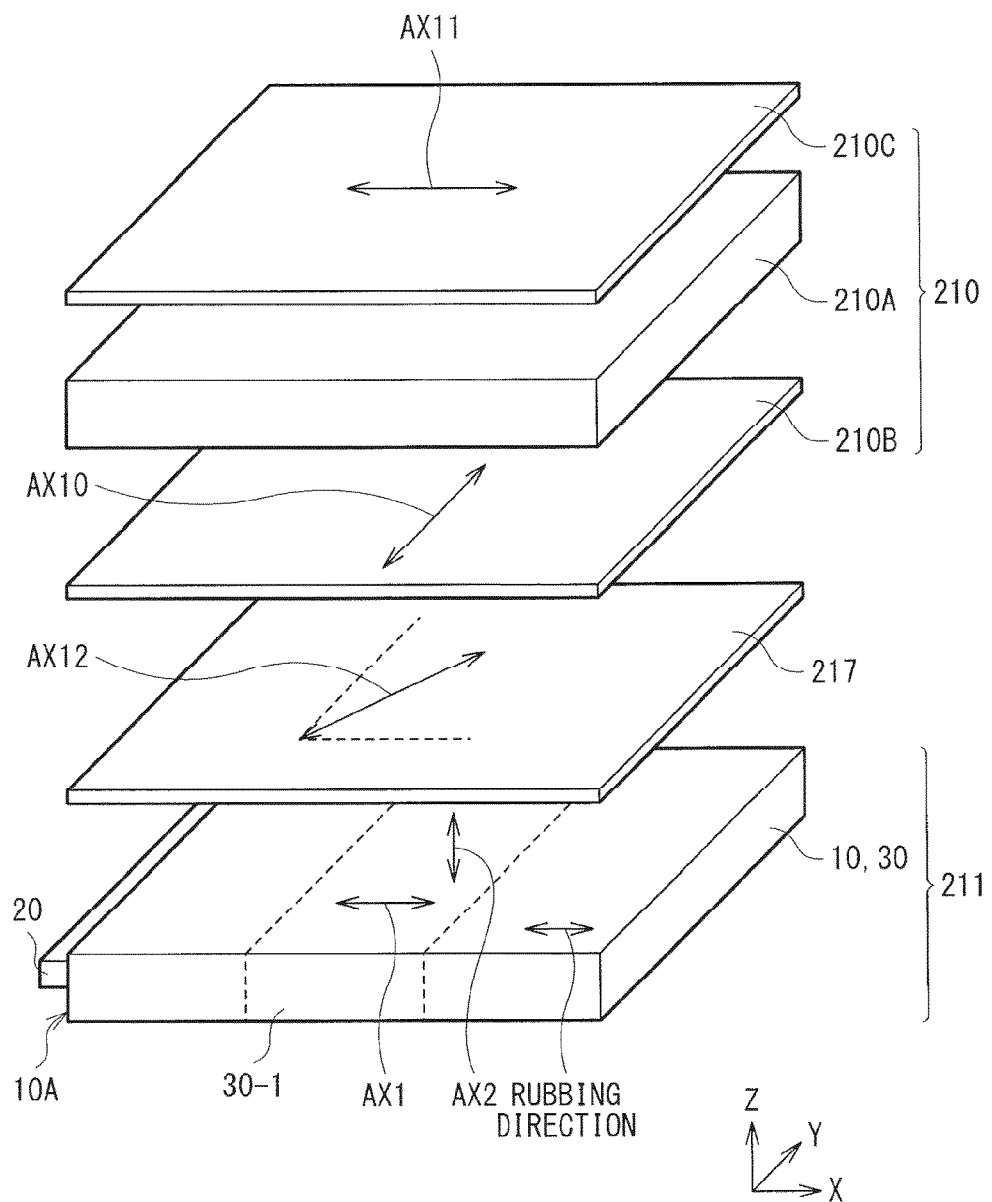
FIG. 84 is a cross-sectional view illustrating a third modification of the display section in the receiver-side unit in FIG. 67.
Figure 85:
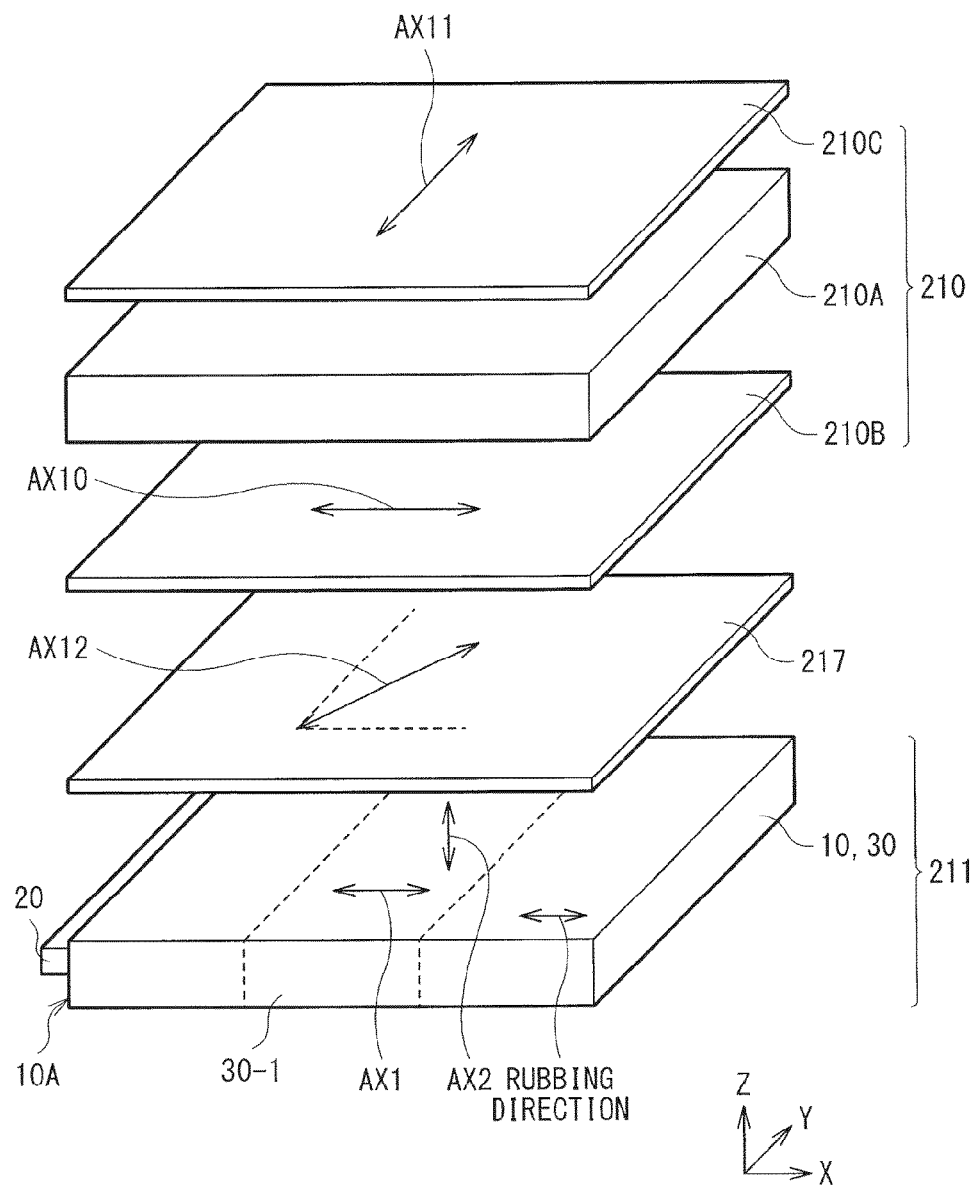
FIG. 85 is a cross-sectional view illustrating a fourth modification of the display section in the receiver-side unit in FIG. 67.

Moreover, in the above-described third embodiment and the modifications thereof, for example, as shown in FIG. 84 and FIG. 85, the optical axis AX1 of the backlight 211 and the transmission axis AX10 of the polarizing plate 210B may be in directions orthogonal to each other or intersecting with each other. However, in that case, it may be preferable that the transmitter-side unit 100 include a ½λ plate 217, between the backlight 211 and the polarizing plate 210B. The ½λ plate 217 has an optical axis AX12 in a direction parallel to a bisector of an angle formed by the optical axis AX1 and the transmission axis AX10. In such a case, it is possible to rotate the polarization direction of the polarized light emitted from the backlight 211 to the direction parallel to the transmission axis AX10 by the ½λ plate 217. As a result, it is possible to increase efficiency in utilizing light.

6. Examples

Next, description will be given on Examples on the illumination units 1 and 2 according to the above-described respective embodiments comparing to comparative examples. Configurations in Examples 1 to 20 and Comparative examples 1 and 2 are summarized in Table 1 and Table 2 below.

TABLE 1

| | Lens | | | | | Distance between lens and light emission section (μm) | Contrast | | Front Luminance ratio (Ratio to Comparative example 1) | |
| | | | | | | | | | | |
| | Shape | Concavity and convexity | Radius (μm) | Angle between PDLC and ridge | Pitch (μm) | Asphericity k | | min | Max | 3D | 2D |
|---|---|---|---|---|---|---|---|---|---|---|---|
| Example 1 | Prism | — | — | Parallel | 50 | 0 | 110 | 1.5 | 2.5 | 198% | 163% |
| Example 2 | Circle | — | — | Perpendicular | 50 | 0 | 110 | 5.5 | 6.1 | 181% | 185% |
| Example 3 | Circle | Upward convex | 30 | Perpendicular | 60 | 0 | 110 | 4.8 | 5.3 | 149% | 141% |
| Example 4 | Circle | Upward convex | 30 | Parallel | 60 | 0 | 110 | 2.7 | 4.5 | 146% | 143% |
| Example 5 | Circle | Upward convex | 30 | Perpendicular | 60 | 0 | 30 | 5.5 | 8.4 | 147% | 139% |
| Example 6 | Circle | Upward convex | 30 | Parallel | 60 | 0 | 30 | 14.6 | 17.0 | 193% | 208% |
| Example 7 | Circle | Upward convex | 60 | Parallel | 120 | 0 | 60 | 2.8 | 19.6 | 270% | 196% |
| Example 8 | Circle | Upward convex | 120 | Parallel | 240 | 0 | 110 | 1.2 | 1.7 | 352% | 148% |
| Example 9 | Circle | Upward convex | 30 | Parallel | 60 | −6 | 110 | 11.5 | 14.4 | 152% | 166% |
| Example 10 | Circle | Downward convex | 30 | Parallel | 60 | −6 | 100 | 12.3 | 13.6 | 151% | 163% |
| Comparative Example 1 | NA | — | — | — | — | — | — | 12.7 | 14.7 | 100% | 100% |

TABLE 2

| | Lens | | | | | Distance between lens and light emission section (μm) | Contrast | | Front Luminance ratio (Ratio to Comparative example 1) | |
| | | | | | | | | | | |
| | Shape | Concavity and convexity | Radius (μm) | Angle between PDLC and ridge | Pitch (μm) | Asphericity k | | min | Max | 3D | 2D |
|---|---|---|---|---|---|---|---|---|---|---|---|
| Example 11 | Prism | — | — | Parallel | 50 | 0 | 110 | 1.2 | 1.9 | 159% | 174% |
| Example 12 | Prism | — | — | Perpendicular | 50 | 0 | 110 | 2.5 | 2.5 | 157% | 175% |
| Example 13 | Circle | Upward convex | 30 | Perpendicular | 60 | 0 | 110 | 2.3 | 2.3 | 132% | 132% |
| Example 14 | Circle | Upward convex | 30 | Parallel | 60 | 0 | 110 | 1.7 | 1.9 | 134% | 133% |
| Example 15 | Circle | Upward convex | 30 | Perpendicular | 60 | 0 | 30 | 2.4 | 2.5 | 133% | 131% |
| Example 16 | Circle | Upward convex | 30 | Parallel | 60 | 0 | 30 | 4.4 | 4.5 | 176% | 176% |
| Example 17 | Circle | Upward convex | 60 | Parallel | 120 | 0 | 60 | 1.9 | 3.7 | 215% | 164% |
| Example 18 | Circle | Upward convex | 120 | Parallel | 240 | 0 | 110 | 1.1 | 1.7 | 232% | 139% |
| Example 19 | Circle | Upward convex | 30 | Parallel | 60 | −6 | 110 | 4.7 | 4.8 | 126% | 134% |
| Example 20 | Circle | Downward convex | 30 | Parallel | 60 | −6 | 100 | 4.6 | 4.8 | 126% | 132% |
| Comparative example 2 | NA | — | — | — | — | — | — | 3.6 | 3.7 | 100% | 100% |

In Example 1, on a glass substrate (having a thickness of 700 μm) of 50 mm×72 mm size, a liner ITO film array having a width of 25 μm and a pitch of 60 μm was arranged perpendicularly to a light emission direction of an LED. Since four parallaxes were adopted in the present design, a line pitch of electrodes for 3D display was set to 240 μm. Further, an ITO film was formed in a planar shape on another glass substrate (having a thickness of 100 μm) different from the above-described glass substrate. The two glass substrates were attached to each other to allow a cell gap to be 4 μm, and thereby, a light guide plate including a light modulation device was configured.

Moreover, in Example 1, a reflective plate was arranged below the light guide plate with an air interface in between, and a prism sheet (having a pitch of 50 µm) was arranged above the light guide plate with an air interface in between to allow a ridge to be parallel to the light modulation device. The reflective plate had a surface that had a circular-arc shape with R: 490 µm and a pitch of 60 µm, and that served as a mirror surface. The reflective plate was arranged to allow the middle of the circular arc to be positioned at the middle of the linear ITO. In this case, a distance between a lens and a light emission section was 110 µm that was a sum of a thickness 10 µm of the base of the prism sheet and a thickness 100 µm of the upper glass substrate.

In Example 2, a configuration same as that in Example 1 was adopted except that a prism sheet (having a pitch of 50 µm) was arranged above the light guide plate to allow a ridge to be perpendicular to the light modulation device. In Example 3, a configuration same as that in Example 1 was adopted except that a circular lens sheet (having R of 30 µm and a pitch of 60 µm (¼ of the line pitch of the electrodes for 3D display)) that had concavities and convexities on the top face side was arranged above the light guide plate to allow a ridge to be perpendicular to the light modulation device. In Example 4, a configuration same as that in Example 1 was adopted except that a circular lens sheet (having R of 30 µm and a pitch of 60 µm) that had concavities and convexities on the top face side was arranged above the light guide plate to allow a ridge to be parallel to the light modulation device. In Example 5, a configuration same as that in Example 3 was adopted except that the distance between the lens and the light emission section was set to a focal length (30 µm). In Example 6, a configuration same as that in Example 4 was adopted except that the distance between the lens and the light emission section was set to the focal length (30 µm). In Example 7, a configuration same as that in Example 6 was adopted except that a circular lens sheet (having R of 60 µm and a pitch of 120 µm (½ of the line pitch of the electrodes for 3D display)) that had concavities and convexities on the top face side was arranged above the light guide plate. In Example 8, a configuration same as that in Example 6 was adopted except that a circular lens sheet (having R of 120 µm and a pitch of 240 µm (the same as the line pitch of the electrodes for 3D display)) that had concavities and convexities on the top face side was arranged above the light guide plate. In Example 9, a configuration same as that in Example 4 was adopted except that a circular lens sheet (having R of 30 µm and a pitch of 60 µm (¼ of the line pitch of the electrodes for 3D display)) in which k representing asphericity was −6 and that had concavities and convexities on the top face side was arranged above the light guide plate. In Example 10, a configuration same as that in Example 4 was adopted except that a circular lens sheet (having R of 30 µm and a pitch of 60 µm (¼ of the line pitch of the electrodes for 3D display)) in which k representing asphericity was −6 and that had concavities and convexities on the bottom face side was arranged above the light guide plate. In Comparative example 1, a configuration same as that in Example 1 was adopted except that no lens sheet was provided above the light guide plate.

In Example 1, compared to Comparative example 1, front luminance was increased by 198% in 3D display, and by 163% in 2D display, due to the effects of the lens sheet. In Example 2, since the ridge of the prism sheet was arranged to be perpendicular to the light modulation device, the front luminance was equivalent to that in Example 1. However, minimum contrast was improved from 1.5 to 5.5, and maximum contrast was improved from 2.5 to 6.1. In Example 3, the front luminance was increased by 149% in 3D display, and by 141% in 2D display compared to that in Comparative example 1, and increase in front luminance was confirmed also in the circular lens sheet. In Example 4, the front luminance was increased by 146% in 3D display, and by 143% in 2D display compared to that in Comparative example 1. Also, compared to Example 1, the minimum contrast was improved from 1.5 to 2.7, and the maximum contrast was improved from 2.5 to 4.5. In Example 5, compared to Example 3, the front luminance was almost equivalent. However, the minimum contrast was improved from 4.8 to 5.5, and the maximum contrast was improved from 5.3 to 8.4. In vertical arrangement, the effects of improvement in front luminance and suppression in contrast were small even when the distance between the lens and the light emission section was set to the focal length.

In Example 6, both front luminance and contrast were largely improved compared to those in Example 4. When the lens pitch is (3D line pitch/the number of parallaxes), the front luminance is allowed to be improved while maintaining contrast. However, the thickness of the upper substrate becomes extremely small as 20 µm. In Example 7, since a curvature radius of the lens was increased to R 60 µm, the front luminance in 3D display was increased from 193% to 270% compared to that in Example 6 (R 30 µm). However, the minimum contrast was decreased. In Example 8, since the curvature radius of the lens was increased to R 120 µm, the front luminance in 3D display was increased from 193% to 352%, compared to Example 6 (R 30 µm). However, both maximum contrast and minimum contrast were decreased compared to those in Example 7. In Example 9, since an aspherical surface was adopted, the front luminance was increased from 146% to 152% in 3D display, and from 143% to 166% in 2D display, compared to those in Example 4 in which a circular lens was adopted, even if the distance between the lens and the light emission section was 110 µm. Also, the minimum contrast was largely improved from 2.7 to 11.5, and the maximum contrast was largely improved from 4.5 to 14.4. Further, the thickness of the upper substrate is allowed to be thick as about 100 µm, and therefore, fabrication process is simplified. In Example 10, even the lens was arranged on the bottom face side, performance almost equivalent to that in Example 9 in which the lens was arranged on the upper side was obtained. In such a manner, the thickness of the lens base is eliminated between the lens and the light emission section, and therefore, the thickness of the upper substrate is allowed to be larger. Further, it is possible to directly attach the lens sheet base and the display panel to each other, and therefore, an assemble process becomes easier.

Next, Examples 11 to 20 will be described. In Example 11, a configuration same as that in Example 1 was adopted except that the reflective sheet had a flat mirror surface. In Example 12, a configuration same as that in Example 11 was adopted except that a prism sheet (having a pitch of 50 µm) was arranged above the light guide plate to allow a ridge to be perpendicular to the light modulation device. In Example 13, a configuration same as that in Example 11 was adopted except that a circular lens sheet (having R of 30 µm and a pitch of 60 µm) that had concavities and convexities on the top face side was arranged above the light guide plate to allow a ridge to be perpendicular to the light modulation device. In Example 14, a configuration same as that in Example 11 was adopted except that a circular lens sheet (having R of 30 µm and a pitch of 60 µm (¼ of the line pitch of the electrodes for 3D display)) that had concavities and convexities on the top face side was arranged above the light guide plate to allow a ridge to be parallel to the light modulation device. In Example 15, a configuration same as that in Example 13 was adopted except that the distance between the lens and the light emission section was set to the focal length (30 µm). In Example 16, a configuration same as that in Example 14 was adopted except that the distance between the lens and the light emission section was set to the focal length (30 µm). In Example 17, a configuration same as that in Example 16 was adopted except that a circular lens sheet (having R of 60 µm and a pitch of 120 µm (½ of the line pitch of the electrodes for 3D display)) that had concavities and convexities on the top face side was arranged above the light guide plate. In Example 18, a configuration same as that in Example 6 was adopted except that a circular lens sheet (having R of 120 µm and a pitch of 240 µm (the same as the line pitch of the electrodes for 3D display)) that had concavities and convexities on the top face side was arranged above the light guide plate. In Example 19, a configuration same as that in Example 14 was adopted except that a circular lens sheet (having R of 30 µm and a pitch of 60 µm (¼ of the line pitch of the electrodes for 3D display)) in which k representing asphericity was −6 and that had concavities and convexities on the top face side was arranged above the light guide plate. In Example 20, a configuration same as that in Example 14 was adopted except that a circular lens sheet (having R of 30 µm and a pitch of 60 µm (¼ of the line pitch of the electrodes for 3D display)) in which k representing asphericity was −6 and that had concavities and convexities on the bottom face side was arranged above the light guide plate. In Comparative example 2, a configuration same as that in Example 11 was adopted except that no lens sheet was provided above the light guide plate.

In Example 11, compared to Comparative example 2, the front luminance was increased by 159% in 3D display, and by 174% in 2D display, due to the effects of the lens sheet. In Example 12, compared to Example 11, the front luminance was equivalent, but, the minimum contrast was improved from 1.2 to 2.5, and the maximum contrast was improved from 1.9 to 2.5. In Example 13, compared to Comparative example 2, the front luminance was increased by 132% in 3D display, and by 132% in 2D display, and increase in front luminance was confirmed also in the circular lens sheet. In Example 14, compared to Comparative example 2, the front luminance was increased by 134% in 3D display, and by 133% in 2D display. Also, compared to Example 12, the minimum contrast was varied from 2.5 to 1.7, and the maximum contrast was varied from 2.5 to 1.9. In Example 15, compared to Example 13, the front luminance was almost equivalent. However, the minimum contrast was improved from 2.3 to 2.4, and the maximum contrast was improved from 2.3 to 2.5. In vertical arrangement, the effects of improvement in front luminance and suppression in contrast were small even when the distance between the lens and the light emission section was set to the focal length.

In Example 16, compared to Example 14, the front luminance was increased from 134% to 176% in 3D display, and was increased from 133% to 176% in 2D display. The minimum contrast was improved from 1.7 to 4.4, and the maximum contrast was improved from 1.9 to 4.5. When the lens pitch is (3D line pitch/the number of parallaxes), the front luminance is allowed to be improved while maintaining contrast. However, the thickness of the upper substrate becomes extremely small as 20 µm. In Example 17, since the curvature radius of the lens was increased to R 60 µm, the front luminance in 3D display was increased from 176% to 215% compared to that in Example 16 (R 30 µm). However, the minimum contrast was decreased. In Example 18, since the curvature radius of the lens was increased to R 120 µm, the front luminance in 3D display was increased from 176% to 232% compared to Example 16 (R 30 µm). However, both maximum contrast and minimum contrast were decreased compared to those in Example 17. In Example 19, since an aspherical surface was adopted, the front luminance was almost equivalent in both 3D display and 2D display, but the minimum contrast was largely improved from 1.7 to 4.7, and the maximum contrast was largely improved from 1.9 to 4.8, compared to those in Example 14 in which a circular lens was adopted, even if the distance between the lens and the light emission section was 110 µm. Further, the thickness of the upper substrate is allowed to be thick as about 100 µm, and therefore, fabrication process is simplified. In Example 20, even if the lens was arranged on the bottom face side, performance almost equivalent to that in Example 19 in which the lens was arranged on the top face side was obtained. In such a manner, the thickness of the lens base is eliminated between the lens and the light emission section, and therefore, the thickness of the upper substrate is allowed to be larger. Further, it is possible to directly attach the lens sheet base and the display panel to each other, and therefore, an assemble process becomes easier.

Next, description will be given on Examples of the illumination unit 2 according to the above-described second embodiment. Configurations in Examples 21 and 22 were set as follows. Specifically, in Examples 21 and 22, on a glass substrate (having a thickness of 700 µm) of 50 mm×72 mm size, a liner ITO film array having a width of 25 µm and a pitch of 60 µm was arranged perpendicularly to a light emission direction of an LED. Since four parallaxes were adopted in the present design, the line pitch of the electrodes for 3D display was set to 240 µm. Further, an ITO film was formed in a planar shape on another glass substrate (having a thickness of 100 µm) different from the above-described glass substrate. The two glass substrates were attached to each other to allow a cell gap to be 4 µm, and thereby, a light guide plate including a light modulation device was configured.

Moreover, in Example 21, a reflective plate was arranged below the light guide plate with an air interface in between, and a circular prism sheet (having R 30 µm and a pitch of 60 µm (¼ of the line pitch of the electrodes for 3D display)) that had concavities and convexities on the bottom face side was arranged above the light guide plate with an air interface in between to allow a ridge to be parallel to the light modulation device. The reflective plate had a surface that had a circular-arc shape with R: 490 µm and a pitch of 60 µm, and that served as a mirror surface. The reflective plate was arranged to allow the middle of the circular arc to be positioned at the middle of the linear ITO. In this case, seven types shown in Table 3 were prepared as the distance Lz between the lens and the light emission section (the thickness of the upper glass substrate).

TABLE 3

| Thickness of upper substrate | 20 µm | 40 µm | 60 µm | 80 µm | 100 µm | 120 µm | 140 µm |
|---|---|---|---|---|---|---|---|
| Contrast (min) | 12.1 | 12.5 | 13.0 | 13.8 | 12.3 | 9.3 | 6.8 |
| Contrast (max) | 13.1 | 14.1 | 13.6 | 15.0 | 13.6 | 10.6 | 9.1 |
| Front luminance ratio (3D) | 129% | 149% | 160% | 160% | 151% | 140% | 130% |
| Front luminance ratio (2D) | 135% | 161% | 175% | 174% | 162% | 149% | 138% |

On the other hand, in Example 22, a reflective plate was arranged below the light guide plate with an air interface in between, and a circular prism sheet (having a pitch of 60 μm (¼ of the line pitch of the electrodes for 3D display)) that had concavities and convexities on the bottom face side to allow a ridge to be parallel to the light modulation device. In this case, five types shown in Table 4 were prepared as the curvature radius R of the belt-like convex section 70A. The reflective plate had a surface that had a circular-arc shape with R: 490 μm and a pitch of 60 μm, and that served as a mirror surface. The reflective plate was arranged to allow the middle of the circular arc to be positioned at the middle of the linear ITO. In this case, the distance Lz between the lens and the light emission section (the thickness of the upper glass substrate) was set to 100 μm.

TABLE 4

| Curvature radius | 20 μm | 25 μm | 30 μm | 35 μm | 40 μm |
|---|---|---|---|---|---|
| Contrast(min) | 7.1 | 10.3 | 12.3 | 12.1 | 10.2 |
| Contrast(max) | 9.6 | 12.1 | 13.6 | 14.0 | 12.7 |
| Front luminance ratio (3D) | 130% | 144% | 151% | 143% | 125% |
| Front luminance ratio (2D) | 136% | 155% | 162% | 153% | 131% |

From Table 3, it can be seen that, when $0<Lz<R/(n2(n1-1))\times1.4$ is established where R is a curvature radius of the belt-like convex section 70A, n1 is a refractive index of the belt-like convex section 70A, and n2 is a refractive index between the belt-like convex section 70A and the light modulation cell 30a, the contrast becomes 12 or higher, and the front luminance ratio becomes 120% or higher. Further, it can be seen that, when $R/(n2(n1-1))\times0.7<Lz<R/(n2(n1-1))\times1.2$ is established, the contrast becomes 12 or higher and the front luminance ratio is 150% or higher.

From Table 4, it can be seen that, when $P1/N\times0.6<R<P1/N\times1.4$ is established where the pitch of the light modulation cells 30a (portions that may be the linear scattering regions) is P1, and the number of three-dimensional perspectives is N, the contrast becomes 7 or higher, and the front luminance ratio becomes 120% or higher. Further, it can be seen that, when $P1/N\times0.8<R<P1/N\times1.2$ is established, the contrast becomes 10 or higher, and the front luminance ratio becomes 140% or higher.

Next, description will be given on Examples of the illumination unit 2 according to the modifications of the above-described second embodiment, in comparison with a comparative example. Configurations in Examples 23 to 29 and Comparative example 3 are summarized in Table 5 below.

TABLE 5

| | Calculation condition ||||||
| | Lens ||||||
| | Shape | Concavity and convexity | Radius (μm) | Angle between PDLC and ridge | Pitch (μm) | Asphericity k | Reflective sheet |
|---|---|---|---|---|---|---|---|
| Example 23 | Circle | Downward convex | 30 | Parallel | 60 | −10 | Mirror surface, Circular arc |
| Example 24 | Circle | Downward convex | 30 | Parallel | 60 | −10 | Mirror surface, Circular arc |
| Example 25 | Circle | Downward convex | 30 | Parallel | 60 | −10 | Mirror surface, Circular arc |
| Example 26 | Circle | Downward convex | 47.25 | Perpendicular | 94.5 | −10 | Mirror surface, Circular arc |
| Example 27 | Circle | Downward convex | 47.25 | Intersecting at 77° | 94.5 | −10 | Mirror surface, Circular arc |
| Example 28 | Circle | Downward convex | 47.25 | Perpendicular | 94.5 | −10 | Mirror surface, Circular arc |
| Example 29 | Circle | Downward convex | 47.25 | Intersecting at 77° | 94.5 | −10 | Mirror surface, Circular arc |
| Comparative Example 1 | NA | — | — | — | — | — | Mirror surface, Circular arc |

TABLE 5-continued

| | | Calculation condition | | | | | | |
|---|---|---|---|---|---|---|---|---|
| | | Light source | | | | Obtainable characteristics | | |
| | Shape of light source | Light emission width in direction perpendicular to parallax (μm) | Light emission height (μm) | Distance between lens and light emission section (μm) | Luminance increase ratio (%) | | Viewing angle in 2D parallax direction (°) | 3D line width in direction of parallax to be viewed (μm) |
| | | | | | 3D | 2D | | |
| Example 23 | Linear light source | 25 | — | 160 | 164% | 155% | ±17.5 | 50 μm |
| Example 24 | Linear light source | 10 | — | 160 | 172% | 164% | ±12.5 | 47 μm |
| Example 25 | Linear light source | 25 | — | 50 | 137% | 99% | ±37.5 | 47 μm |
| Example 26 | Linear light source | 25 | — | 160 | 99% | 101% | ±90 | 25 μm |
| Example 27 | Linear light source | 25 | — | 160 | 99% | 101% | ±90 | 25 μm |
| Example 28 | Point light source | 25 | 30 | 160 | 155% | 155% | ±90 | 25 μm |
| Example 29 | Point light source | 25 | 30 | 160 | 155% | 155% | ±90 | 25 μm |
| Comparative Example 1 | Linear light source | 25 | — | — | 100% | 100% | ±90 | 25 μm |

In Example 23, on a glass substrate (having a thickness of 700 μm) of 50 mm×72 mm size, a liner ITO film array having a width of 25 μm and a pitch of 60 μm was arranged to allow an extending direction thereof to be in a direction intersecting with a normal to the light incident face at an angle of 13°. Since four parallaxes were adopted in the present design, the line pitch of the electrodes for 3D display was set to 240 μm. Further, an ITO film was formed in a planar shape on another glass substrate (having a thickness of 100 μm) different from the above-described glass substrate. The two glass substrates were attached to each other to allow a cell gap to be 4 μm, and thereby, a light guide plate including a light modulation device was configured.

Moreover, in Example 23, a reflective plate was arranged below the light guide plate with an air interface in between, and a lens sheet (having a pitch of 60 μm) was arranged above the light guide plate with an air interface in between to allow a ridge to be parallel to the extending direction of the electrode in the light modulation device. The concave-convex face of the prism sheet had a circular-arc shape. The lens sheet was arranged above the light guide plate in a state in which the concave-convex face faced toward the light guide plate. The reflective plate had a surface that had a circular-arc shape with R: 490 μm and a pitch of 60 μm, and that served as a mirror surface. The reflective plate was arranged to allow the middle of the circular arc to be positioned at the middle of the linear ITO. In this case, the distance between the lens and the light emission section was 100 μm that was equal to the thickness 100 μm of the upper glass substrate.

In Example 24, a configuration same as that in Example 23 was adopted except that a linear ITO film array having a width of 10 μm and a pitch of 60 μm was arranged on the glass substrate (having a thickness of 700 μm). In Example 25, a configuration same as that in Example 23 was adopted except that the thickness of the glass substrate on which a planar ITO film was to be formed was set to 50 μm. In Example 26, a configuration same as that in Example 23 was adopted except that the lens sheet was arranged to allow a ridge to be orthogonal to the extending direction of the electrode in the light modulation device. In Example 27, a configuration same as that in Example 23 was adopted except that the lens sheet was arranged to allow a ridge to be parallel to the light incident face. In Example 28, a configuration same as that in Example 23 was adopted except that the electrodes in the light modulation device were configured to allow a plurality of block-like sub-electrodes to be arranged side by side in a direction intersecting with the normal to the light incident face at an angle of 13° and to be arranged side by side in a direction parallel to the light incident face, and further, the lens sheet was arranged to allow the ridge to be orthogonal to the direction intersecting the normal to the light incident face at an angle of 13°. In Example 29, a configuration same as that in Example 23 was adopted except that the electrodes in the light modulation device were configured to allow a plurality of block-like sub-electrodes to be arranged side by side in the direction intersecting with the normal to the light incident face at an angle of 13° and to be arranged side by side in a direction parallel to the light incident face, and further, the lens sheet was arranged to allow the ridge to be parallel to the light incident face.

In Example 23, compared to Comparative example 1, the front luminance was increased by 164% in 3D display, and by 155% in 2D display, due to the effects of the lens sheet. In Example 24, since the width of the electrode was reduced, the light emission line width was reduced, and luminance was increased. However, as the width of the electrode was reduced, the viewing angle was narrowed. In Example 25, since the thickness of the glass substrate was made small as 50 μm, the viewing angle was widened and the light emission line width was reduced, but the luminance was slightly decreased. In Example 26, since the ridge of the lens sheet extended in the direction obliquely intersecting with the parallax direction, the viewing angle was widened and the light emission line width was reduced, but the luminance was slightly decreased. Also in Example 27, effects similar to those in Example 26 were obtained. However, compared to Example 26, the light emission line width was slightly increased in the direction orthogonal to the parallax direction (which is not shown in the table). In Examples 28 and 29, as with Examples 26 and 27, the viewing angle was widened and the light emission line width was reduced. Moreover, in Examples 28 and 29, since point light emission was adopted, the front luminance was increased by 155% in both 3D display and 2D display.

Moreover, for example, the present technology may have configurations as those described below.

(1)

An illumination unit used in a display apparatus, the display apparatus including the illumination unit and a display panel, the illumination unit being capable of outputting, as illumination light, planar illumination light, a plurality of linear illumination lights, or linear illumination light formed of a plurality of point illumination lights that are arranged in a line, the display panel generating image light by modulating the illumination light in accordance with an image signal, and the illumination unit including:

an illumination optical system generating the illumination light; and a lens sheet narrowing a divergence angle of the illumination light, wherein the illumination optical system includes a first transparent substrate and a second transparent substrate that are separated from each other and are arranged to face each other, a light source applying light to an end face of the first transparent substrate or of the second transparent substrate, a light modulation layer provided in a gap between the first transparent substrate and the second transparent substrate, the light modulation layer exhibiting scattering characteristics or transparent characteristics with respect to the light from the light source in accordance with a magnitude of an electric field, and an electrode generating an electric field that generates a plurality of linear scattering regions in the light modulation layer in a three-dimensional display mode, and generating an electric filed that generates a planar scattering region in the light modulation layer in a two-dimensional display mode.

(2)

The illumination unit according to (1), wherein the lens sheet has a concave-convex face in which a plurality of belt-like convex sections are arranged side by side in a direction intersecting with an extending direction of the belt-like convex sections, the belt-like convex sections each having a polygonal or cylindrical cross-section.

(3)

The illumination unit according to (2), wherein the belt-like convex sections extend in a direction parallel to an extending direction of the linear scattering regions.

(4)

The illumination unit according to (2), wherein the belt-like convex sections extend in an arrangement direction of the linear scattering regions.

(5)

The illumination unit according to (2), wherein the belt-like convex sections extend in a direction obliquely intersecting with both an extending direction of the linear scattering regions and an arrangement direction of the linear scattering regions.

(6)

The illumination unit according to (2), wherein the belt-like convex sections each have the cylindrical cross-section, and the belt-like convex sections are arranged to allow middle, of the belt-like convex sections, in a width direction to face the linear scattering regions.

(7)

The illumination unit according to (6), wherein a pitch of the belt-like convex sections is P1/n (n=1, 2, ... ) where P1 is a pitch of the linear scattering regions.

(8)

The illumination unit according to (2), wherein the belt-like convex sections each have a triangular cross-section with a base angle from 60 degrees to 70 degrees, and the belt-like convex sections are arranged on a light modulation layer side.

(9)

The illumination unit according to (6), wherein a distance Lz between the belt-like convex section and the linear scattering region satisfies $0 < Lz < R/(n2(n1-1)) \times 1.4$, where R is a curvature radius of the belt-like convex section, n1 is a refractive index of the belt-like convex section, and n2 is a refractive index between the belt-like convex section and the linear scattering region.

(10)

The illumination unit according to (9), wherein the belt-like convex sections extend in a direction parallel to an extending direction of the linear scattering regions.

(11)

The illumination unit according to (10), wherein a pitch of the belt-like convex sections is P1/n (n=1, 2, ... ) where P1 is a pitch of the linear scattering regions.

(12)

The illumination unit according to (11), wherein a radius of the belt-like convex section satisfies $P1/N \times 0.6 < R < P1/N \times 1.4$, where P1 is a pitch of the linear scattering regions, and N is number of three-dimensional perspectives.

(13)

The illumination unit according to any one of (9) to (12), wherein a shape of an end of the cross-section of the belt-like convex section satisfies $-40 < k < 0$ in a conic surface described below.

$$y = \frac{x^2}{R + \sqrt{R^2 - (1+k)x^2}}$$

(14)

The illumination unit according to any one of (1) to (13), wherein the lens sheet is configured of a material having isotropic refractive index.

(15)

The illumination unit according to (6), wherein the belt-like convex sections are arranged on a light modulation layer side.

(16)
A display apparatus including:
an illumination unit capable of outputting, as illumination light, planar illumination light, a plurality of linear illumination lights, or linear illumination light formed of a plurality of point illumination lights that are arranged in a line; and
a display panel generating image light by modulating the illumination light in accordance with an image signal,
the illumination unit including
an illumination optical system generating the illumination light, and
a lens sheet narrowing a divergence angle of the illumination light, wherein
the illumination optical system includes
a first transparent substrate and a second transparent substrate that are separated from each other and are arranged to face each other,
a light source applying light to an end face of the first transparent substrate or of the second transparent substrate,
a light modulation layer provided in a gap between the first transparent substrate and the second transparent substrate, the light modulation layer exhibiting scattering characteristics or transparent characteristics with respect to the light from the light source in accordance with a magnitude of an electric field, and
an electrode generating an electric field that generates a plurality of linear scattering regions in the light modulation layer in a three-dimensional display mode, and generating an electric filed that generates a planar scattering region in the light modulation layer in a two-dimensional display mode.

(17)
An illumination unit used in a display apparatus, the display apparatus including the illumination unit and a display panel, the illumination unit being capable of outputting, as illumination light, planar illumination light, a plurality of linear illumination lights, or linear illumination light formed of a plurality of point illumination lights that are arranged in a line, the display panel generating image light by modulating the illumination light in accordance with an image signal, and the illumination unit including:
an illumination optical system generating the illumination light; and
a lens sheet having a concave-convex face in which a plurality of belt-like convex sections are arranged side by side in a direction intersecting an extending direction of the belt-like convex sections, the belt-like convex sections each having a cylindrical cross-section, wherein
the illumination optical system includes
a first transparent substrate and a second transparent substrate that are separated from each other and are arranged to face each other,
a light source applying light to an end face of the first transparent substrate or of the second transparent substrate,
a light modulation layer provided in a gap between the first transparent substrate and the second transparent substrate, the light modulation layer exhibiting scattering characteristics or transparent characteristics with respect to the light from the light source in accordance with a magnitude of an electric field, and
an electrode generating an electric field that generates a plurality of linear scattering regions in the light modulation layer in a three-dimensional display mode, and generating an electric filed that generates a planar scattering region in the light modulation layer in a two-dimensional display mode.

(18)
The illumination unit according to (17), wherein a distance Lz between the belt-like convex section and the linear scattering region satisfies $0<Lz<R/(n2(n1-1))\times 1.4$, where R is a curvature radius of the belt-like convex section, n1 is a refractive index of the belt-like convex section, and n2 is a refractive index between the belt-like convex section and the linear scattering region.

(19)
The illumination unit according to (17) or (18), wherein the belt-like convex sections extend in a direction parallel to an extending direction of the linear scattering regions.

(20)
The illumination unit according to any one of (17) to (19), wherein the belt-like convex sections are arranged to allow middle, of the belt-like sections, in a width direction to face the linear scattering regions.

(21)
The illumination unit according to any one of (17) to (20), wherein a pitch of the belt-like convex sections is P1/n (n=1, 2, . . . ) where P1 is a pitch of the linear scattering regions.

(22)
The illumination unit according to any one of (17) to (20), wherein a pitch of the belt-like convex sections is P1/n (n=1, 2, . . . , N) where P1 is a pitch of the linear scattering regions, and N is number of perspectives.

(23)
The illumination unit according to any one of (17) to (20), wherein a pitch of the belt-like convex sections is P1/n (n=1, 2, . . . , m, N) where P1 is a pitch of the linear scattering regions, and m is a divisor of number of perspectives N.

(24)
The illumination unit according to any one of (17) to (20), wherein a pitch of the belt-like convex sections is P1/n (n=M, N) where P1 is a pitch of the linear scattering regions, and M is a greatest divisor (except for N) of number of perspectives N.

(25)
The illumination unit according to any one of (17) to (20), wherein a pitch of the belt-like convex sections is P1/N where P1 is a pitch of the linear scattering regions, and N is number of perspectives.

(26)
The illumination unit according to (25), wherein a radius of the belt-like convex section satisfies $P1/N\times 0.6<R<P1/N\times 1.4$, where P1 is a pitch of the linear scattering regions, and N is number of three-dimensional perspectives.

(27)
The illumination unit according to any one of (17) to (26), wherein a shape of an end of the cross-section of the belt-like convex section satisfies $-40<k<0$ in a conic surface described below.

$$y = \frac{x^2}{R + \sqrt{R^2 - (1+k)x^2}}$$

(28)
The illumination unit according to any one of (17) to (27), wherein the lens sheet is configured of a material having isotropic refractive index.

(29)
The illumination unit according to any one of (17) to (28), wherein the belt-like convex sections are arranged on a light modulation layer side.

(30)

A display apparatus including:

an illumination unit capable of outputting, as illumination light, planar illumination light or a plurality of linear illumination lights; and a display panel generating image light by modulating the illumination light in accordance with an image signal, the illumination unit including an illumination optical system generating the illumination light, and a lens sheet having a concave-convex face in which a plurality of belt-like convex sections are arranged side by side in a direction intersecting an extending direction of the belt-like convex sections, the belt-like convex sections each having a cylindrical cross-section, wherein the illumination optical system includes a first transparent substrate and a second transparent substrate that are separated from each other and are arranged to face each other, a light source applying light to an end face of the first transparent substrate or of the second transparent substrate, a light modulation layer provided in a gap between the first transparent substrate and the second transparent substrate, the light modulation layer exhibiting scattering characteristics or transparent characteristics with respect to the light from the light source in accordance with a magnitude of an electric field, and an electrode generating an electric field that generates a plurality of linear scattering regions in the light modulation layer in a three-dimensional display mode, and generating an electric filed that generates a planar scattering region in the light modulation layer in a two-dimensional display mode.

This application claims the priority of Japanese Patent Application JP 2011-220228 filed Oct. 4, 2011 and Japanese Patent Application JP 2012-155774 filed Jul. 11, 2012, the entire contents of each which are incorporated herein by reference.

The invention claimed is:

1. An illumination unit capable of outputting, as illumination light, planar illumination light, a plurality of linear illumination lights, or linear illumination light formed of a plurality of point illumination lights that are arranged in a line, the display panel generating image light by modulating the illumination light in accordance with an image signal, and the illumination unit comprising:

an illumination optical system generating the illumination light; and a lens sheet narrowing a divergence angle of the illumination light, wherein the illumination optical system includes:

a first transparent substrate and a second transparent substrate that are separated from each other and are arranged to face each other, a light source applying light to an end face of the first transparent substrate or of the second transparent substrate, a light modulation layer provided in a gap between the first transparent substrate and the second transparent substrate, the light modulation layer configured to modulate at least an amplitude of the light from the light source in accordance with a magnitude of an electric field applied to the light modulation layer, and an electrode generating an electric field that generates a plurality of linear scattering regions in the light modulation layer in a three-dimensional display mode, and generating an electric field that generates a planar scattering region in the light modulation layer in a two-dimensional display mode, and wherein the light modulation layer is positioned between the lens sheet and the light source.

2. The illumination unit according to claim 1, wherein the lens sheet has a concave-convex face in which a plurality of belt-like convex sections are arranged side by side in a direction intersecting with an extending direction of the belt-like convex sections, the belt-like convex sections each having a polygonal or cylindrical cross-section.

3. The illumination unit according to claim 2, wherein the belt-like convex sections extend in a direction parallel to an extending direction of the linear scattering regions.

4. The illumination unit according to claim 2, wherein the belt-like convex sections extend in an arrangement direction of the linear scattering regions.

5. The illumination unit according to claim 2, wherein the belt-like convex sections extend in a direction obliquely intersecting with both an extending direction of the linear scattering regions and an arrangement direction of the linear scattering regions.

6. The illumination unit according to claim 2, wherein the belt-like convex sections each have the cylindrical cross-section, and the belt-like convex sections are arranged to allow a middle of the belt-like convex sections in a width direction to face the linear scattering regions.

7. The illumination unit according to claim 6, wherein a pitch of the belt-like convex sections is P1/n (n=1, 2, . . . ) where P1 is a pitch of the linear scattering regions.

8. The illumination unit according to claim 2, wherein the belt-like convex sections each have a triangular cross-section with a base angle from 60 degrees to 70 degrees, and the belt-like convex sections are arranged on a light modulation layer side.

9. The illumination unit according to claim 6, wherein a distance Lz between the belt-like convex section and the linear scattering region satisfies $0<Lz<R/(n2(n1-1))\times 1.4$, where R is a curvature radius of the belt-like convex section, n1 is a refractive index of the belt-like convex section, and n2 is a refractive index between the belt-like convex section and the linear scattering region.

10. The illumination unit according to claim 9, wherein the belt-like convex sections extend in a direction parallel to an extending direction of the linear scattering regions.

11. The illumination unit according to claim 10, wherein a pitch of the belt-like convex sections is P1/n (n=1, 2, . . . ) where P1 is a pitch of the linear scattering regions.

12. The illumination unit according to claim 11, wherein a radius of the belt-like convex section satisfies $P1/N \times 0.6 < R < P1/N \times 1.4$, where P1 is a pitch of the linear scattering regions, and N is a number of three-dimensional perspectives.

13. The illumination unit according to claim 1, wherein the lens sheet is a material having an isotropic refractive index.

14. The illumination unit according to claim 6, wherein the belt-like convex sections are arranged on a light modulation layer side.

15. A display apparatus comprising:

an illumination unit capable of outputting, as illumination light, planar illumination light, a plurality of linear illumination lights, or linear illumination light formed of a plurality of point illumination lights that are arranged in a line; and a display panel generating image light by modulating the illumination light in accordance with an image signal, the illumination unit including:

an illumination optical system generating the illumination light, and a lens sheet narrowing a divergence angle of the illumination light, wherein the illumination optical system includes:

a first transparent substrate and a second transparent substrate that are separated from each other and are arranged to face each other, a light source applying light to an end face of the first transparent substrate or of the second transparent substrate, a light modulation layer provided in a gap between the first transparent substrate and the second transparent substrate, the light modulation layer configured to modulate at least an amplitude of the light from the light source in accordance with a magnitude of an electric field applied to the light modulation layer, and an electrode generating an electric field that generates a plurality of linear scattering regions in the light modulation layer in a three-dimensional display mode, and generating an electric field that generates a planar scattering region in the light modulation layer in a two-dimensional display mode, and wherein the light modulation layer is positioned between the lens sheet and the light source.

* * * * *